March 15, 1927.
P. W. SHIELDS
1,621,470
BOTTLING MACHINE
Filed Oct. 14, 1921     40 Sheets-Sheet 5
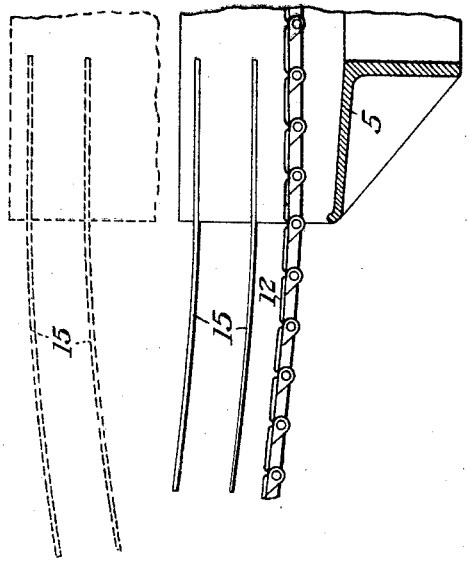
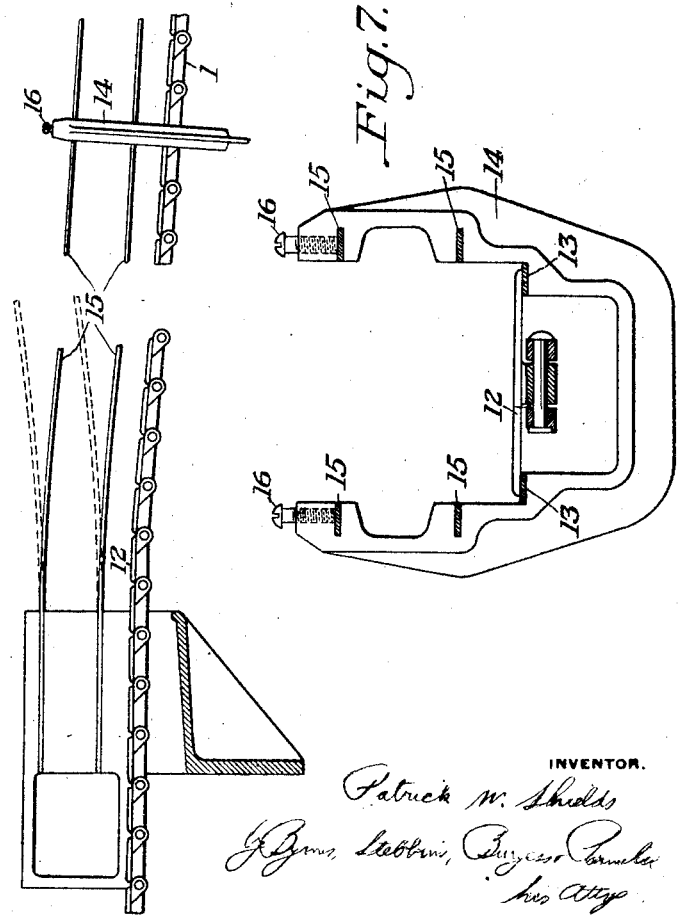

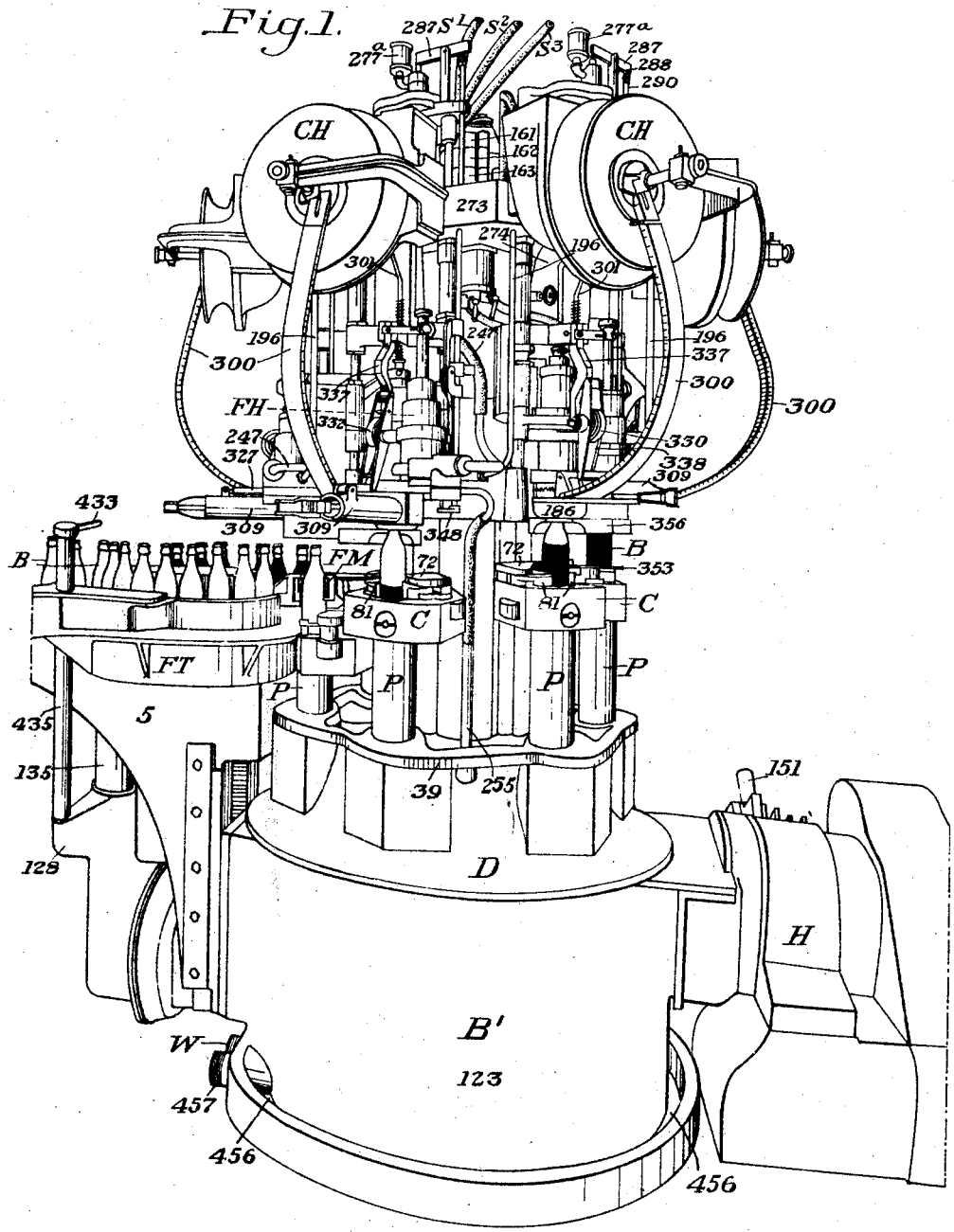

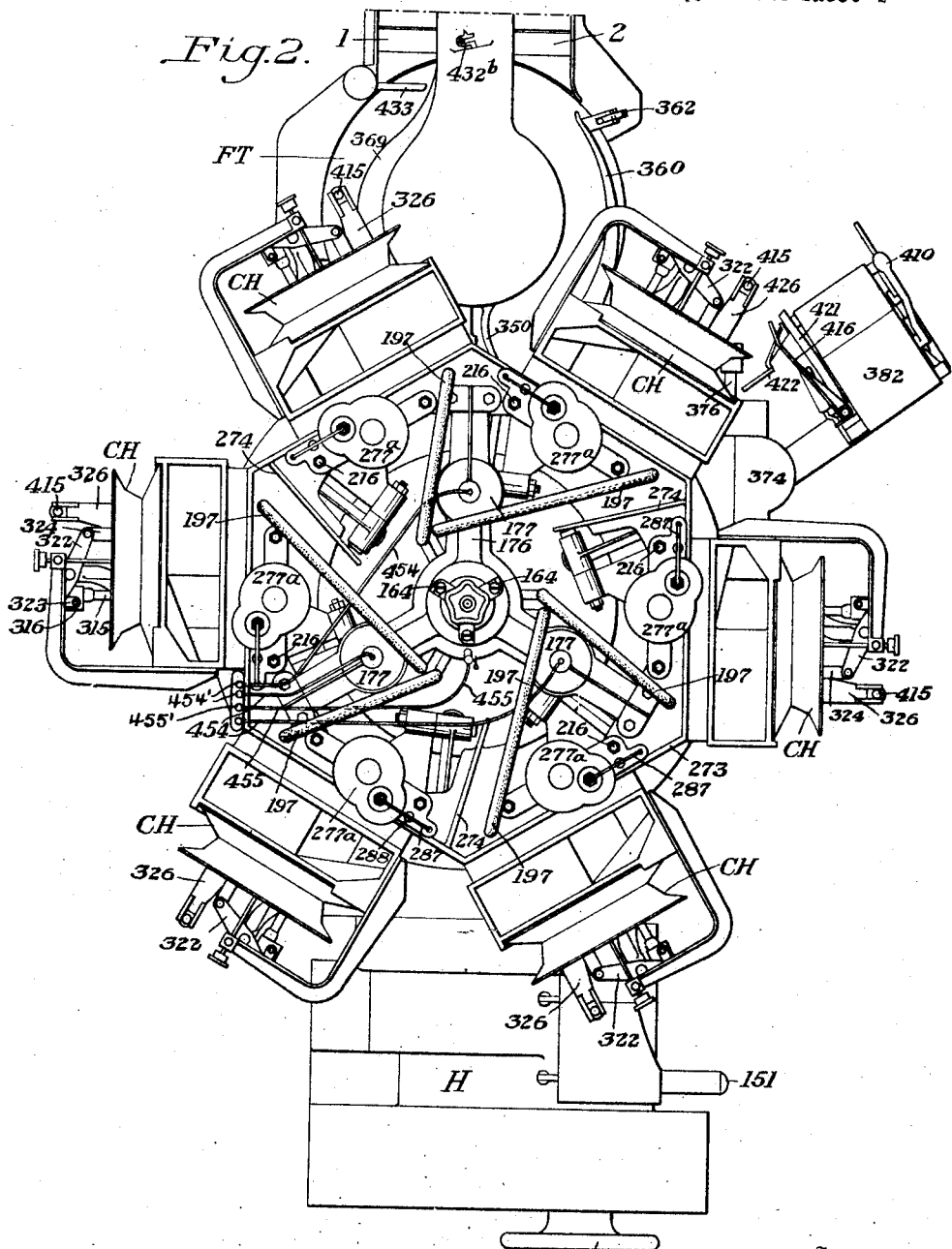

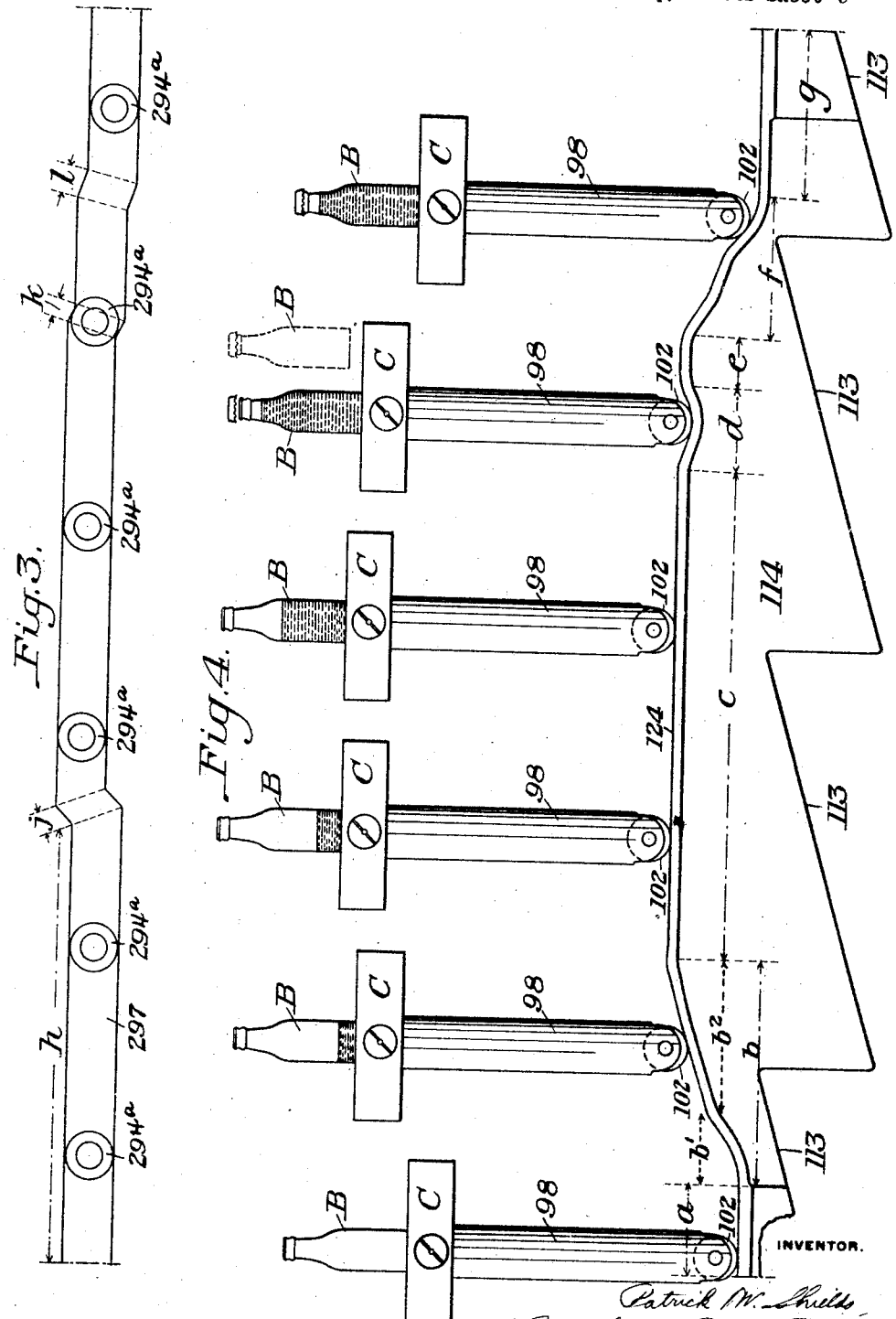

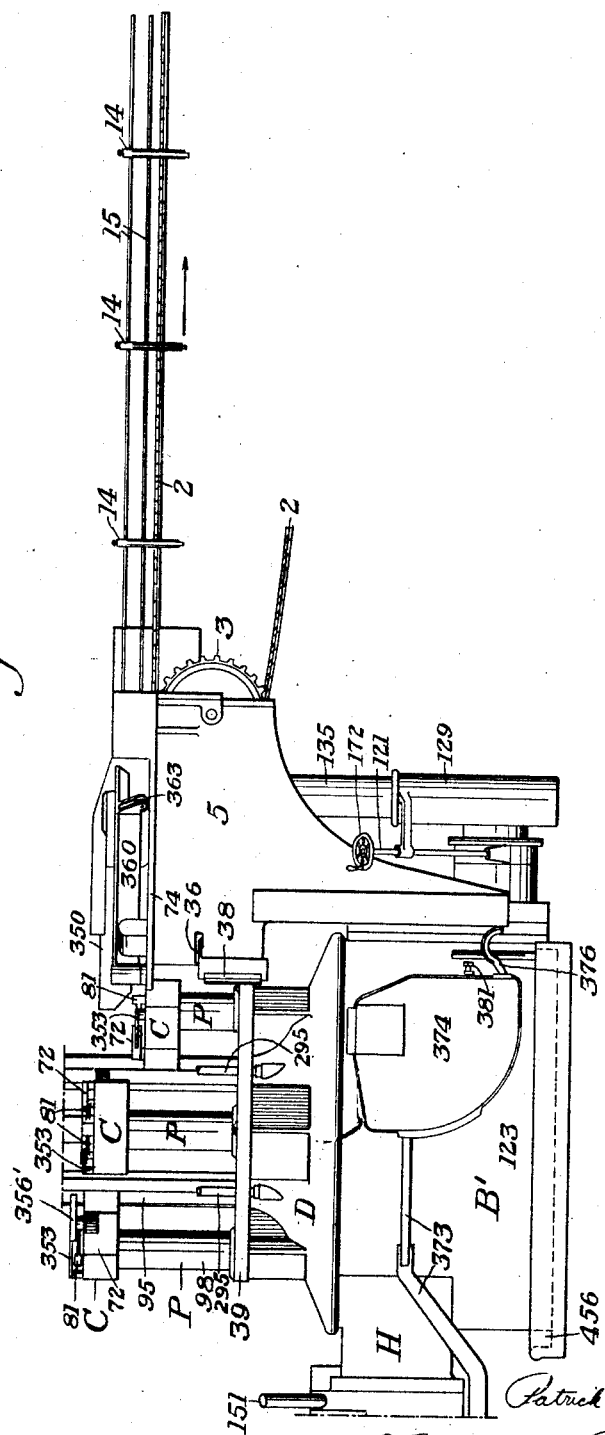

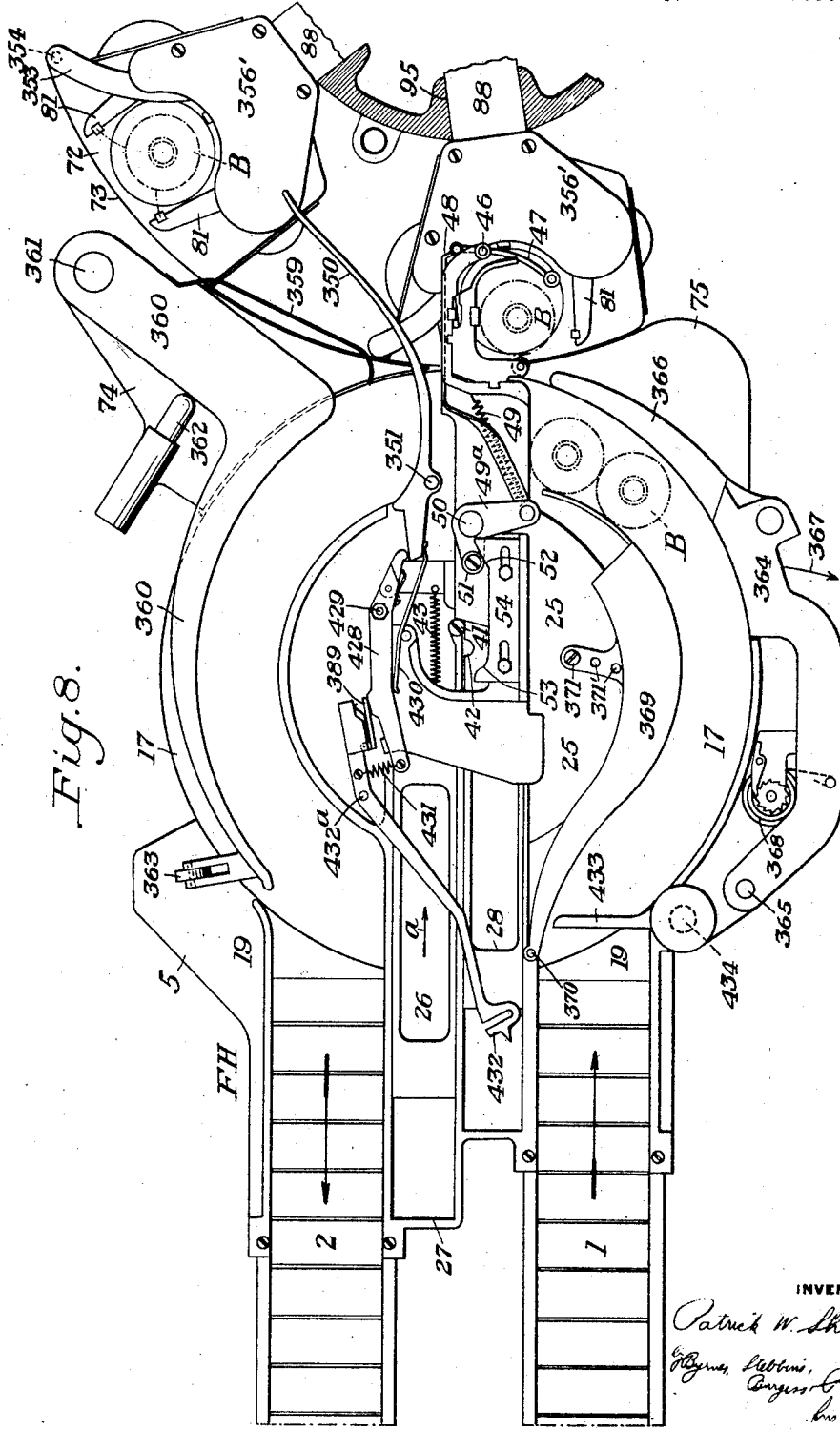

March 15, 1927.

P. W. SHIELDS

BOTTLING MACHINE

Filed Oct. 14, 1921

INVENTOR.
Patrick W. Shields
his Attys

March 15, 1927.

P. W. SHIELDS

BOTTLING MACHINE

Filed Oct. 14, 1921

INVENTOR.
Patrick W. Shields,

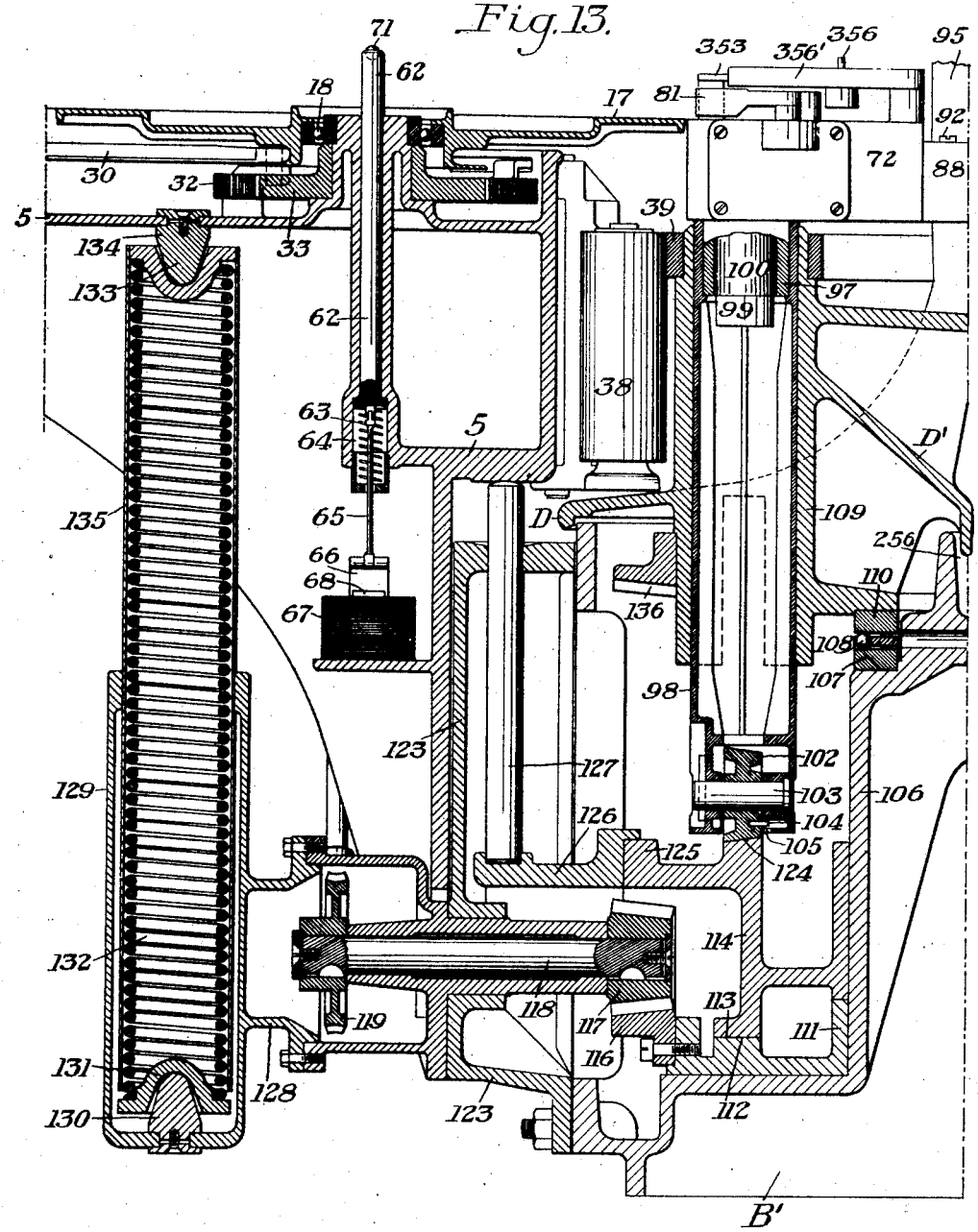

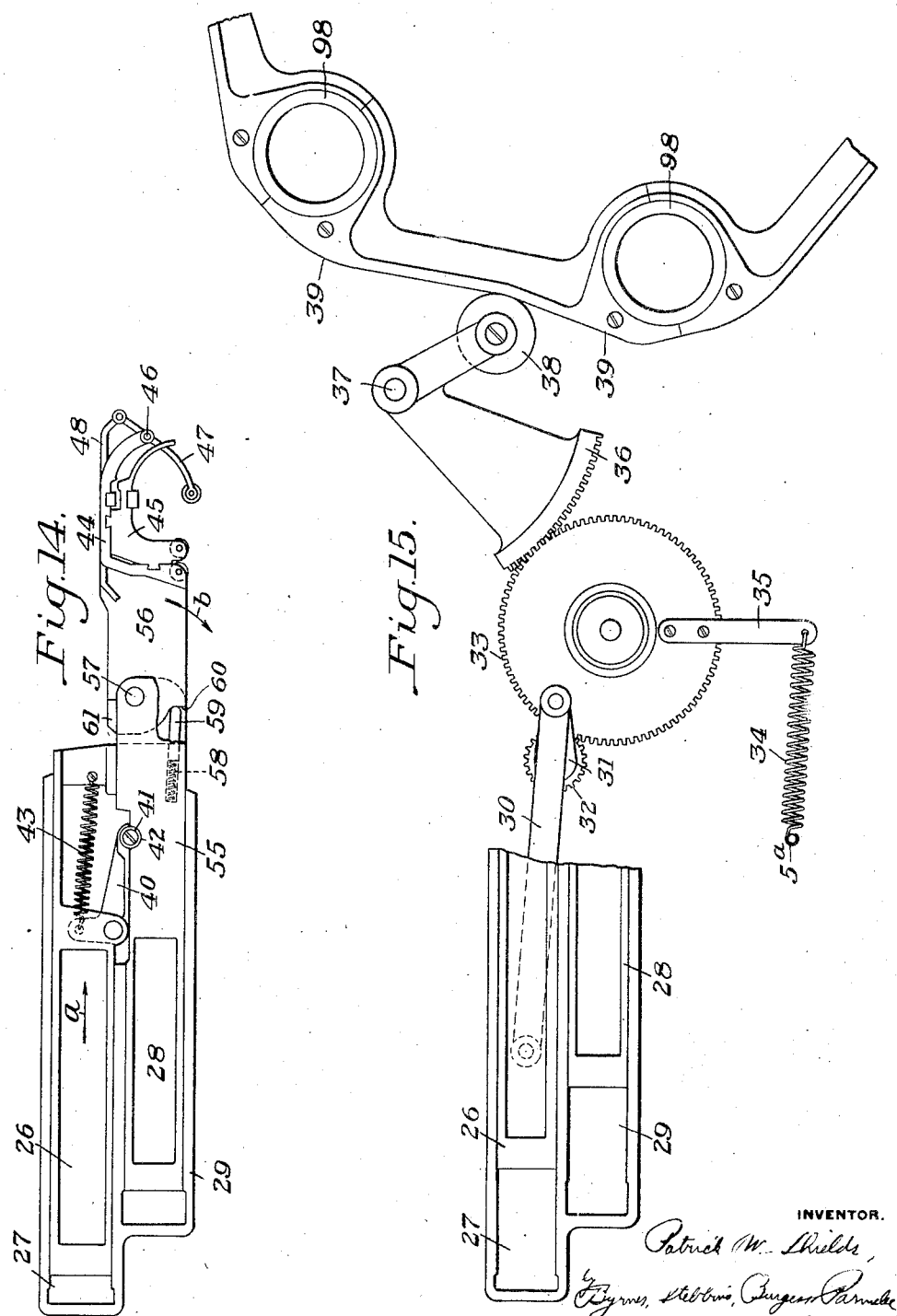

March 15, 1927.  
P. W. SHIELDS  
1,621,470  
BOTTLING MACHINE  
Filed Oct. 14, 1921  
40 Sheets-Sheet 11

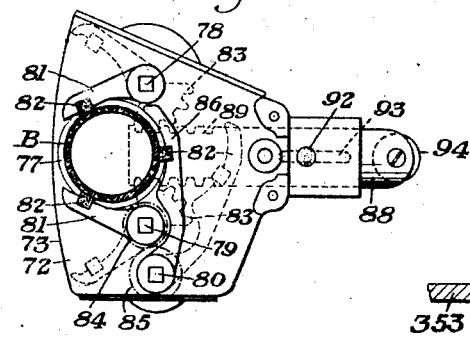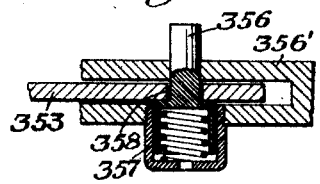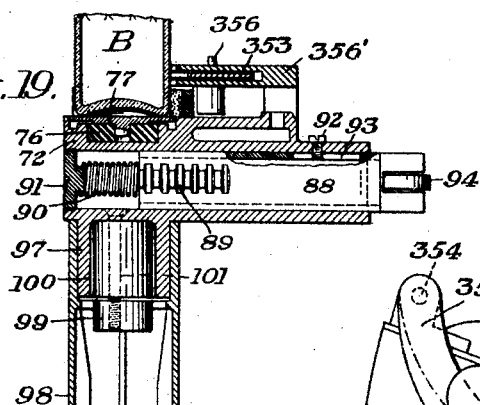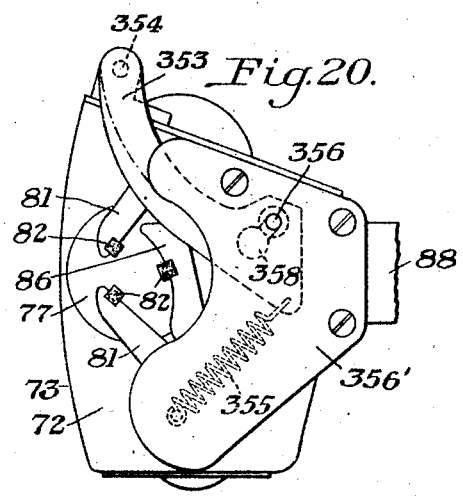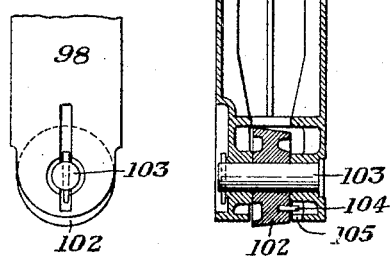

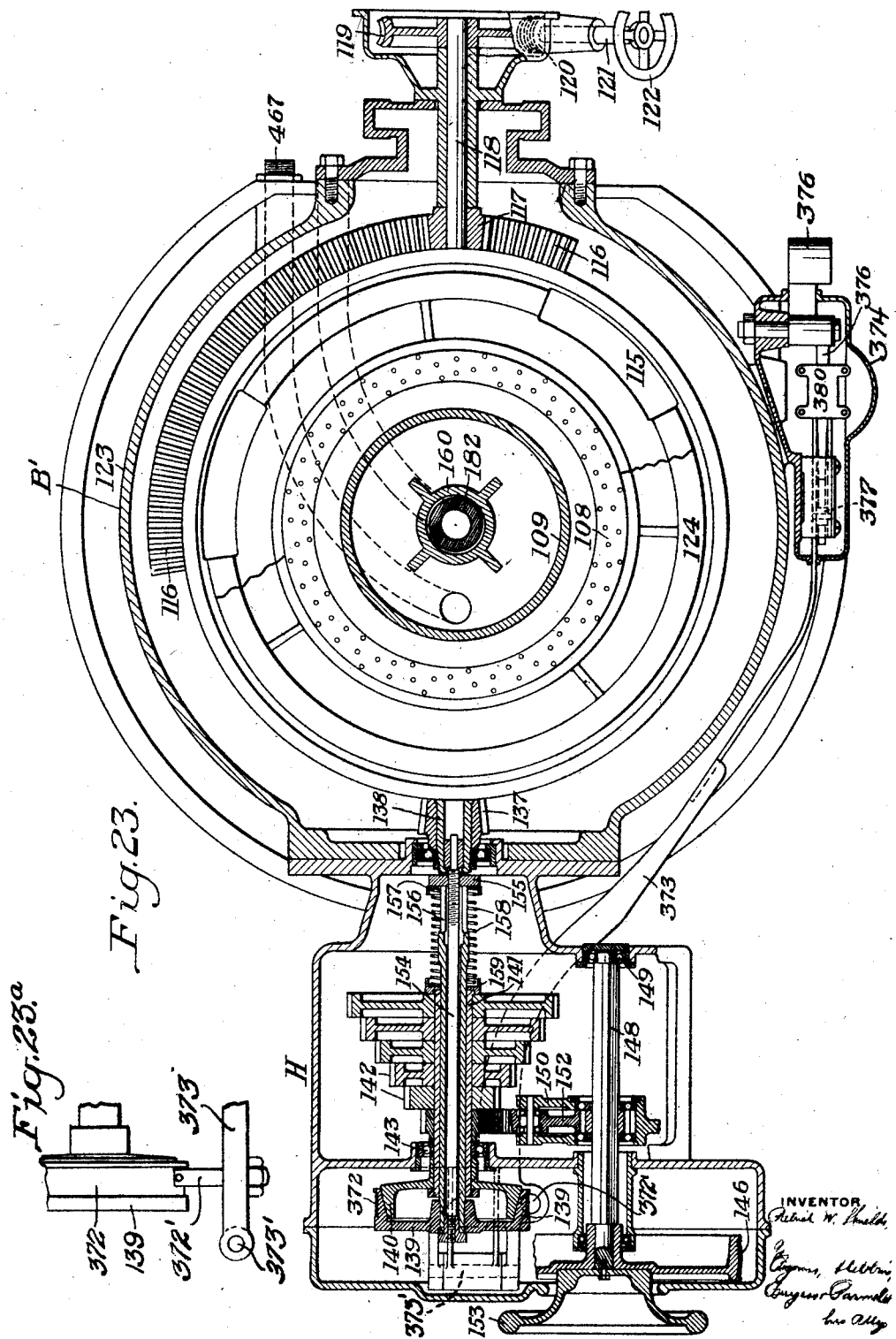

March 15, 1927.

P. W. SHIELDS

BOTTLING MACHINE

Filed Oct. 14, 1921

Inventor
Patrick W. Shields,
By Byrnes, Stebbins, Burgess & Parmelee,
his Attorneys.

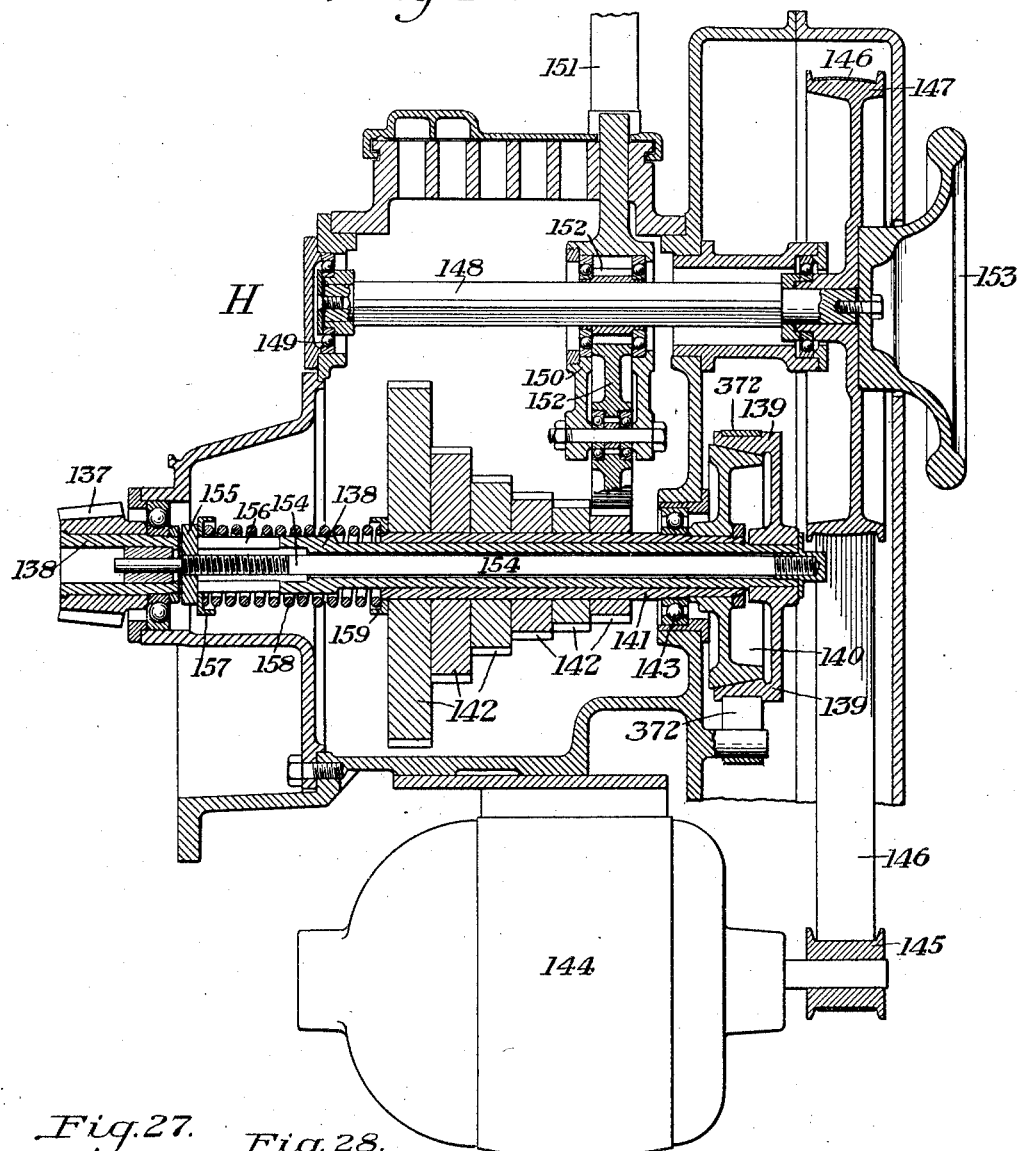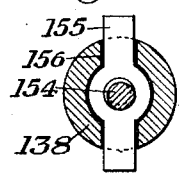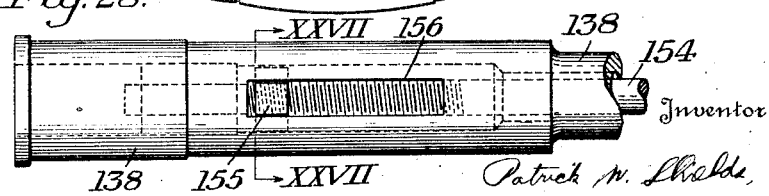

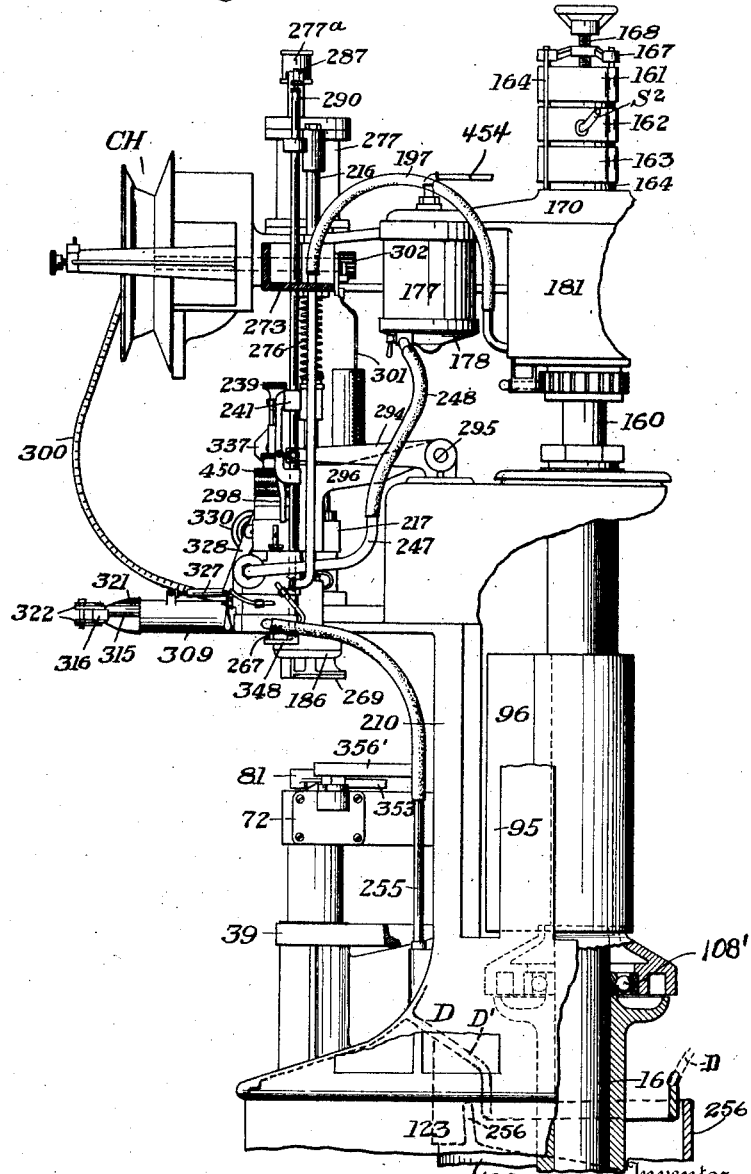

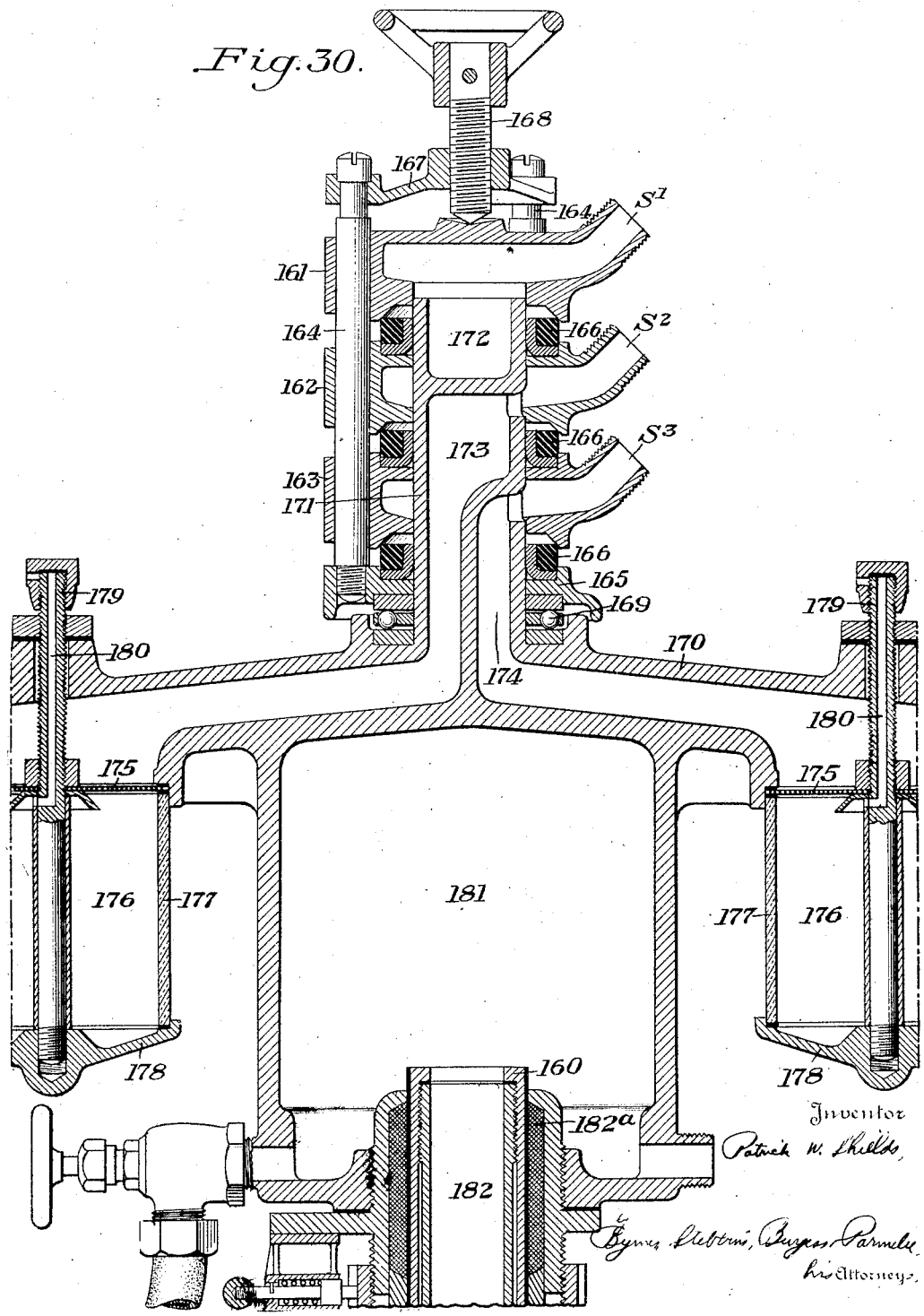

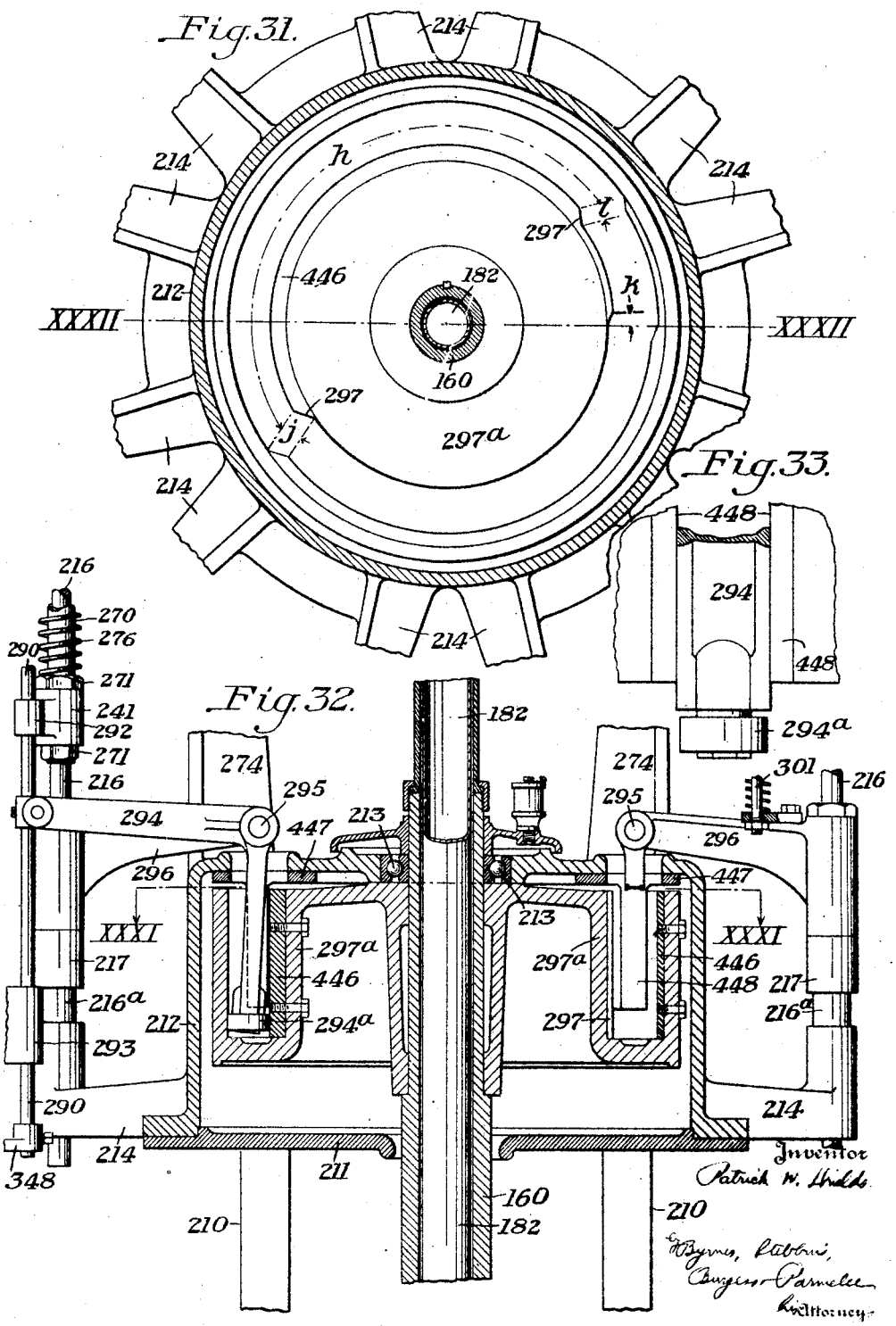

March 15, 1927.  1,621,470
P. W. SHIELDS
BOTTLING MACHINE
Filed Oct. 14, 1921   40 Sheets-Sheet 19

Inventor
Patrick W. Shields,
By Byrnes, Stebbins, Burgess & Parmelee
his Attorneys

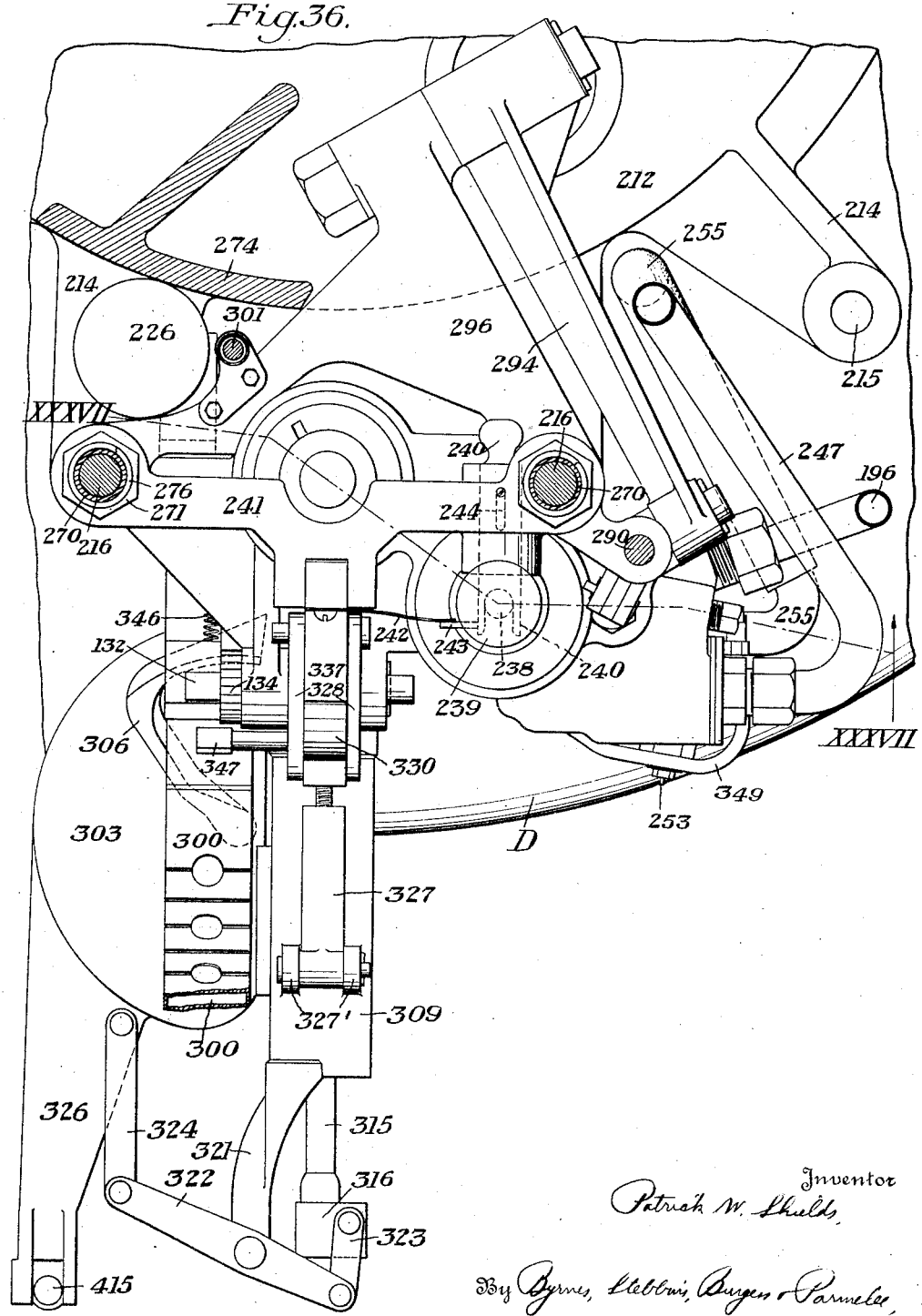

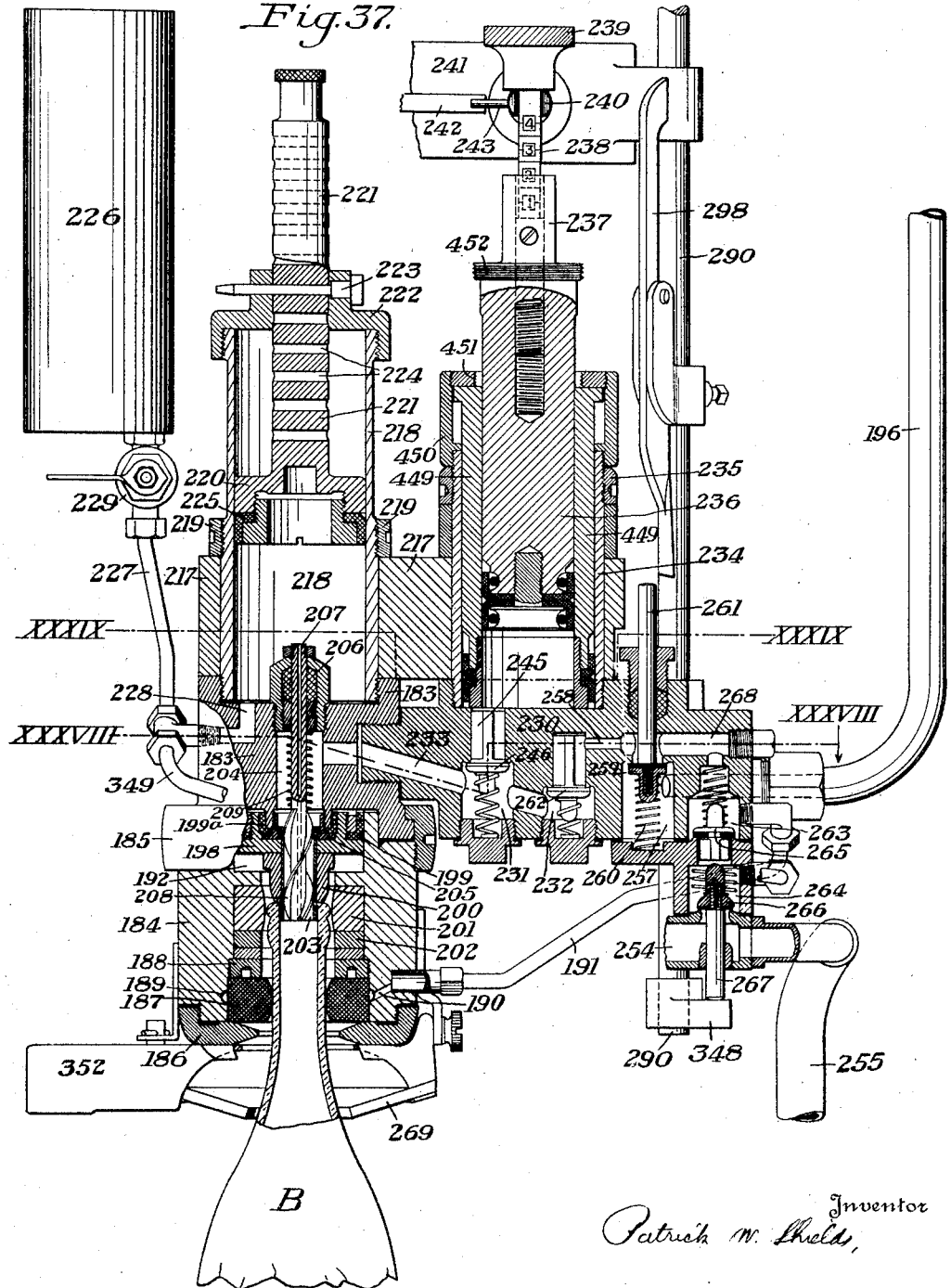

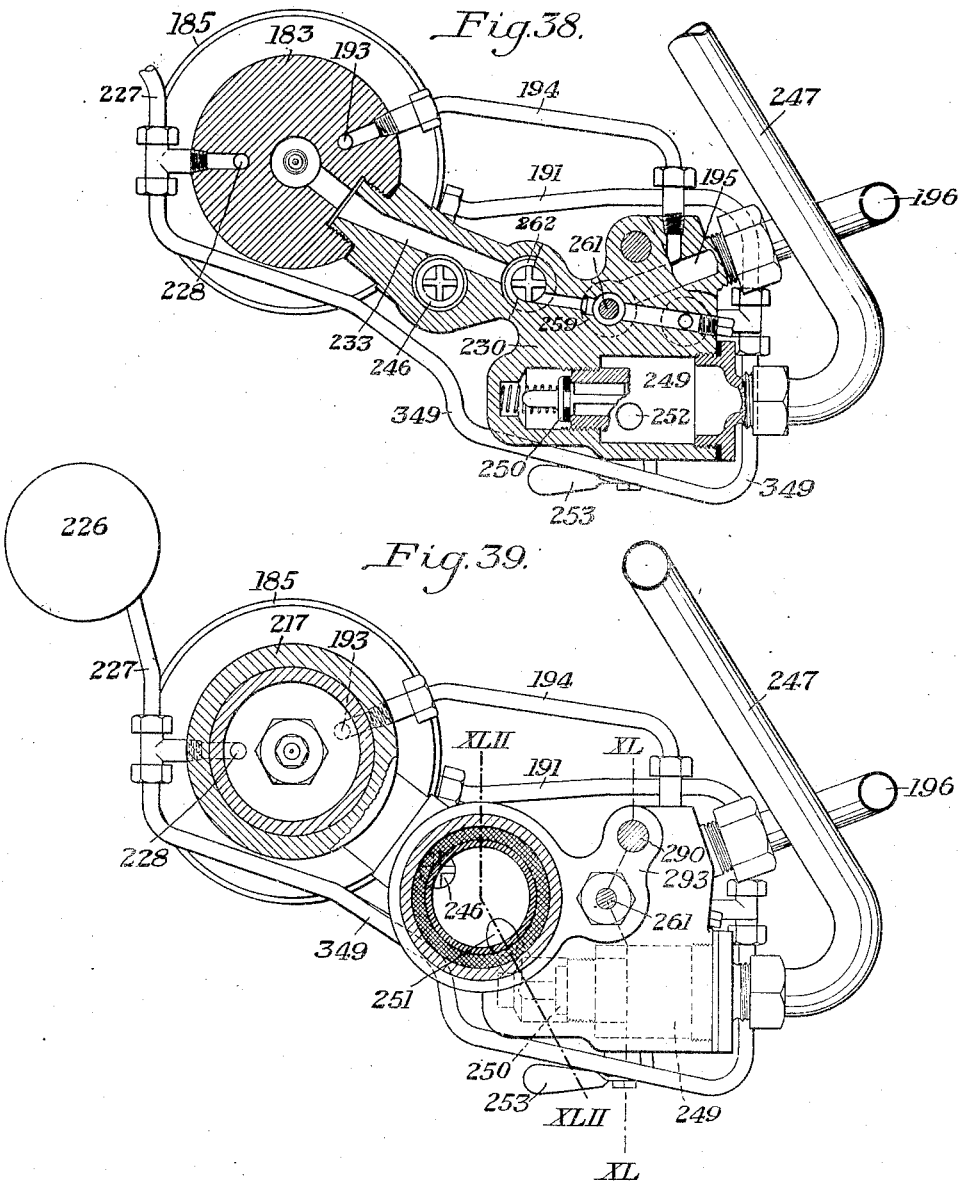

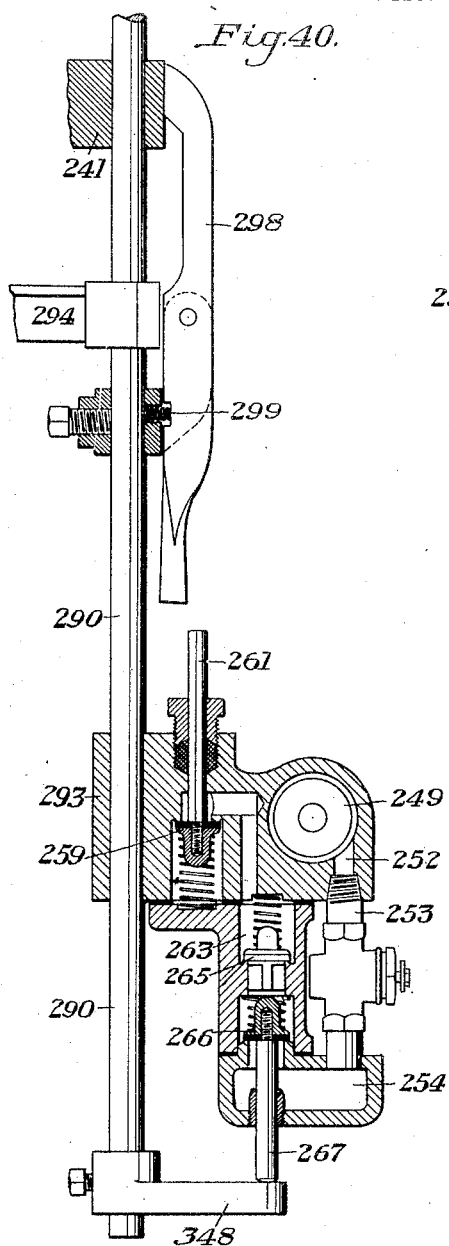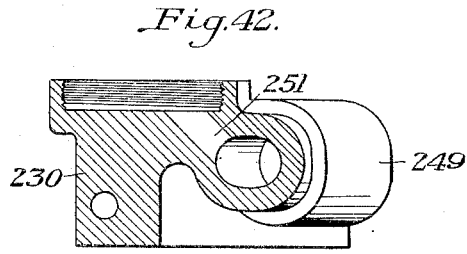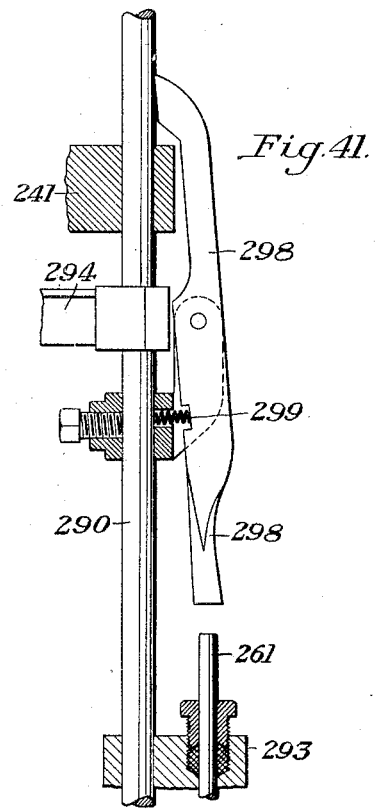

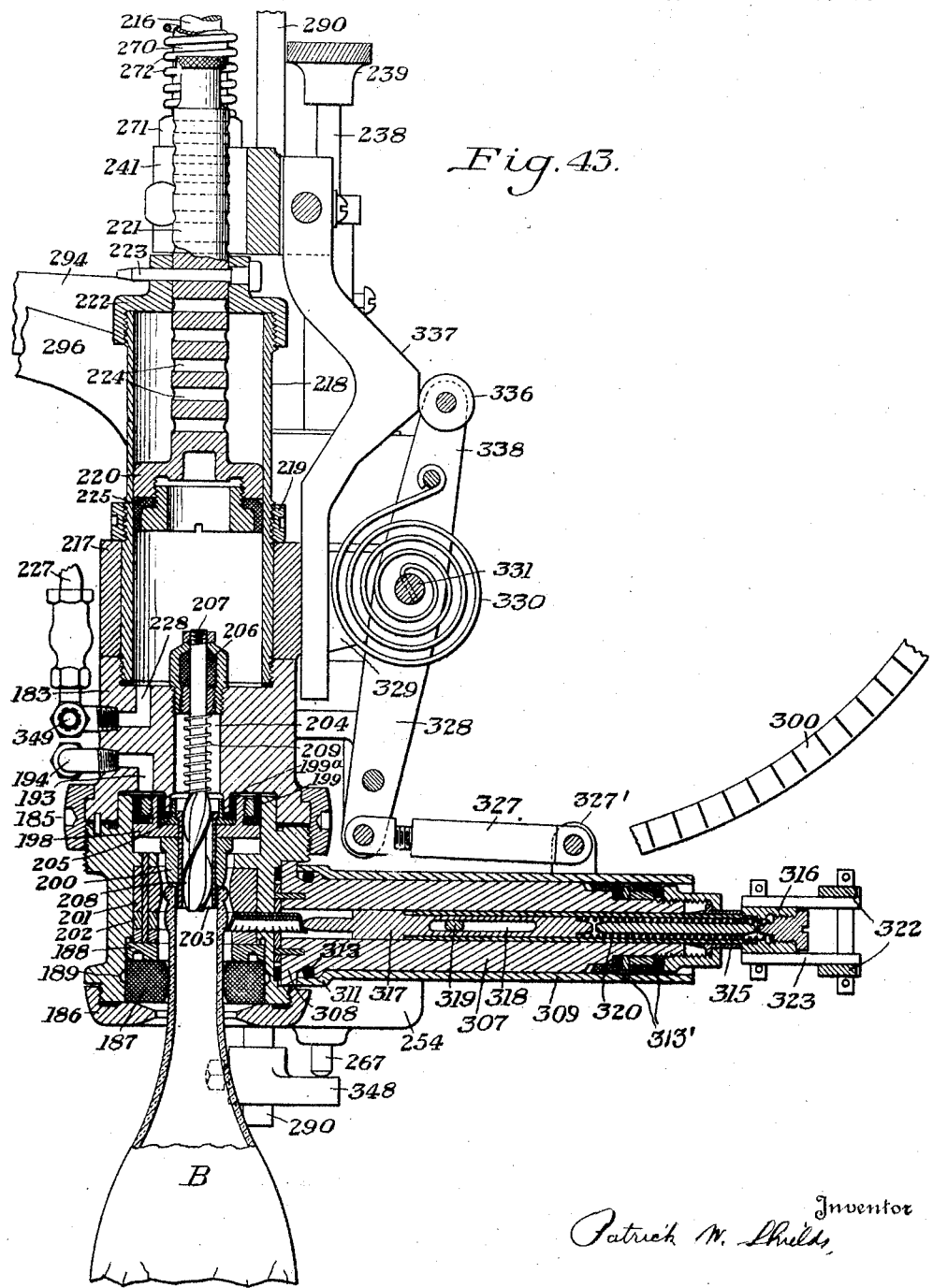

March 15, 1927.  P. W. SHIELDS  1,621,470
BOTTLING MACHINE
Filed Oct. 14, 1921     40 Sheets-Sheet 25
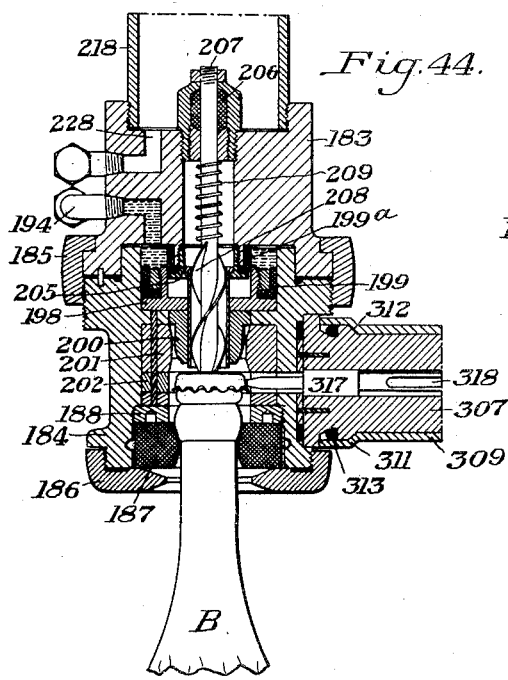
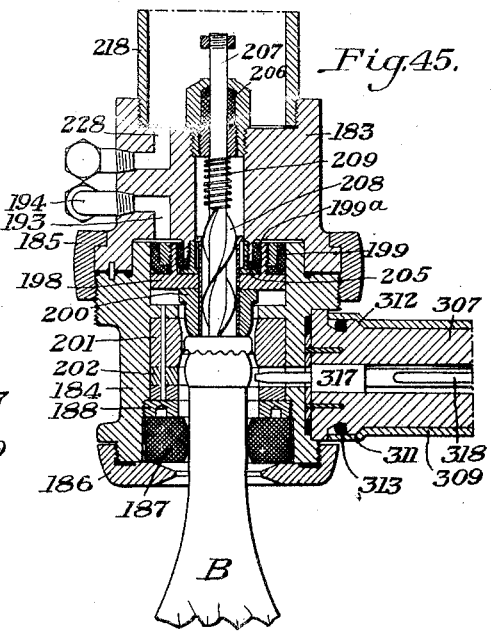
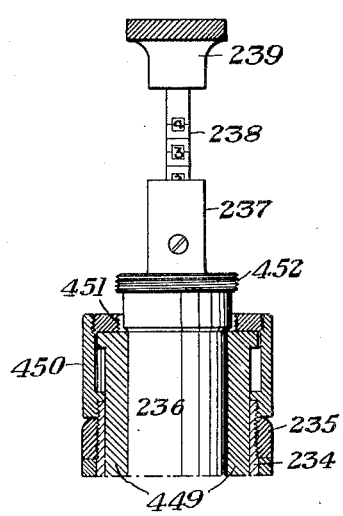
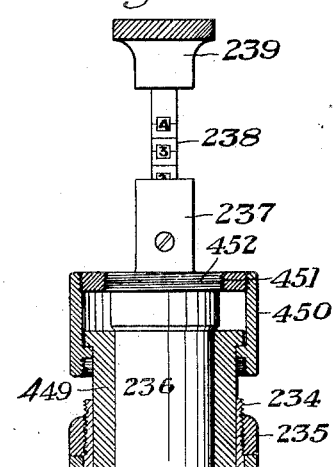
INVENTOR.

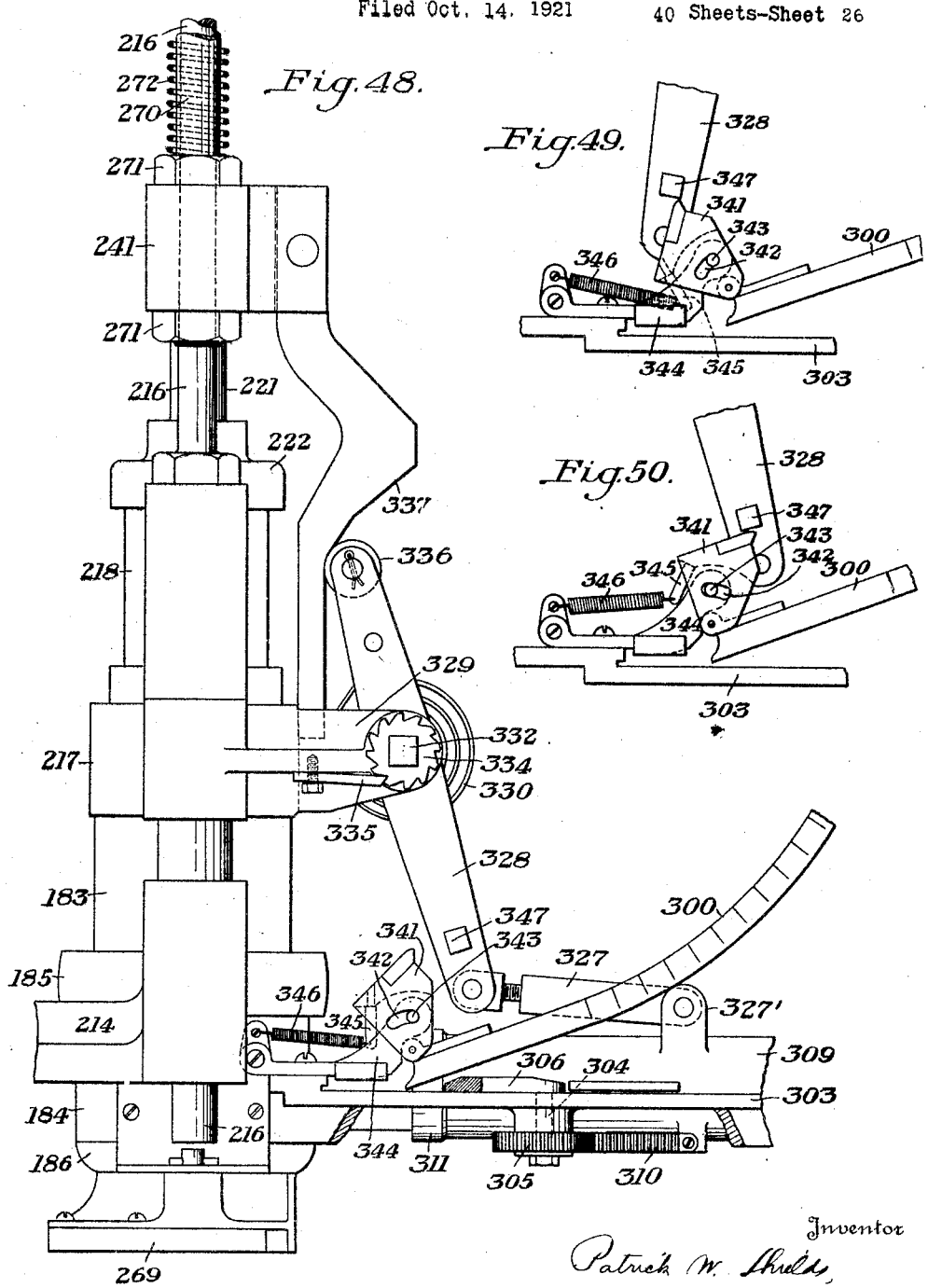

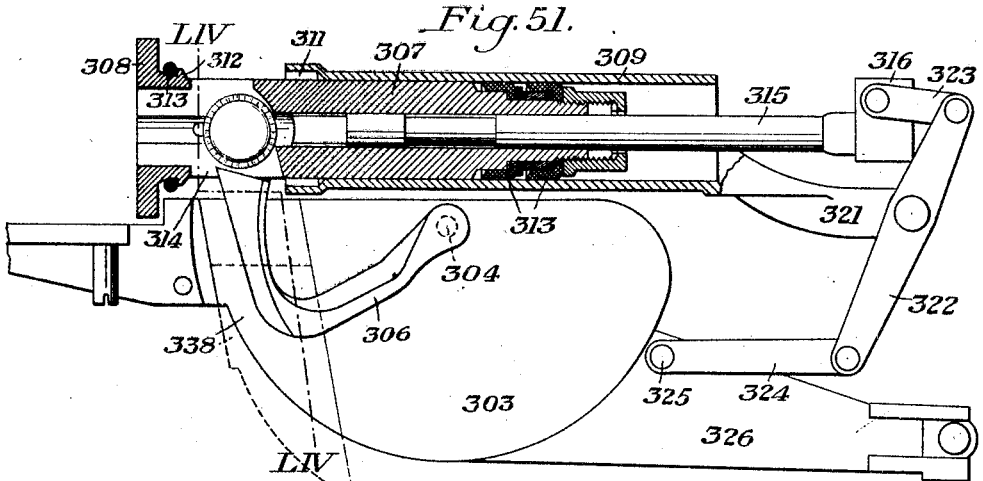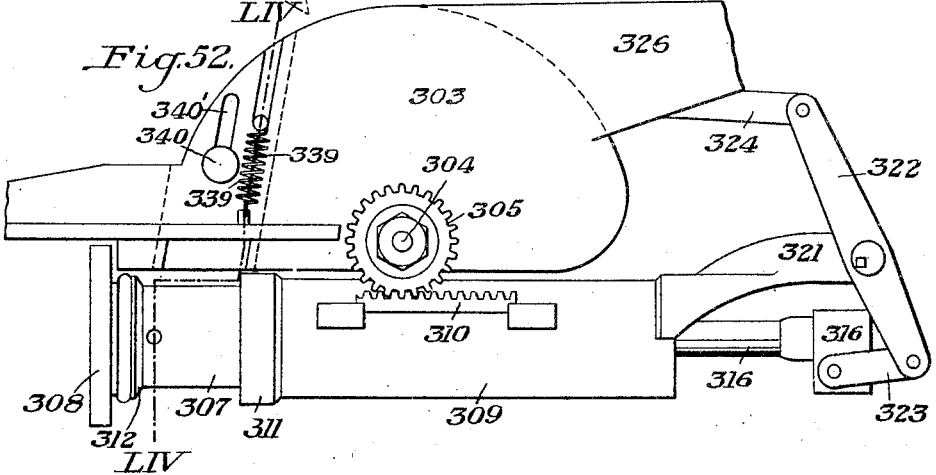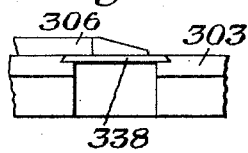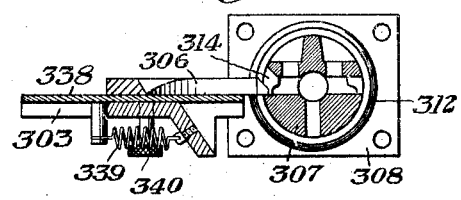

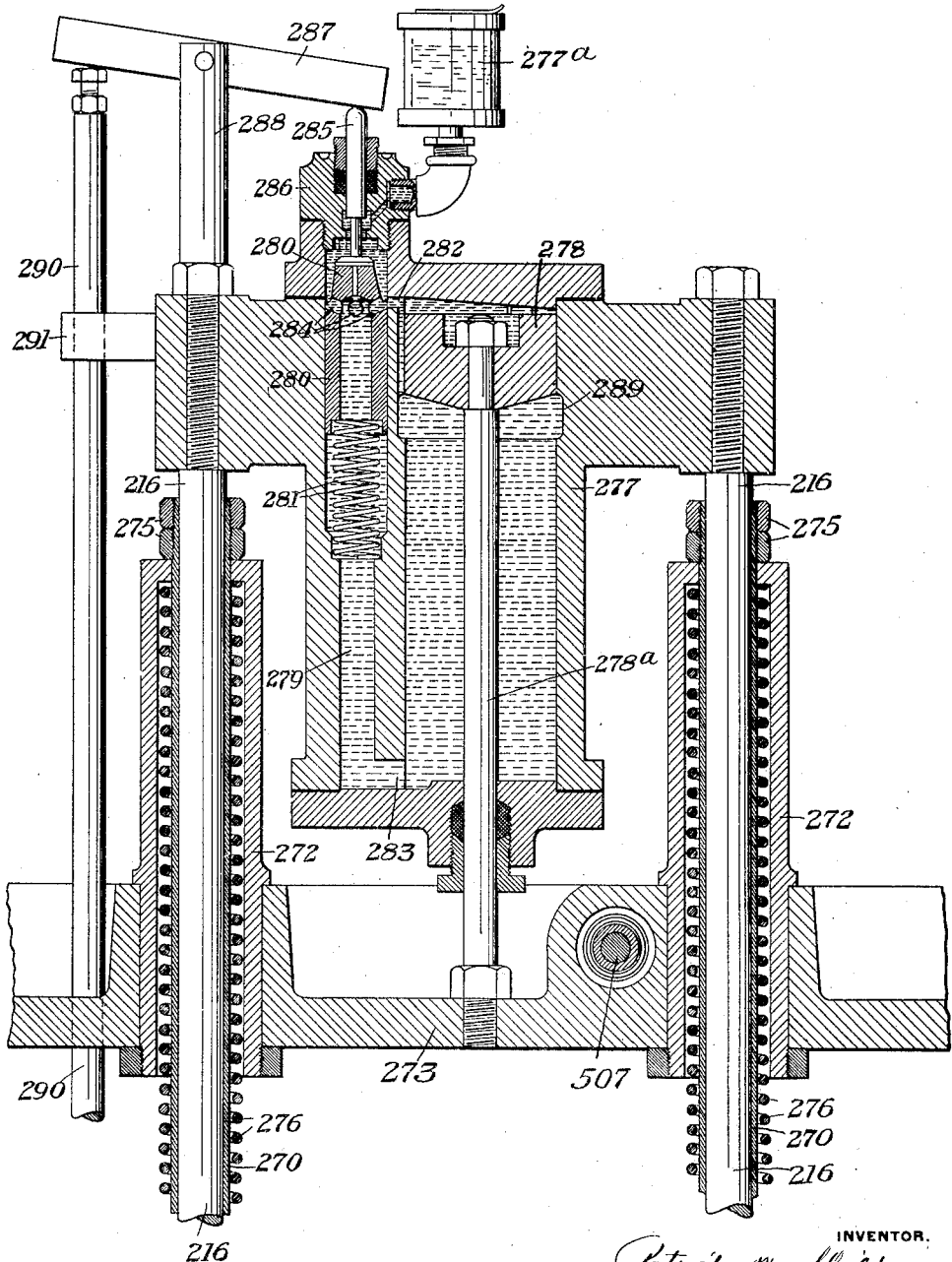

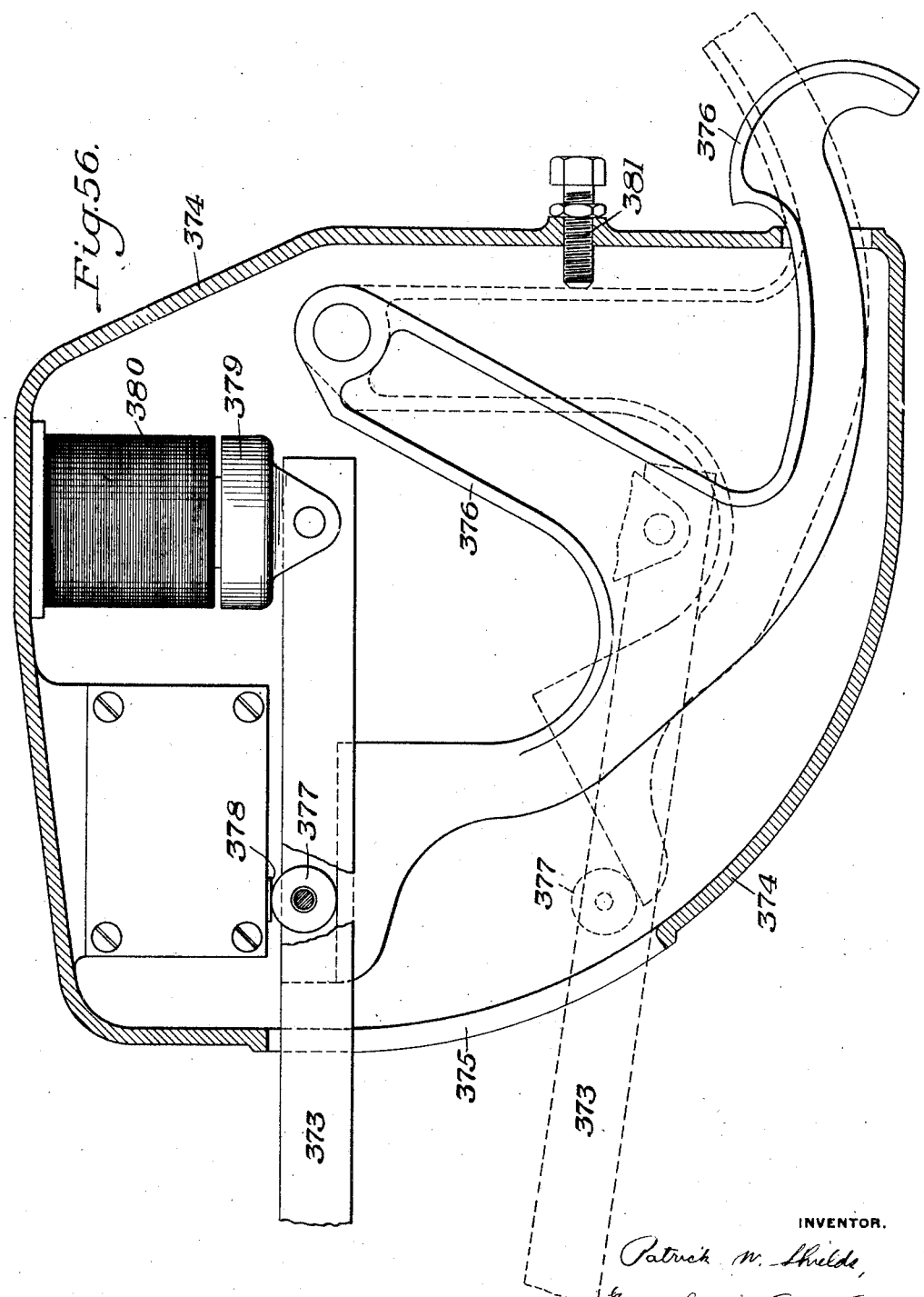

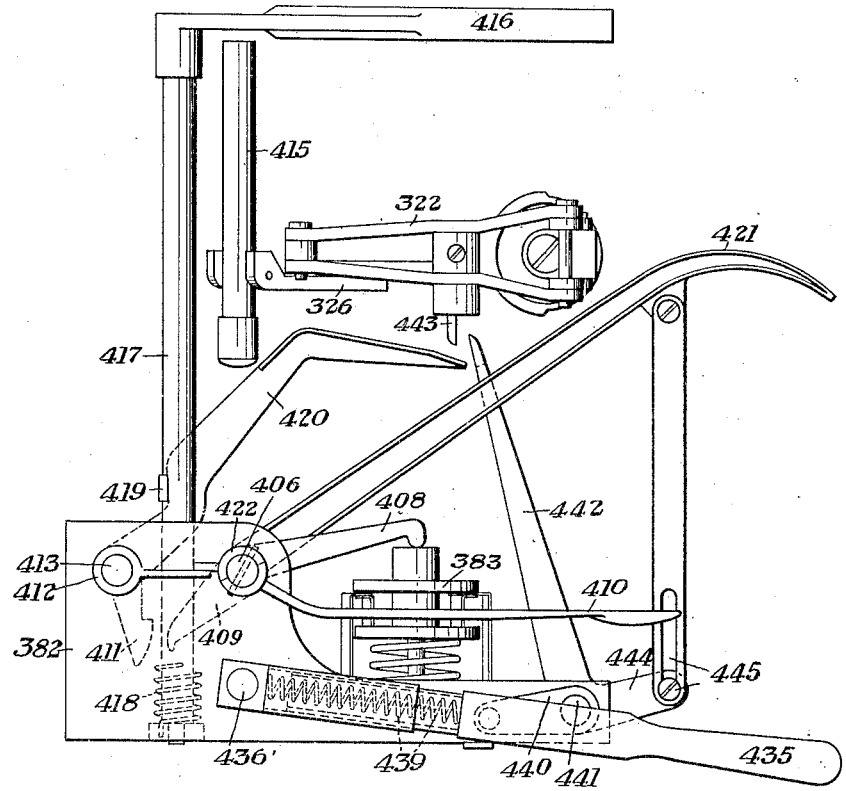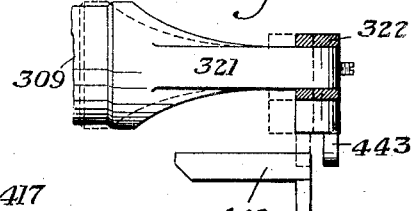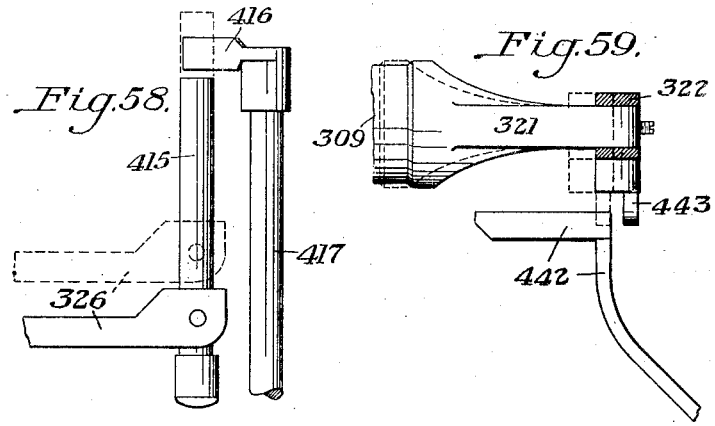

March 15, 1927.  1,621,470
P. W. SHIELDS
BOTTLING MACHINE
Filed Oct. 14, 1921  40 Sheets-Sheet 31
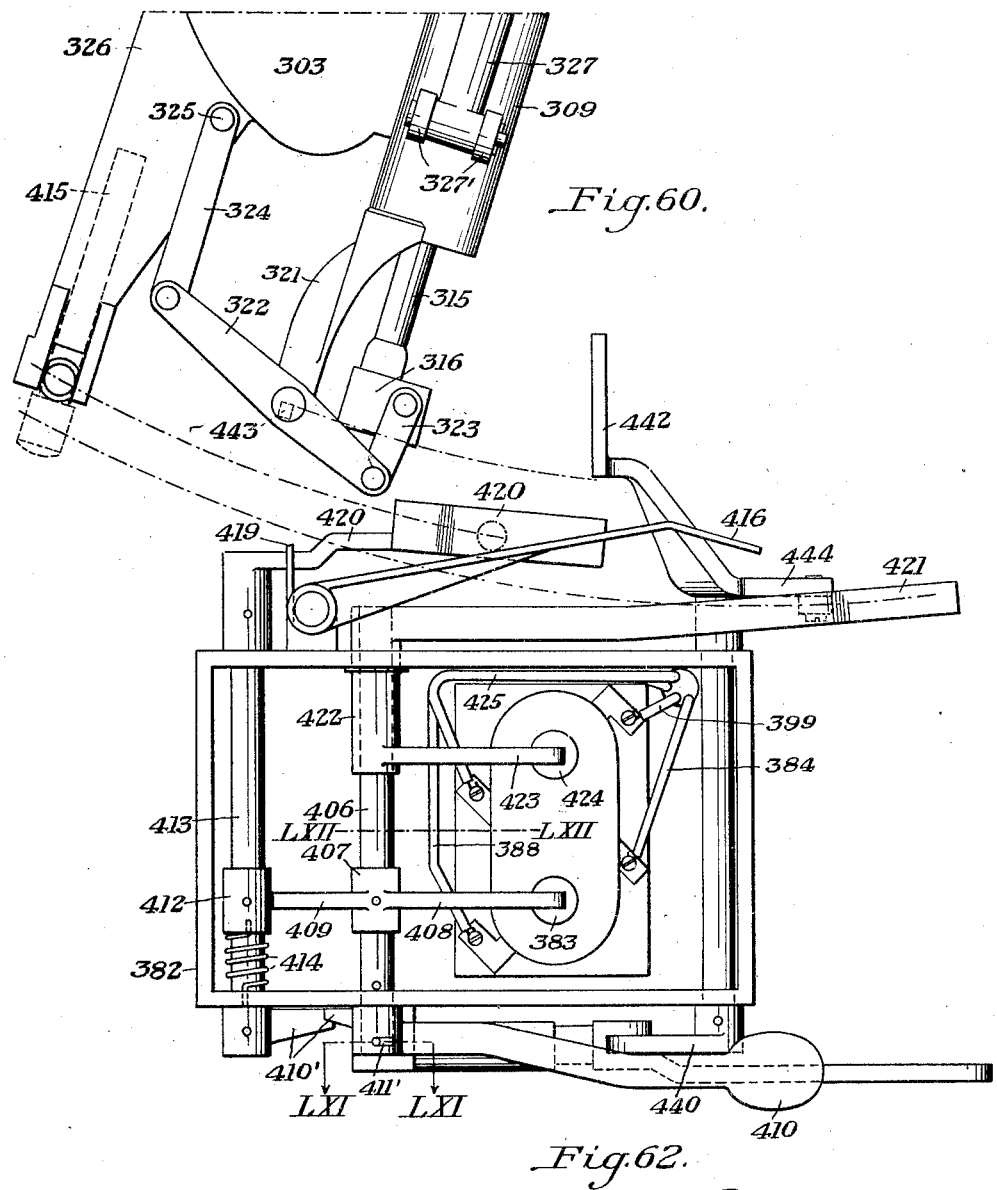

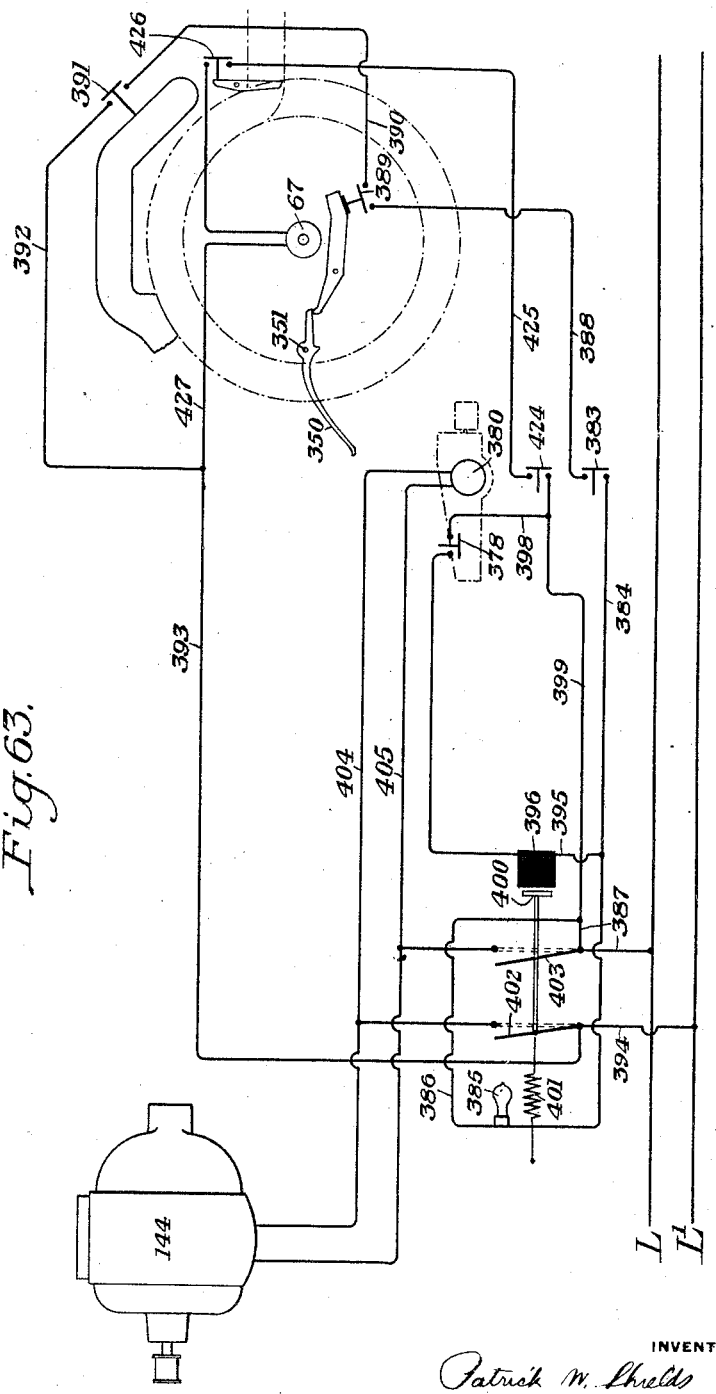

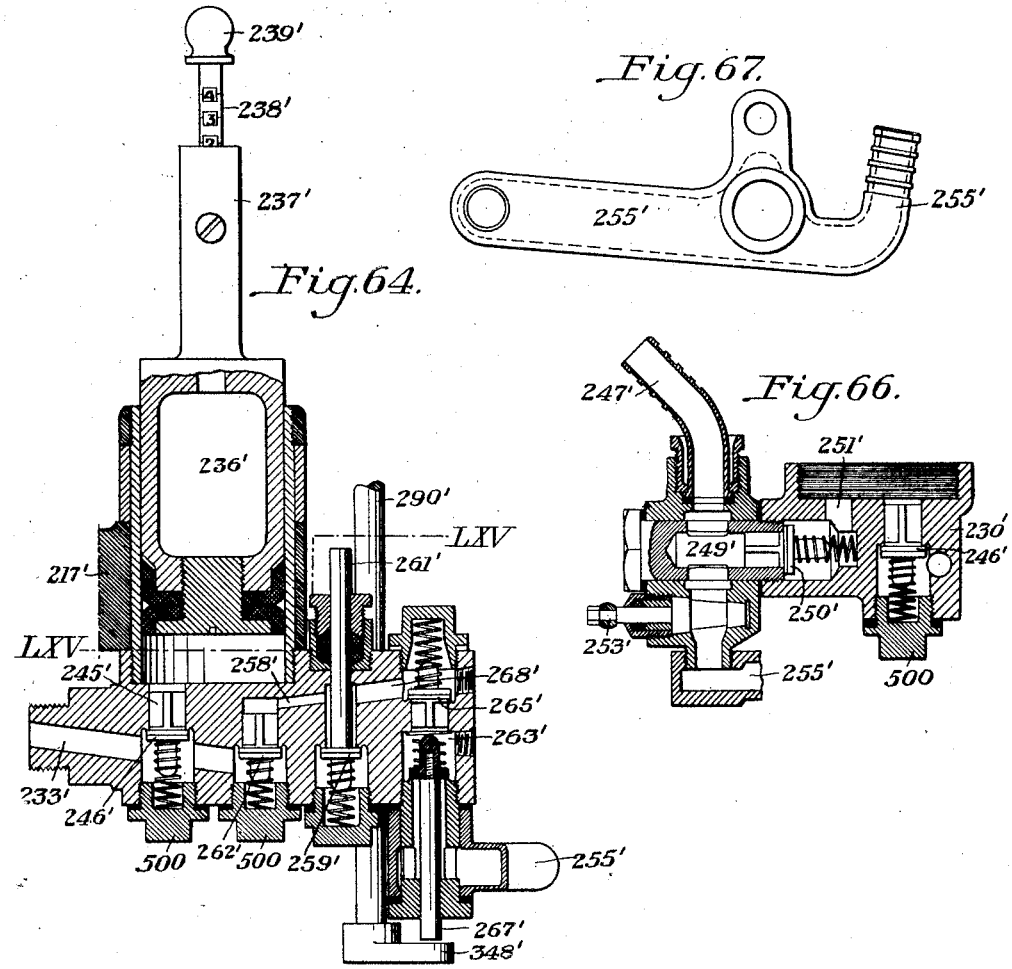
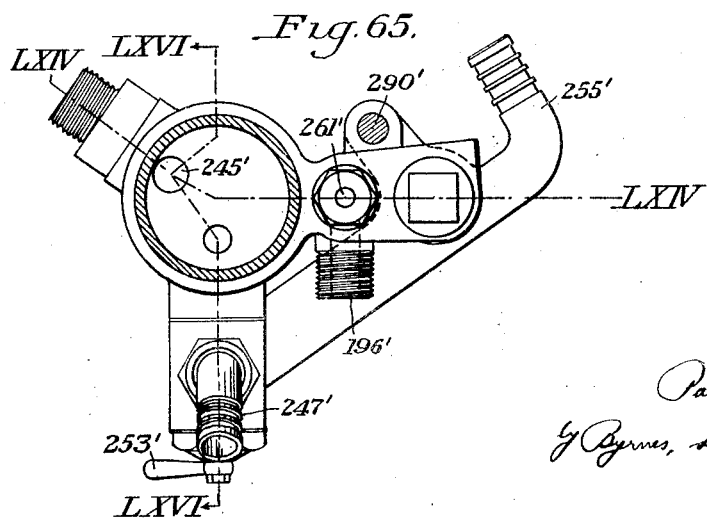

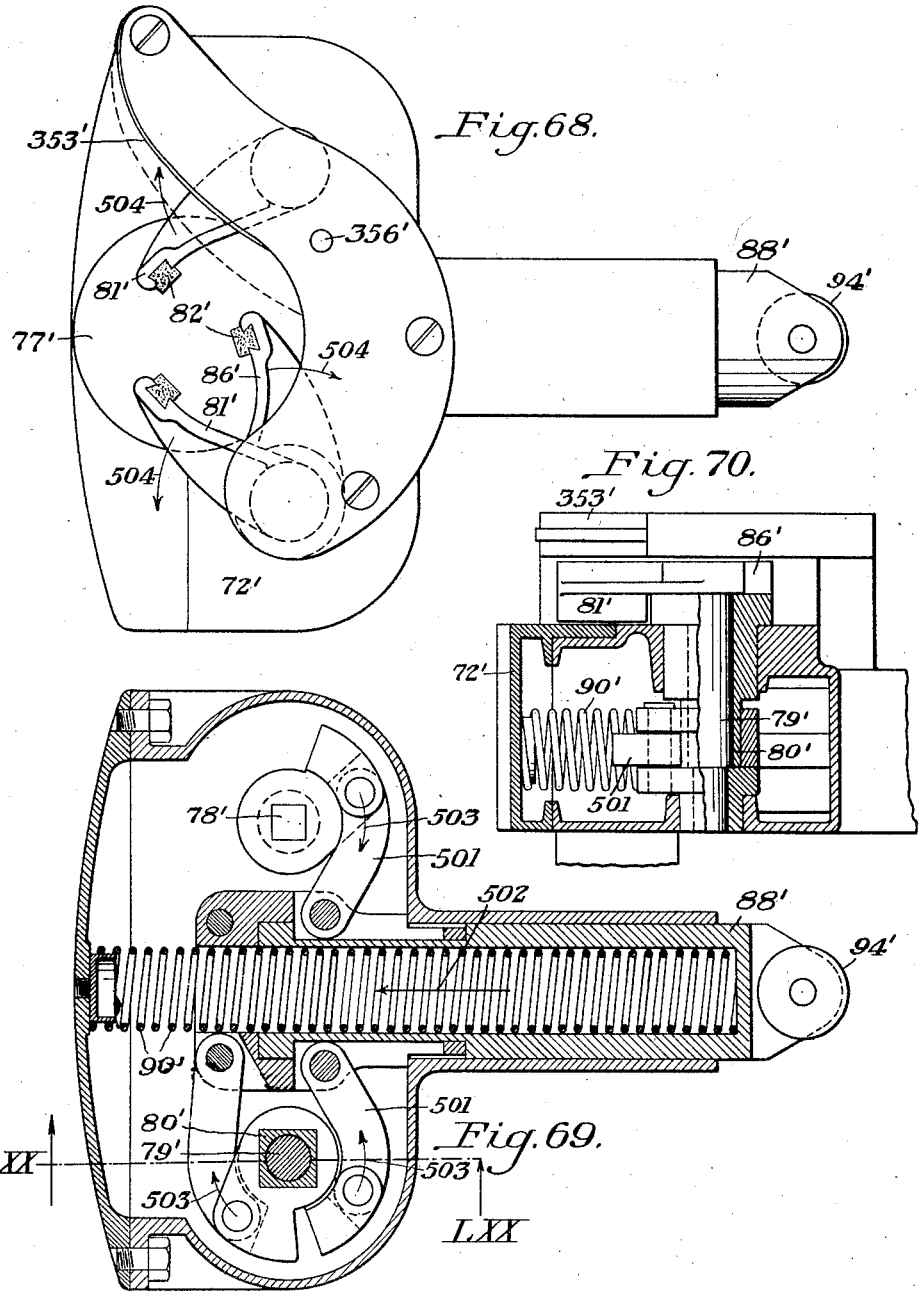

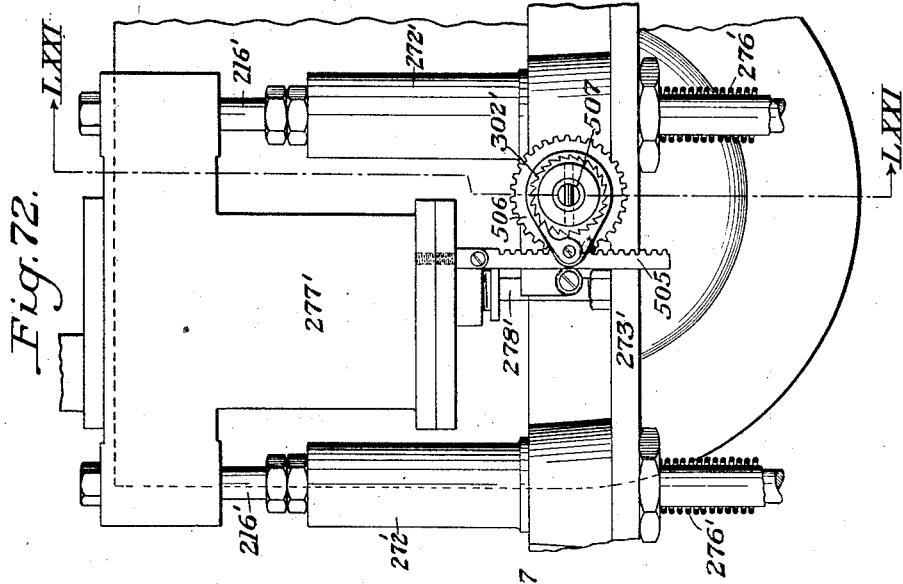
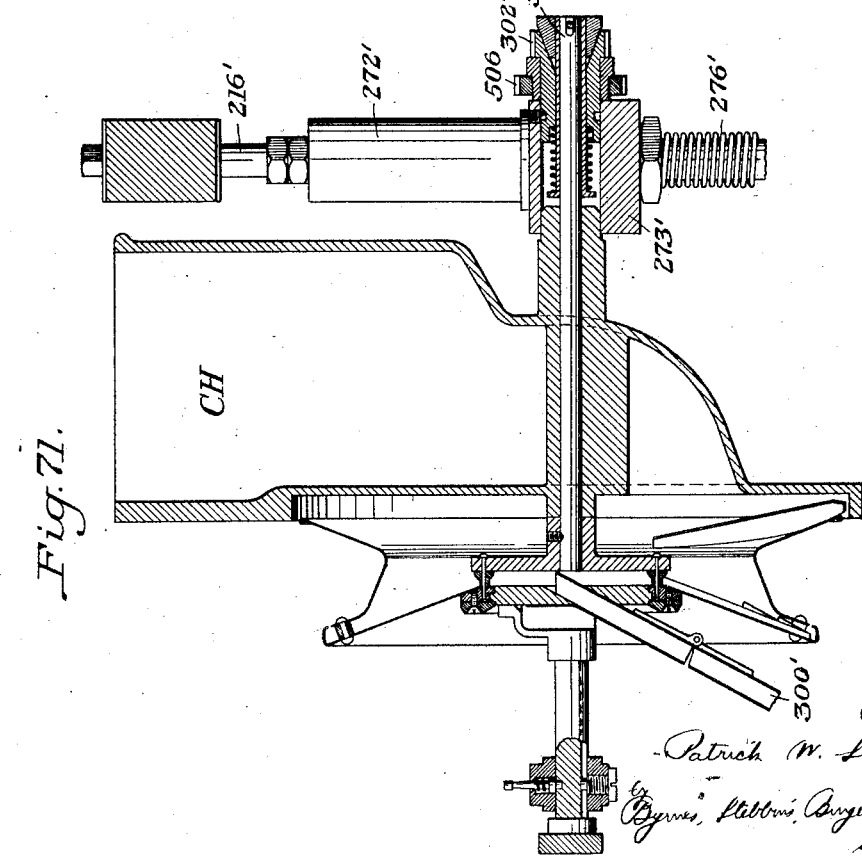

March 15, 1927.
P. W. SHIELDS
BOTTLING MACHINE
Filed Oct. 14, 1921
1,621,470
40 Sheets-Sheet 36
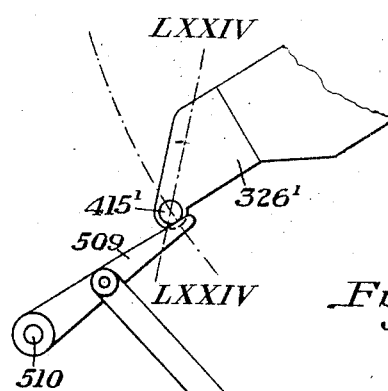
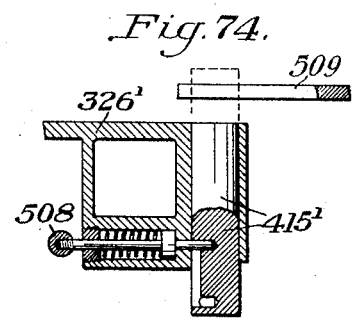
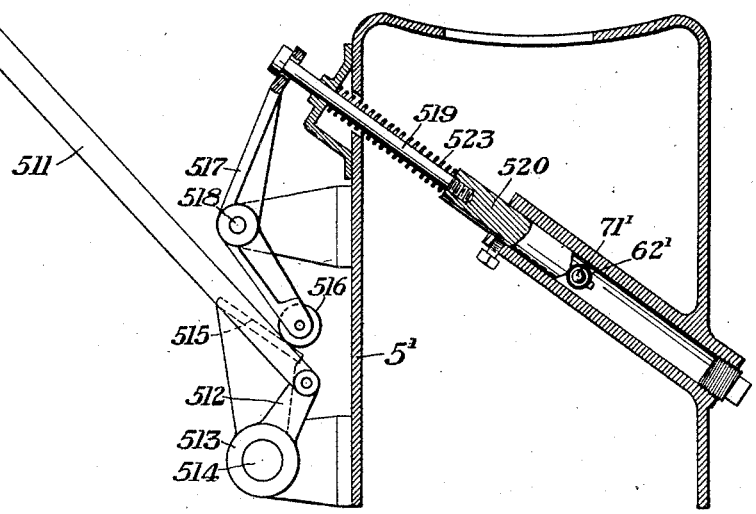
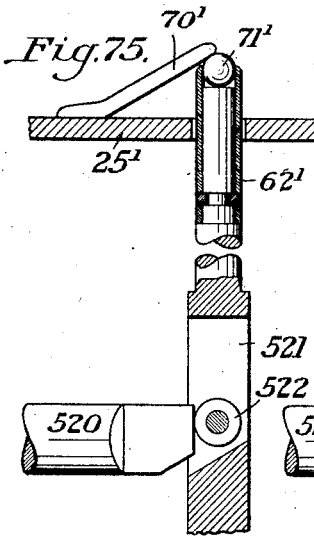
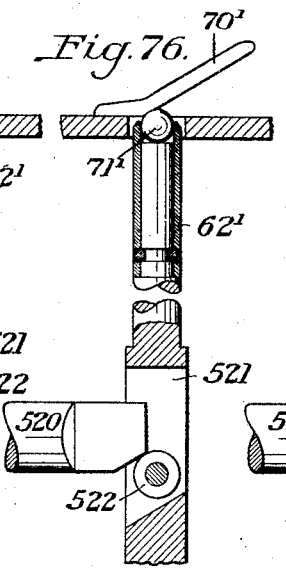
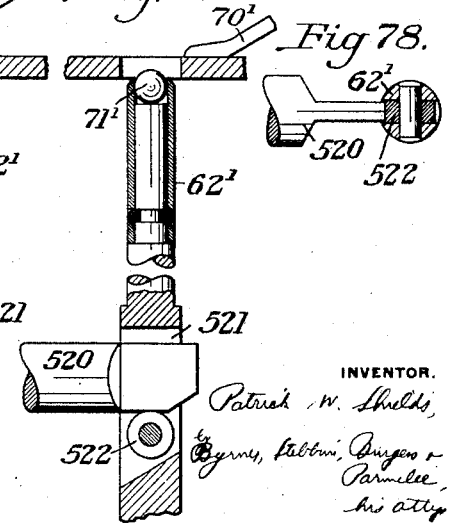

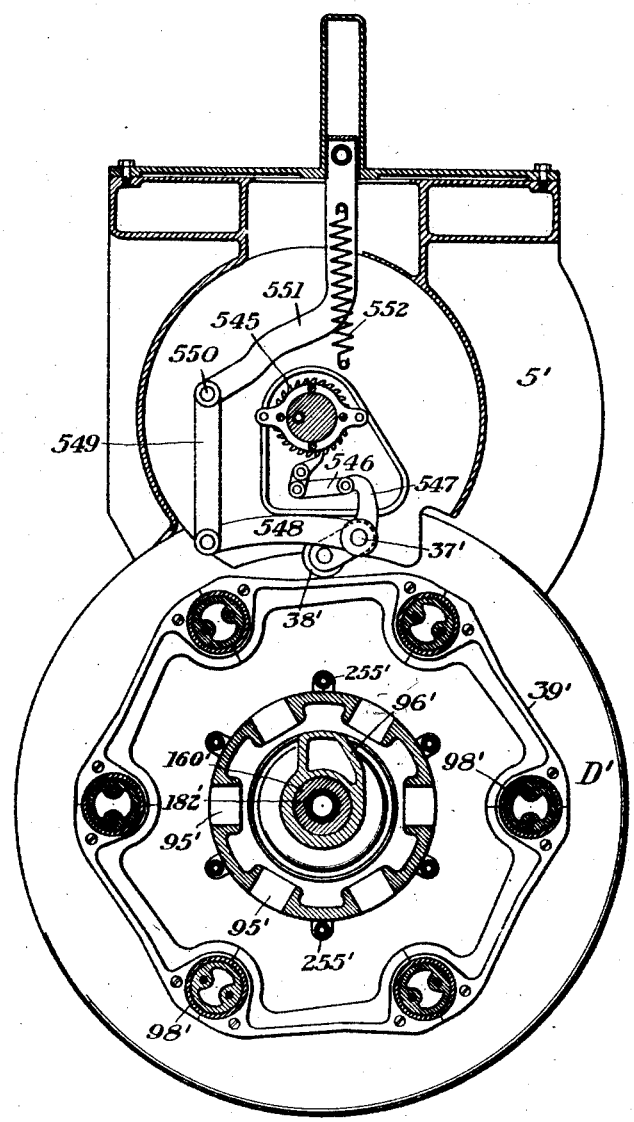

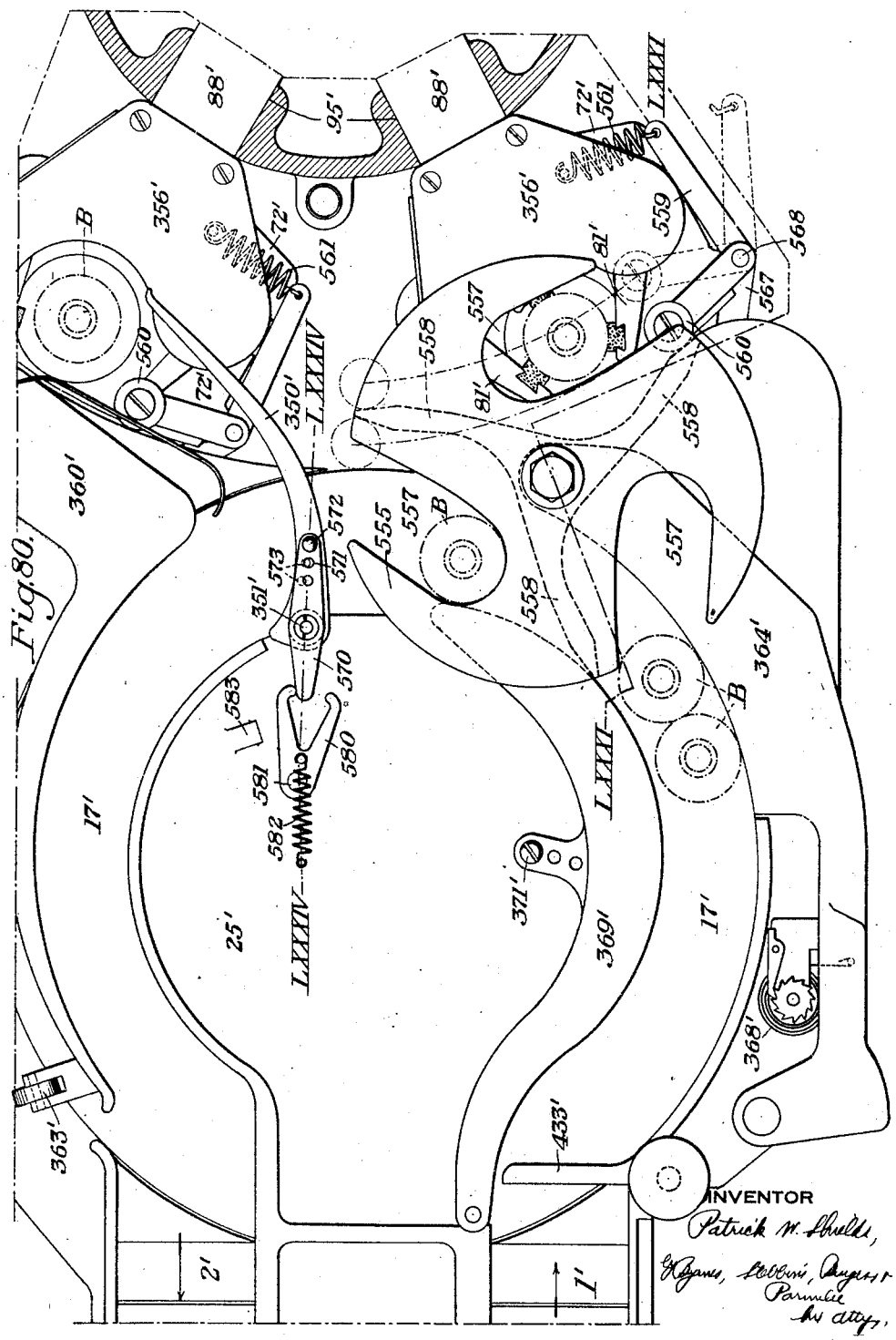

March 15, 1927.
P. W. SHIELDS
BOTTLING MACHINE
Filed Oct. 14, 1921
1,621,470
40 Sheets-Sheet 39
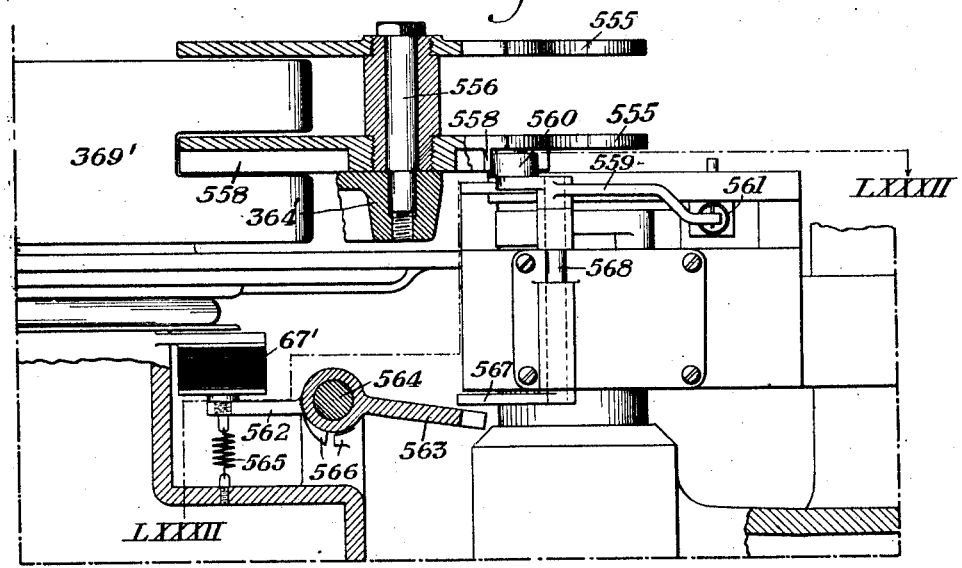
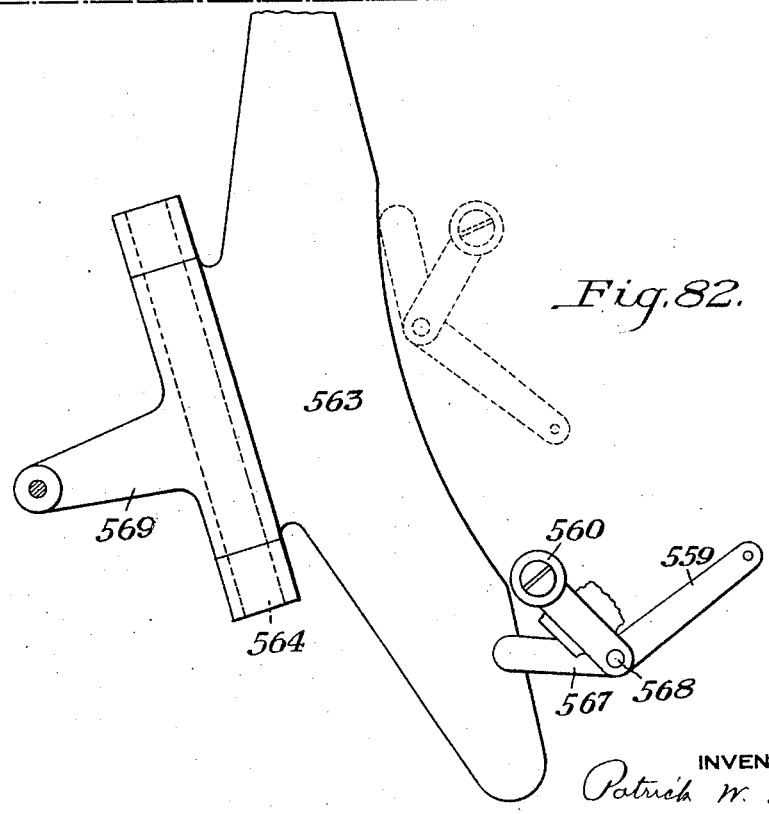
INVENTOR
Patrick W. Shields,
his attys.

March 15, 1927.
P. W. SHIELDS
1,621,470
BOTTLING MACHINE
Filed Oct. 14, 1921          40 Sheets-Sheet 40
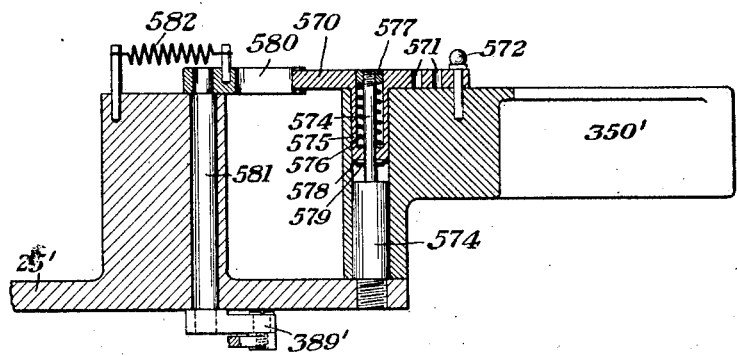
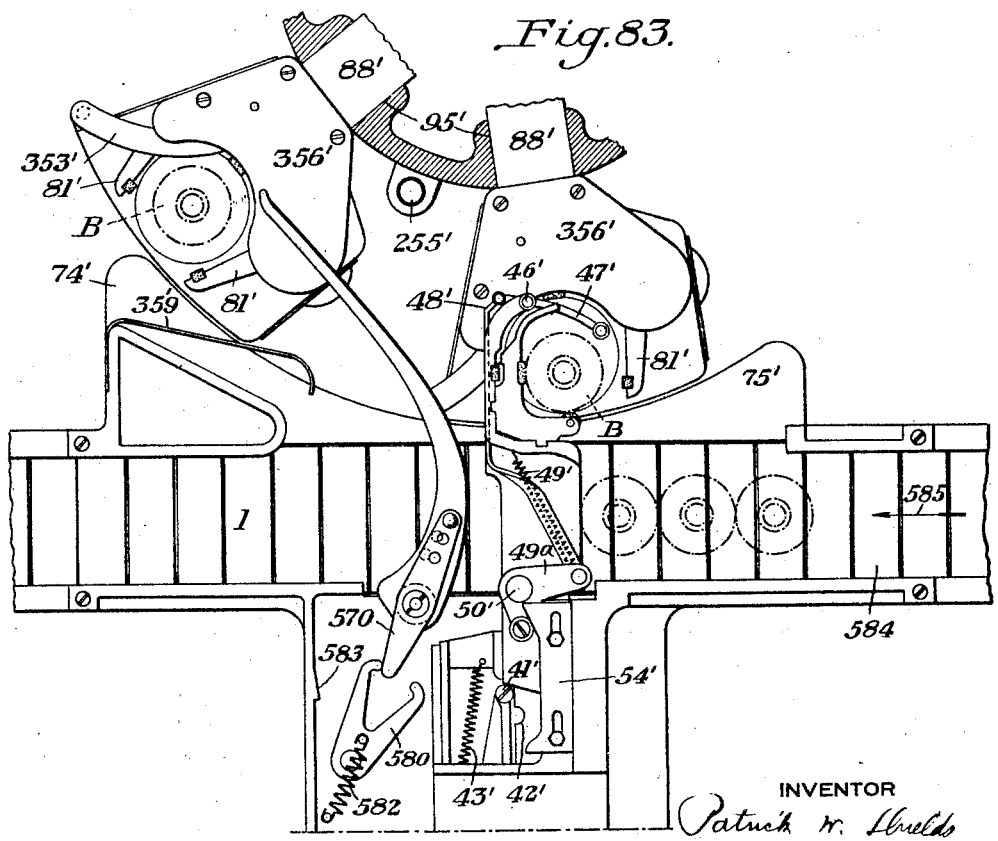
INVENTOR Patented Mar. 15, 1927.

1,621,470

UNITED STATES PATENT OFFICE.

PATRICK W. SHIELDS, OF PITTSBURGH, PENNSYLVANIA, ASSIGNOR TO McKENNA BRASS & MANUFACTURING COMPANY INC., OF PITTSBURGH, PENNSYLVANIA, A CORPORATION OF PENNSYLVANIA.

BOTTLING MACHINE.

Application filed October 14, 1921. Serial No. 507,769.

The present invention relates broadly to bottling machines, and more particularly to rotary machines of this character adapted to fill bottles with syrups and carbonated water. An important object of the present invention is to provide a bottling machine having a large bottling capacity as compared with machines of the general type heretofore constructed.

A further object of the present invention is to provide a bottling machine having a plurality of filling and crowning heads arranged whereby a plurality of different syrups may be simultaneously bottled as desired.

A still further object of the present invention is to provide a bottling machine of the character described which is fully automatic as to bottle feeding, filling, crowning, and discharging operations.

Another object of the invention is to provide a bottling machine which is fully automatic and which is provided with a plurality of safety guards adapted to prevent injury both to the machine and the operator in the event of any foreseeable mishap.

Still another object of the invention is to provide a bottling machine which is so designed that pieces of broken glass and other foreign material are automatically deflected from the machine in such manner as to prevent clogging of the machine or injury thereto.

An additional object of this invention is to provide a bottling machine with a plurality of filling heads as before described, and so constructed that any desired number of the heads may be rendered inoperative while maintaining the rest of the heads in operation.

Still another object of the invention is to provide a gauging device which is automatically set with the machine whereby the passage of bottles of undue height to the machine is prevented.

Still another object of the invention is to provide a bottling, crowning and filling machine which is easily adjusted in such manner that the machine may be used to fill and crown bottles of different sizes.

Still a further object of the invention is to provide a rotary bottling machine as set forth, having a series of independent bottle supporting plungers, all of which may be simultaneously adjusted to accommodate bottles of different sizes.

An additional object of the present invention is to provide a feeding table adjustable for different bottles as desired and provided with a counterbalancing means, facilitating the adjustment thereof.

An additional and important object of the invention is also to provide a centralized control whereby the operation of the entire machine may be attended to by one operator.

Another important object of this invention is to provide a bottling machine adapted to automatically stop a defective filling and crowning head in a position where it is readily accessible to the operator at the centralized control station.

Still another important object of the invention is to provide a drive for the machine which is effective through a clutch mechanism adjustable in such manner that it may be slipped to prevent jars to the machine during the starting and stopping thereof, and to permit slipping in case of a jam.

The foregoing and other objects of the present invention, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1 is a perspective view of a bottling and crowning machine built in accordance with the present invention;

Figure 2 is a top plan view of the machine illustrated in Figure 1;

Figure 3 is a diagrammatic developed view of the valve operating cam;

Figure 4 is a diagrammatic developed view of the plunger elevating cam;

Figure 5 is a side view of the bottom portion of the machine with the control box omitted showing the relationship of the feeding table and the bottle discharge conveyor.

Figure 6 is a detail view illustrating the mounting of the conveyor to permit adjustment of the feeding table;

Figure 7 is an enlarged sectional view through one of the bottle conveyors;

Figure 8 is a top plan view of the feeding table illustrating a portion of the bottle feeding conveyor, the discharge conveyor and the bottling machine;

Figure 13 is a sectional view corresponding to Figure 12 but on a smaller scale, to illustrate the relationship to the bottling machine, a portion of the feeding mechanism being removed;

Figure 14 is a plan view of the feeding mechanism illustrated in part in Figure 11;

Figure 15 is a detail view illustrating a portion of the feeder cam and the operation of the feeding mechanism therefor;

Figure 18 is a detail top plan view of one of the bottle chucks with the cover plate and discharge guide removed;

Figure 19 is a vertical sectional view through one of the bottle chucks and its supporting plunger;

Figure 20 is an enlarged top plan view of a portion of one of the bottle chucks with the cover plate and discharge guide in position thereon;

Figure 21 is a detail view of the plunger supporting roller;

Figure 22 is a detail view of the adjusting pin for the bottle chuck discharging guide;

Figure 23 is a transverse sectional view, partly broken away, taken through the base of the machine and illustrating the elevating cam, or plunger cam, and the machine drive;

Fig. 23ª is an elevation of a portion of the apparatus shown in Fig. 23 and illustrating the attachment of the brake band for the machine to the brake operating lever.

Figure 24:
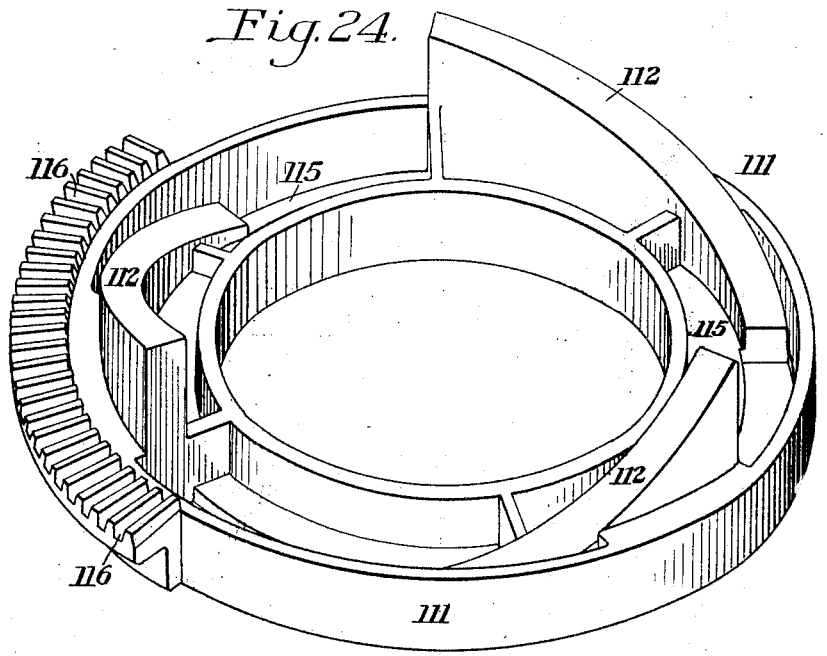
Figure 25:
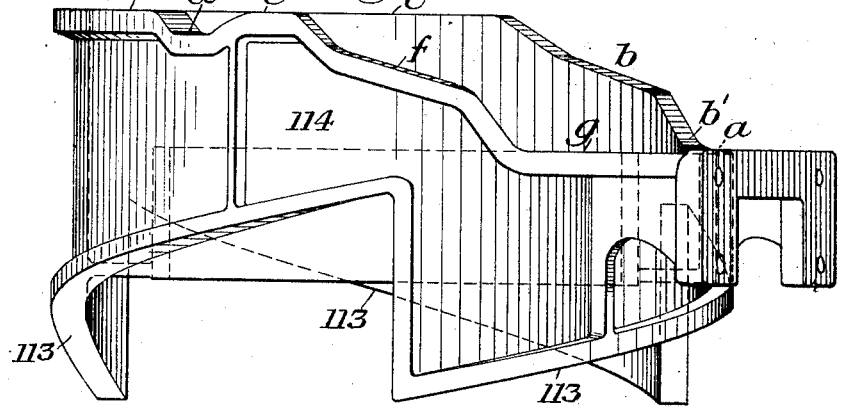

Figure 24 is a detail perspective view of the elevating cam;

Figure 25 is a side elevation of the plunger cam which is engaged by the elevating cam of Figure 24;

Figure 26 is a vertical sectional view, partly in elevation and partly broken away, taken through the drive housing and illustrating the driving mechanism for the machine;

Figure 27 is a transverse sectional view on the line XXVII—XXVII of Figure 28;

Figure 28 is a side elevation of a portion of the tension adjusting device for the driving clutch;

Figure 29 is a side elevation of a portion of the bottling machine illustrating one of the filling heads, the valve operating bell crank therefor, one of the crown hoppers, and a portion of the syrup distributing mechanism;

Figure 30 is a vertical sectional view through the syrup distributing mechanism and two of the syrup spies;

Figure 31 is a horizontal sectional view on the line XXXI—XXXI of Figure 32 illustrating the valve operating cam shown in development in Figure 3 with the co-operating parts removed.

Figure 16:
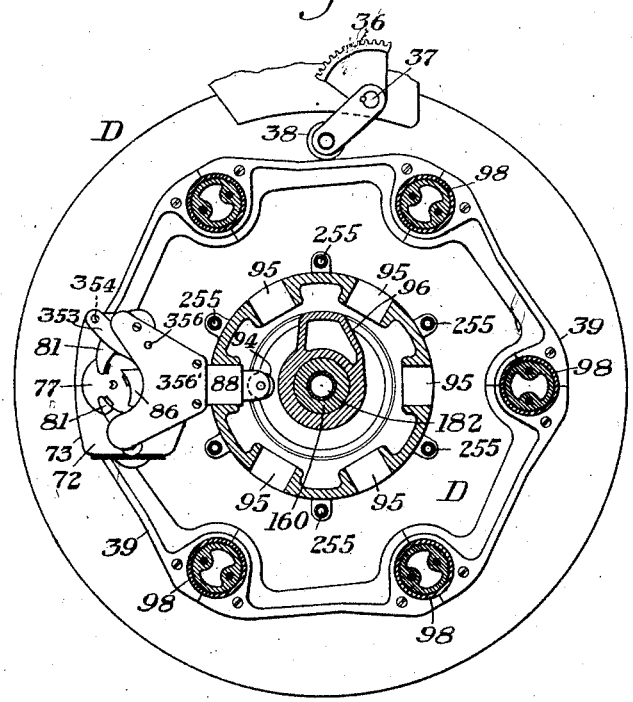
Figure 16 is a transverse sectional view through the plungers illustrating the feed actuating cam and one of the bottle chucks.
Figure 34:
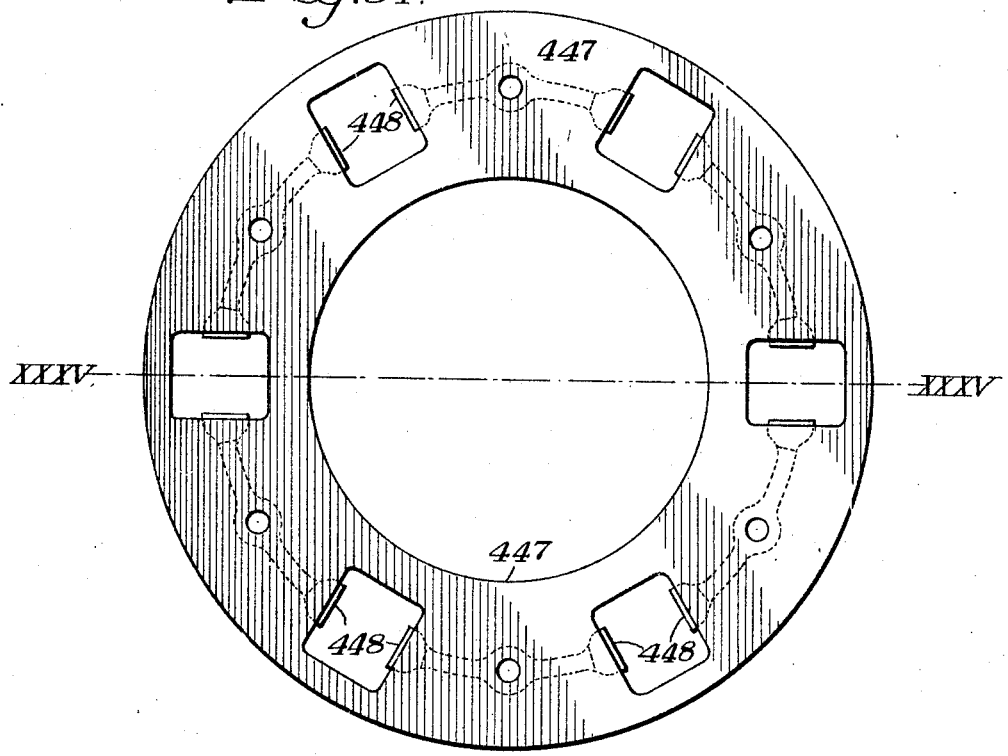
Figure 35:
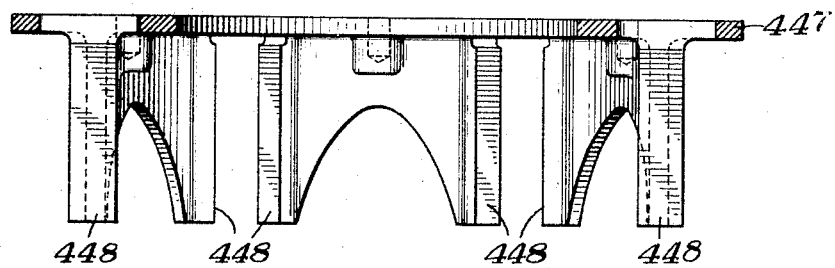

Figure 32 is a vertical sectional view on the line XXXII—XXXII of Figure 31;

Figure 33 is a detail view of the lower end of one of the bell cranks;

Figure 34 is a top plan view of the mechanism cooperating with the valve operating cam of Figure 32 for eliminating side thrusts of the bell cranks;

Figure 35 is a sectional view on the line XXXV—XXXV of Figure 34;

Figure 36 is a detail plan view of one of the bell cranks illustrating its relationship to the filling and crowning head;

Figure 37 is a vertical sectional view on the line XXXVII—XXXVII of Figure 36;

Figure 38 is a horizontal sectional view on the line XXXVIII—XXXVIII of Figure 37;

Figure 39 is a horizontal sectional view on the line XXXIX—XXXIX of Figure 37;

Figure 40 is a vertical sectional view on the line XL—XL of Figure 39;

Figure 41 is a detail view of the carbonated water valve actuating tappet;

Figure 42 is a vertical sectional view on the line XLII—XLII of Figure 39;

Figure 43 is a vertical sectional view through one of the filling and crowning heads;

Figures 44 and 45 are sectional views corresponding to Figure 43 but illustrating the parts in different operative positions;

Figures 46 and 47 are detail sectional views through the syrup pump;

Figure 48 is a side elevation of a portion of the mechanism illustrated in Figure 43;

Figures 49 and 50 are detail views of the crown chute vibrator;

Figure 51 is a horizontal sectional view through one of the crown pushers;

Figure 52 is a bottom plan view of the mechanism illustrated in Figure 51;

Figure 53 is a detail side view of the crown feeding table illustrating the emergency crown removing slide;

Figure 54 is a transverse sectional view on the line LIV—LIV of Figures 51 and 52;

Figure 55 is a vertical sectional view through the locking device for one of the filling and crowning heads illustrating in section a modified form of crown selector drive;

Figure 56 is a vertical sectional view through the housing for the brake controlling mechanism for the machine drive, illustrating the starting switch;

Figure 57 is a side elevation of the centralized control box;

Figures 58 and 59 are detail views of different portions of the controlling means;

Figure 60 is a top plan view of the control box illustrating its relationship to the bottling machine;

Figure 61 is a detail sectional view on the line LXI—LXI of Figure 60;

Figure 62 is a detail sectional view on the line LXII—LXII of Figure 60;

Figure 63 is a wiring diagram for the machine;

Figures 64, 65, 66 and 67 are detail views of a modified form of syrup and water-feeding means for a filling and crowning head;

Figures 68, 69, and 70 are detail views of a modified form of bottle chuck;

Figures 71 and 72 are detail views of a modified form of crown selector drive;

Figures 73, 74, 75, 76, 77 and 78 are detail views of a modified form of jumping pin control; Fig. 74 being a section taken on the line LXXIV—LXXIV of Fig. 73;

Figure 79 is a transverse sectional view similar to Figure 16, illustrating a modified form of mechanism for actuating the feeder disk intermittently;

Figure 80 is a top plan view, corresponding to Figure 8, illustrating a modified form of bottle-feeding mechanism;

Figure 81 is a vertical sectional view on the line LXXXI—LXXXI of Figure 80;

Figure 82 is a transverse vertical view on the line LXXXII—LXXXII of Figure 81;

Figure 83 is a top plan view corresponding to Figures 80 and 81, illustrating a still further modified form of feeding mechanism; and Figure 84 is a detail sectional view through the guide arm and switch actuated thereby on the line LXXXIV—LXXXIV of Figure 80.

The present machine is designed to receive empty bottles which are automatically fed thereto during its operation, inject predetermined amount of syrup into each of the bottles, fill the same to a predetermined height with carbonated water, crown the filled bottles and then discharge the bottles at a convenient packing point.

Broadly, the present machine comprises a bottle-conveying mechanism having a feeding conveyor and a discharge conveyor. This conveying mechanism delivers the bottles to, and discharges the bottles from a feeder table which is in proximity to and cooperates with the machine per se. Mounted on the feeder table is a feeding mechanism comprising a reciprocating driver and a reciprocating feeder arm. The feeder arm takes the bottles from the feeder table and delivers the same to bottle chucks, each of which is provided with a gripping means for firmly holding the bottle. The chucks are mounted on supporting plungers which are adapted to be adjusted to different heights to accommodate the machine to bottles of different sizes. A main driving mechanism enables the supporting plungers to be operated as required.

After the bottles are in position in the chucks, they are adapted to receive syrup from a syrup distributor, which delivers the syrup to filling and crowning heads mounted for cooperation with the bottles. Each of the filling and crowning heads is provided with a syrup pump, suitable valve operating mechanism and crown feeding mechanism.

For locking the filling and crowning heads in the proper position to perform the required operations, there are provided oil cylinders.

A control brake is secured to the machine in such manner that it may be readily stopped, as found necessary, and a centralized control station and safety system are provided to insure ease and safety throughout the operation of the machine.

The description of the machine will be taken up so as to include the various features thereof in the order heretofore given.

Referring generally to Figure 1 of the drawings, there is illustrated a machine constructed in accordance with the present invention and comprising a feeder table PT adapted to receive bottles B as fed thereto by the conveying mechanism. The feeder table is provided with a feeding mechanism FM which transfers the empty bottles to the bottle chucks C, each of which is mounted on a plunger P carried by a frame constructed to form a deflector D and supported on the base B'. The deflector D, together with the supporting plungers and mechanism associated therewith, are adapted to be rotated during the operation of the machine by suitable driving mechanism within the housing H. Cooperating with each of the chucks C, and mounted to rotate in unison therewith, are filling and crowning heads FH adapted to receive syrup through lines S', S² and S³ and carbonated water through the line W. Associated with each of the filling and crowning heads is a crown hopper CH for delivering the crowns to the heads as required.

Several of the detail features embodied in the present machine are disclosed in my Patent No. 1,195,516 of August 22, 1916, and in my application Serial No. 222,573, filed March 15, 1918.

Bottle conveying mechanism.

Figure 10:
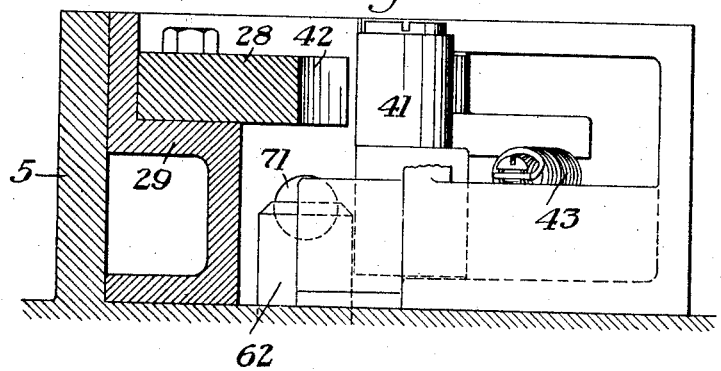
Figure 10 is a detail sectional view of the bottle feeding mechanism taken on the line X—X of Figure 11.
Figure 9:
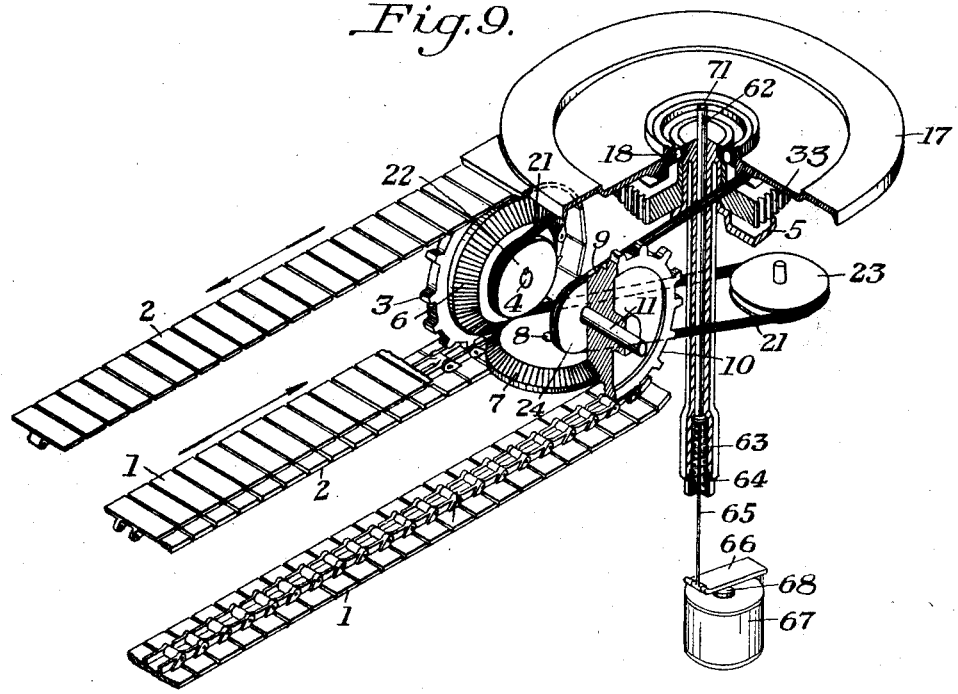
Figure 9 is a perspective view, partly broken away, illustrating the feeder table and the mounting of the bottle conveyors.
Figure 11:
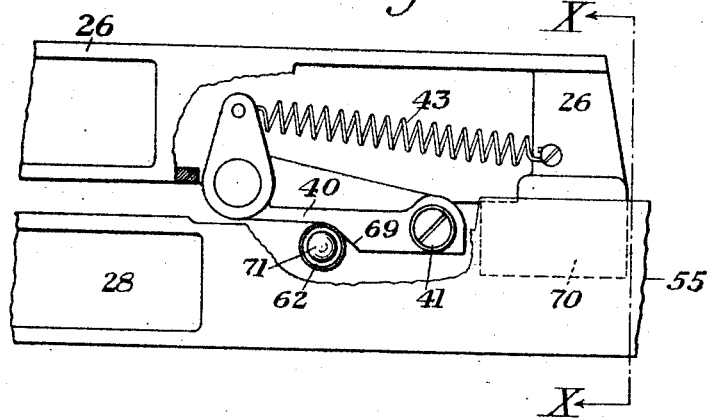
Figure 11 is a detail plan view, partly broken away, illustrating a portion of the bottle feeding mechanism.

Referring more particularly to the drawings, there is disclosed in Figure 2 a plan view illustrating a portion of a bottle feeding conveyor 1 and a bottle discharge conveyor 2, cooperating with the feed table FT. In Figure 9 each of the conveyors is illustrated as comprising a flexible link construction. The discharge conveyor 2 is adapted to be driven in any desired manner from a source of power, not shown, in the direction of the arrow and is supported at its end adjacent the feeder table on a sprocket 3 keyed to a shaft 4 journalled in the frame 5 of the feeder table. The sprocket 3 is adapted to drive a bevel gear 6, mounted on the shaft 4, and meshing with a bevel gear 7 carried by the shaft 8, supported in the frame 5, and meshing with a bevel gear 9 formed integral with the sprocket 10 and loosely carried by the shaft 11. In this manner, the drive is transmitted from the belt 2 to the belt 1 in such manner that the bottle supporting surfaces of both of the belts are maintained in taut condition, the lower runs of the conveyor being permitted to sag if necessary.

As shown in Figures 6 and 7, each of the conveyors comprises a series of bottle supporting slats 12 traveling on strips 13 supported at intermediate points by brackets 14. The brackets 14 carry flexible strips 15 adapted to prevent the bottles from toppling over during the movement of the conveyor. If desired, the top strips may be clamped in the brackets by suitable screws 16, while the lower strips are free to move relatively to the brackets in slots provided therein. Due to this construction, a flexible conveyor is provided enabling one end of the conveyor to be raised or lowered with the feeder table frame 5, as illustrated in Figure 6, as may be found necessary during the operation of the machine, and as will be described in detail hereinafter.

Feeder table.

Referring more particularly to Figures 8 to 13, both inclusive, the feeder table FT comprises a rotating feeder disk 17 mounted on ball bearings 18 carried by the frame 5. Adjacent the disk there are provided plates 19 adapted to cooperate with the conveyors 1 and 2, respectively, and effect a smooth transfer of bottles from the conveyor to the disk and vice versa. Secured to disk 17 is a grooved pulley 20 adapted to cooperate with an endless driving belt 21 passing over a driving pulley 22 on the shaft 4 to an idler 23 carried by the frame 5 and a second idler 24 on the shaft 11. In this manner, driving is transmitted from the sprocket 3 to the feeder disk 17 to continuously rotate the same during the operation of the machine.

Feeding mechanism.

Figure 12:
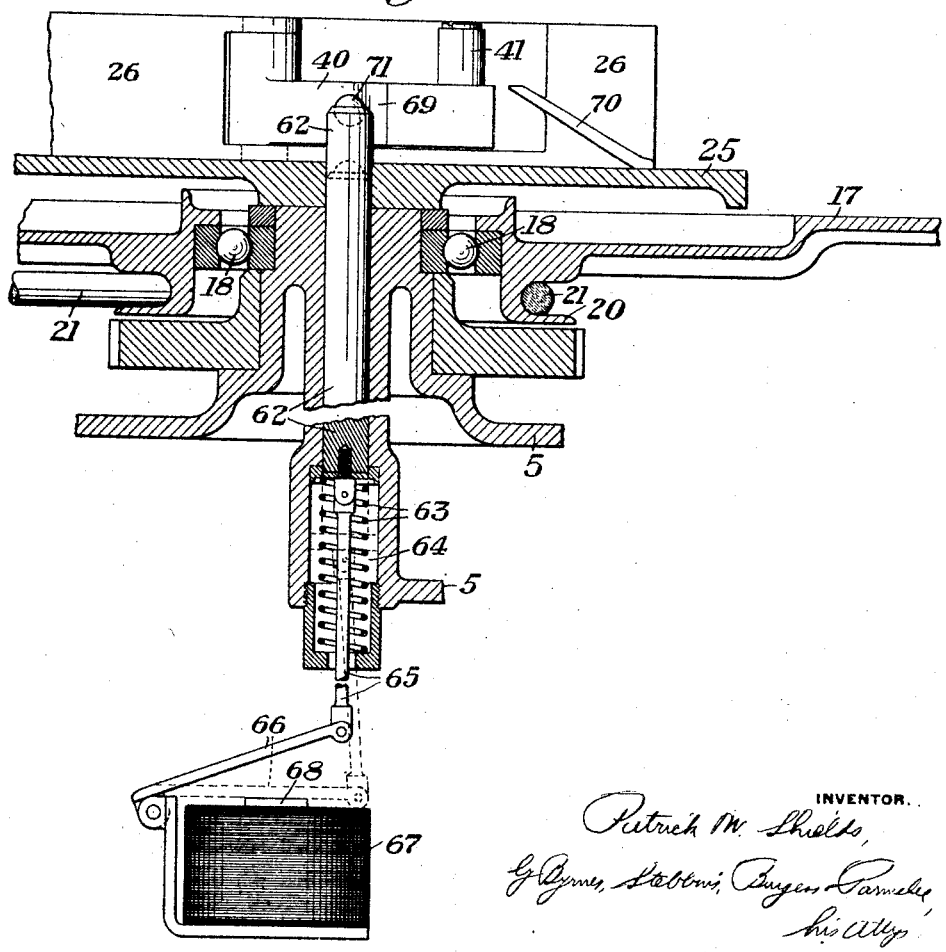
Figure 12 is a vertical sectional view through the feeding table illustrating the jumping pin and the resetting cam.

Referring more particularly to Figure 12, the frame 5 is illustrated as carrying a supporting plate 25 in such position as to overlie a portion of the feeder disk 17. Mounted on the plate 25 for reciprocation thereon is a reciprocating driver 26 sliding in suitable guides 27 on the plate 25, and a similarly moving parallelly extending reciprocating feeder arm 28 slidable in similar guides 29.

As shown more particularly in Fig. 15, the driver 26 has pivotally secured to the under side thereof a pitman 30, the opposite end of which is secured to a crank 31 carried by a pinion 32. The pinion 32 meshes with an idler gear 33 carried by the frame 5 below and concentric with the feeder disk 17. The idler gear is normally pulled to the position shown in Fig. 15 by the action of a heavy tension spring 34 having one end secured to the frame 5 of the feeder table, as indicated at 5ª, in Fig. 15, and the opposite end secured to an arm 35 carried by the idler gear. This idler is moved against the action of the spring 34 by a segmental gear 36 having a pivotal mounting 37 in the frame 5 (Fig. 15) and constructed in the form of a bell crank lever, the opposite end of which lever is provided with a vertically extending follower roller 38 contacting with the vertical surface of the feeder cam 39, carried by the deflector D for rotation therewith. Pivotally secured to the side of the driver 26, adjacent the feeder arm 28, is a bell crank lever 40 having one end thereof shaped to form a dog 41 for co-operation with a slot 42 in the side of the reciprocal feeder arm. The bell crank lever 40 is normally held in such position as to cause the dog to engage the slot by a tension spring 43. It will therefore be apparent, that with the dog and the slot in engagement, the reciprocating feeder arm will be reciprocated by and in unison with the reciprocating driver 26 under normal conditions. The movement of the driver 26 in the direction of the arrow $a$ is effected by the spring 34, before described, and the movement of the driver in the opposite direction is effected by the engagement of a high point of the feeder cam 39 with the roller 38. The feeder arm 28 is provided on its forward end with a bottle engaging jaw comprising a U-shaped construction 44. In operating with small bottles, the jaw is provided with an inserted liner 45, which is readily removable when it is desired to operate with bottles of larger size. Pivotally carried by a pivot 46 in the end of the jaw 44, is a transversely extending finger 47 adapted when in closed position to extend partially across the opening of the jaw or the liner when placed therein. The free end of the finger 47 is pivotally connected to a link 48, as shown in Fig. 14, extending longitudinally of the feeder arm, as shown in Fig. 8, and normally held in such position that the finger tends to grip a bottle within the jaw or the liner by the action of a tension spring 49. This link 48 at its opposite end is pivotally connected to a bell crank lever 49ª mounted on a pivot 50 and having on its opposite end a roller 51 co-operating with inclined surfaces 52 and 53 on an adjustable translation cam 54 carried by the plate 25.

The reciprocating feeder arm preferably comprises two main parts, namely, the portion 55, slidable in the guide 29, and the portion 56, carrying the bottle gripping jaw and pivotally secured to the portion 55 by a pivot pin 57. The two parts of the feeder arm are normally held in the position illustrated in Fig. 14, by the action of a compression spring 58 bearing against one end of a tappet 59, the opposite end of which engages a shoulder 60 on the portion 56. The movement of the portion 56 under the action of the spring 58 is limited by a suitable stop 61. Due to this construction the portion 56 is free to move in the direction of the arrow b, as will be more fully pointed out hereinafter.

In the construction described, the tension spring 34 will normally hold the idler gear 33 in such position that the reciprocating feeder arm will lie in its forward position, as illustrated in Figure 8. With the feeder disk 17 rotating, a bottle will always be maintained against the smooth side of the portion 56 of the feeder arm. When a high point on the feeder cam 39 engages the roller 38, the tension of the spring 34 will be overcome and the driver, together with the feeder arm, will be retracted. During this retractile movement, the roller 51 will engage the inclined surface 53 on the translation cam 54 and move the link against the action of the spring 49 to open the finger 47. When this has occurred, the leading bottle on the feeder disk 17 will be caused to move by the rotation of the disk and the pressure of the bottles behind it into the jaw 44 or the liner 45. Continued operation of the machine will cause the high point on the feeder cam 39 to pass out of engagement with the roller 38, thereby permitting the spring 34 to again advance the driver and the feeder arm. This advance of the feeder arm will cause the bottle carried thereby to be moved away from the feeding disk into position on one of the bottle chucks C of the machine. During this movement of the bottle, it will be securely gripped, due to the movement of the roller 51 away from the inclined surface 53 on the translation cam. As soon as the bottle is in proper position over a chuck, the roller 51 will engage the inclined surface 52 at the opposite end of the translation cam and cause the finger 47 to again move to open position, thereby releasing the bottle carried by the feeder arm. During the normal operation of the machine, this operation will be repeated each time a bottle chuck C comes into position, as a high point on the feeder cam 39 is provided for each of the chucks.

The feeding mechanism just described is provided with a safety device, Figs. 9 and 12, for rendering the feeding mechanism inoperative for feeding a bottle as desired, or as found necessary. This device comprises a jumping pin 62 slidable vertically through the frame 5 of the feeder table and normally urged upwardly by a compression spring 63 located in a chamber 64 formed on the frame 5 and abutting at one end against said chamber and at the other end against the jumping pin. At its lower end, the jumping pin is provided with a link 65 pivotally secured thereto at one end and at its oposite end pivotally secured to an armature 66 co-operating with a magnet 67. As will be hereinafter pointed out, the wiring for the machine is such that during normal and proper running conditions the magnet 67 is energized to hold the armature 66 against the core 68, in opposition to the action of the spring 63. In this position, the end of the jumping pin is held in the dotted line position indicated in Figure 12, which may be either below or flush with the surface of the table 25. When, for any reason, the magnet 67 is de-energized, the spring 63 will force the jumping pin into the full line position illustrated in Figures 10 and 12. In this position, the jumping pin will engage the inclined surface 69 on the bell crank lever 40 and, as the driver 26 is moved outwardly, will force the bell crank lever 40 away from the feeder arm 28, thereby disengaging the dog 41 from the slot 42 in the feeder arm. As long as the jumping pin remains in this position, the driver will be inoperative for feeding bottles on the machine as its driving connection with the feeder arm is destroyed. In order, however, to re-set the jumping pin, after each operation of the driver, the driver is provided with a resetting cam 70, which is adapted to engage the anti-friction ball 71 in the top of the jumping pin during the reciprocation of the driver and force the same downwardly against the action of the spring 63. If the magnetic circuit has been re-established in the magnet 67, the jumping pin will be held in its downward position and the feeding operation will be resumed.

Bottle chucks.

By referring more particularly to Figures 16 to 22, it will be seen that each of the bottle chucks comprises a supporting base 72 having a curved outer face 73 extending concentrically with the axis of rotation of the machine to co-operate with curved filler plates 74 and 75 carried by the feeder table frame 5, as clearly shown in Figure 8. These filler plates provide a smooth surface over which the bottles may be fed onto the chucks and discharged therefrom, as will be later described.

Each of the supporting bases 72 is provided on its upper surface with a cushioning insert 76, preferably of rubber, carrying a bottle supporting disk 77. Each of the disks 77 lies flush with the upper surface of the supporting base 72, as clearly shown in Figure 19, and permits a slight rocking movement of the bottles carried thereby, as may be required to compensate for imperfections in the bottles, and cushion the bottles during crowning. The supporting bases 72 are each provided with vertically extending studs or shafts 78, 79, 80 respectively. Mounted on the stud 78 is a bell crank shaped jaw 81 having one arm thereof overlying the supporting base and provided with a bottle gripping element 82. The opposite end of the bell crank lever 81, which may be constructed integrally with the jaw or separate therefrom as desired, is shaped to provide a segmental gear 83. Mounted on the stud 79 is a similar construction, and the parts thereof are referred to by the same reference characters. Also carried by the stud 79, and indicated in dotted lines in Figure 18, is a pinion 84 meshing with a pinion 85, on the stud 80. This stud 80 carries a bottle gripping jaw 86 located above the supporting base 72 and provided with a bottle gripping element 82. For operating the jaws to open and close the same, the supporting base is hollowed out to form a guide for the plunger 88, hollow throughout a portion of its length and provided on opposite sides thereof with rack-bars or rack-teeth 89, adapted to mesh with the segmental gears 83 of the bottle gripping jaws 81. The plungers 88 are normally moved inwardly away from the curved faces 73 of the supporting bases by compression springs 90 extending within the hollow plungers and abutting at their outer ends against movable heads 91. Rotational movement of the plungers 88 is prevented by set screws 92 extending through the supporting bases into engagement with slots 93 in the plungers. At their inner ends, each of the plungers is provided with an anti-friction roller 94, extending through vertically elongated guide slots 95 in the central part of the rotary deflector D, as clearly shown in Figures 16 and 17. During rotation of the deflector D, the rollers 94 are brought successively into engagement with the stationary bottle chuck operating cam 96, located within the column portion of the deflector D. The bottle chuck operating cam 96 has its high point substantially in alignment with the feeding mechanism on the feeder table, whereby as the chucks successively approach bottle receiving position, the rollers 94 on the plungers will engage the cam 96 and the plungers will be moved outwardly to open the bottle jaws 81 and 86, as clearly shown in Figure 8. The continued rotation of the machine, after a bottle has been placed in each chuck, will cause the rollers to leave the cam, thereby enabling the springs 90 to move the plungers inwardly and cause the jaws to firmly grip and center the bottle in the chuck.

Bottle chuck supporting plungers.

Each of the chucks is provided with a tubular depending boss 97 for cooperation with the hollow upper end of a chuck supporting plunger 98. Each of the chuck supporting plungers has an internal boss 99 cooperating with similar bosses 100 on the supporting bases 72 and held in assembled position by bolts 101 passing therethrough. On the lower end of each of the chuck supporting plungers 98 is positioned a supporting roller 102 mounted on a suitable pin 103, extending transversely through the plunger. Each of the supporting rollers 102 may be provided on one side thereof with a projection 104 adapted to be slipped upwardly through a slot 105 during assembly. This construction prevents the supporting rollers 102, which are beveled, as clearly shown in Figure 19, from being placed in the plungers in the wrong position.

Operating and adjusting means for chuck-supporting plungers, and driving mechanism for the machine.

Having followed the operation of the machine in passing the bottles from the conveyor to the chucks, the mechanism for rotating the machine and moving the chucks will now be described in detail.

As before pointed out generally, the machine comprises a main supporting base B', having a hollow central boss 106, as shown in section in Figure 13. This boss at its upper end is provided with a bearing ring 107 adapted to cooperate with a circular ball race 108, and the deflector D is provided with a hollow downwardly projecting central boss 109 carrying a hardened ring 110 cooperating with the ball race. This construction forms the main supporting ball bearing for the machine, the ball race 108 carrying substantially all of the weight of the rotating portions of the machine. The ball race 108 is illustrated in plan view in Figure 23. A centralizing bearing 108′ is also provided as shown in Figure 29.

Mounted on the base B, and surrounding the boss 106 formed thereon, is an elevating cam 111 shown in perspective in Figure 24. This elevating cam is provided with three inclined elevating surfaces 112, adapted to cooperate with similarly shaped oppositely inclined surfaces 113, on the main plunger elevating cam 114 shown in side elevation in Figure 25. This plunger elevating cam is adapted also to surround the boss 106 and overlies the elevating cam 111, with its inclined elevating surfaces 113 in engagement with the elevating cams 112. In order to conserve material and space, the elevating cams 112 are of less height than the difference between the high points and the low points of the inclined surfaces 113. To accommodate the high points of the surfaces 113, the cam 111 is provided at the end of each of the cam surfaces 112 with openings 115.

Secured to one side of the elevating cam 111 is a portion of a ring gear 116 with which a pinion 117 on the horizontally extending shaft 118 is adapted to mesh, as shown in Figure 13. At its opposite end this shaft is provided with a worm wheel 119 adapted to be rotated by a worm 120 on the hand wheel shaft 121. This hand wheel shaft is provided with an elevating hand wheel 122, as shown in Figure 23, by means of which the cam 111 may be rotated relatively to the cam 114 for raising or lowering the same. The shaft 118 is journalled in a suitable bearing formed in the enclosing casing 123 of the base B′.

On its upper surface the plunger operating cam 114 is provided with a cam surface 124, which is beveled to cooperate with the plunger supporting rollers 102.

At one side, as shown in Figure 25, and in section in Figure 13, the cam 114 is provided with a projection 125, to which is secured an elevator housing 126 overlying the shaft 118 and supporting the lower end of an elevator bar 127, the upper end of which engages the bottom portion of the feeder table frame 5. Due to this construction it will be apparent that rotation of the elevating hand wheel 122 will cause all of the chuck supporting plungers 98 to be elevated or lowered through the deflector D, to raise or lower the chucks C carried thereby. At the same time, the elevator bar will raise or lower the feeder table, whereby the surface of the feeding disk 17 will be maintained at all times level with the supporting bases of the bottle chucks as they reach their bottle receiving positions. The flexible construction of the bottle conveyors, as before described, permits the feeder table to be raised and lowered in this manner. To partially carry the weight of the feeder table and render adjustment of the machine easier, the base B′ is provided with a bracket 128 carrying an open topped cup shaped casing 129. At its bottom portion this casing is provided with a curved bearing 130 cooperating with a compression head 131 supporting the lower end of a heavy compression spring 132. At its upper end the compression spring co-operates with a similar head 133 and bearing 134. Buckling of the spring is prevented by an enclosing casing 135 of any desired construction. This spring is so designed as to substantially balance the weight of the table, as described.

Figure 17:
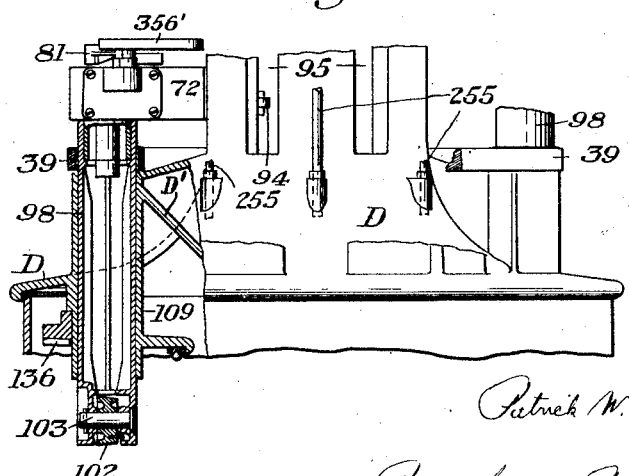
Figure 17 is a side elevation, partly in section and partly broken away, of the mechanism illustrated in Figure 16.

The boss 109 of the deflector D, is provided with a series of bearings for the chuck supporting plungers 98, as clearly shown in Figures 16 and 17, and has suitably secured thereto a bevel ring gear 136, by means of which the deflector and its associated parts is rotated. The construction of the gear is illustrated in section in Figures 13 and 17. This gear is adapted to be driven continuously by a pinion 137, Figures 23 and 26, underlying the same, and splined to the driving shaft 138, extending horizontally through the drive housing H. At its outer end, the drive shaft has secured thereto the outer member 139 of a friction clutch. This member cooperates with a conical friction surface of an inner member 140 splined to a sleeve 141 surrounding the shaft 138 and having secured thereto a series of driving gears 142 of different diameters. The sleeve 141 and the shaft 138 are supported at their outer ends by a suitable bearing 143 in the drive housing H. For transmitting power from a driving motor 144 to the shaft 138, the driving motor is provided with a belt pulley 145 for a belt 146 passing over a pulley 147 splined to one end of a squared shaft 148 having bearings 149 in the drive housing. Slidable on the squared shaft 148 is a gear shifting mechanism 150 having an operating lever 151 and provided with intermediate gears 152. This gear shifting mechanism may be of any standard construction.

Secured to the outer end of the squared shaft 148 is a hand wheel 153, by means of which the machine may be rotated by hand for certain purposes, if so desired.

In order to change the tension on the driving clutch, to increase the friction between the members 139 and 140, the member 140 is adapted to be urged outwardly by a tension rod 154 passing therethrough and provided at its inner end with a nut 155 extending through slots 156 in the shaft 138. The nut 155 forms an abutment for a follower head 157 cooperating with a spring 158, the opposite end of which abuts against the enlarged head 159 on the sleeve 141. By turning the nut 155 further onto the rod 154, it will be apparent that the cooperating friction surfaces of the members 139 and 140 are brought more firmly into driving engagement. This adjustment, and the provision of a friction clutch generally, constitute an important feature of this invention, as the tension may be so adjusted that in starting and stopping a certain amount of slipping may occur to eliminate jar from the machine during the starting and stopping operations.

During operation of the machine, it will be apparent that the elevating cam 111 and the plunger cam 114 remain stationary while the deflector D and its associated parts are rotated. During the rotation of the deflector the plungers are carried successively to different positions and due to the fact that the rollers 102 of the plungers travel on the cam surface 124, the bottle chucks are carried to a plurality of different positions. Referring more particularly to Figure 4, in which there is illustrated a development of the cam surface 124, it will be seen that this cam surface is provided with a relatively flat low portion $a$, which permits the plungers to drop to their lowest position. When in this position the chucks C are in line with the upper surface of the feeding disk 17, as illustrated in Figure 13, so that the bottles are adapted to be fed onto the chucks and centered thereon. After each of the chucks has been provided with a bottle by the feeding mechanism, the rotation of the machine causes the supporting rollers 102 to pass over the inclined portion $b$ of the plunger cam. This portion $b$ is divided into two parts $b'$ and $b^2$. The part $b'$ has a relatively sharp inclination, while the angle of inclination of the portion $b^2$ is less. During travel of the rollers 102 over this portion $b^2$, syrup is fed into the bottles by a process hereinafter described. The relatively steep portion $b'$ of the cam brings the bottle quickly into a position almost in engagement with a head. Thereafter the head is easily engaged by the bottle and the syrup is then fed thereinto. Thereafter, the bottles with the syrup therein are brought into position where carbonated water is fed into the bottles. This action occurs during travel of the rollers 102 over the flat portion $c$ of the cam surface. After bottles have been filled, the rollers engage the dip $d$ in the cam thereby quickly lowering the chucks and permitting a crown to be fed into position over the neck of the bottle, as will be pointed out in detail hereinafter. The rollers then again engage the high portion $e$ of the cam and the crown is forced into position. The bottles are then withdrawn from the filling and crowning heads FH during the travel of the rollers 102 over the portion $f$ of the cam. If desired, this portion $f$ may have different parts thereof inclined at different angles to effect an initial rapid withdrawal of the bottle. When the rollers 102 reach the portion $g$ of the cam they are again in their lowest position with the chucks in line with the feeding disk and the bottles are adapted to be discharged.

With the foregoing brief description of the successive operations which take place during the travel of the bottle around the machine, the mechanisms acting on the bottle will now be described.

Syrup distributor.

Supported by the boss 106 in the base of the machine and extending upwardly therefrom centrally of the machine, is a column 160, illustrated in section in Fig. 16, and in elevation in Figure 29. This column is non-rotatable. Above the upper end of the column but in axial alinement therewith, is a syrup distributing head having three separable sections 161, 162 and 163 as shown in detail in Fig. 30. Each of the sections 161, 162 and 163 is provided with an internal chamber communicating with one of the syrup supply lines $S'$, $S^2$ and $S^3$, respectively, before referred to in connection with Fig. 1. Each of these syrup supply lines may be connected to a different source of supply, whereby a plurality of different syrups may be simultaneously fed to the machine. The sections of the syrup distributing head are provided with three equally spaced openings adapted to receive the bolts 164 formed to extend vertically through the openings when the sections are in proper alinement and engage a supporting plate 165. Intermediate each of the sections and the supporting plate is a suitable packing 166 and the entire structure is adapted to be held tightly together by a spider 167 carried by the bolts 164, and provided with a compression screw 168 acting against the top section 161. The distributing head as a whole is non-rotatable and is mounted on a suitable bearing 169 carried by the casting 170. This casting is formed with an upwardly extending central portion 171, having separate passages 172, 173 and 174 therein, communicating with the chambers in the sections 161, 162 and 163, respectively. Each of these passages leads through a filtering device 175 to a spy chamber 176. This chamber is formed of a transparent material 177 clamped between the casting 170 and heads 178 carried by bolts 179. These spies, of which there are three, one for each of the syrup lines $S'$, $S^2$, and $S^3$, or one for each pair of filling and crowning heads FH, are located equidistantly around the machine and enable the operator to determine whether or not the syrup is feeding properly. In order to permit the escape of air from the spies, the bolts 179 may each be provided with air escape openings 180. Formed centrally of the casting 170 is a chamber 181 which may be termed the carbonated water chamber, and which receives carbonated water continuously through a pipe 182 passing upwardly through the central support 160. The base of the carbonated water chamber 181 is provided with a suitable packing 182ª, preventing leakage between the chamber and the support 160 during rotation of the chamber. The syrup spies 176 and the carbonated water chamber 181, both have suitable connections leading to the filling and crowning heads FH, which heads will now be described in detail and connections thereto pointed out.

*Filling and crowning heads.*

The filling and crowning heads are generally of the construction shown in my Patent No. 1,195,516 and in detail in my co-pending application Serial No. 222,573. As the filling and crowning heads all have the same construction, but one of these heads will be described in detail.

The filling and crowning heads FH, of which there are six in the present machine, each comprises an upper member 183 and a lower member 184, which are secured to each other by means of a threaded ring 185. Mounted in the lower member 184, and held in position therein by means of a nut 186, is a packing ring 187, which is clamped between the nut 186 and an externally threaded disk 188. The packing ring, or throat rubber 187, as it is termed in the art, and the threaded disk 188, are each provided with a central orifice large enough to receive the neck of a bottle B.

Surrounding the exterior of the throat rubber 187 is an annular chamber 189 which communicates with a port 190, connected with a pressure pipe 191. This pressure pipe 191 is opened to pressure and exhaust at predetermined intervals in order to clamp the throat rubber 187 about the neck of the bottle during the filling and capping operations and to exhaust the pressure after the bottle has been capped to permit the bottle and cap to be lowered therethrough. Figures 37 and 43 show the throat rubber in its normal position and Figures 44 and 45 show the throat rubber when it is compressed by fluid pressure to grip the neck of a bottle, all as set out in my Patent No. 1,195,516. Even with the throat rubber 187 in its normal position, it will be noted that it closely embraces the neck of the bottle and offers resistance to the withdrawal of the top of the bottle, and particularly the crown which necessarily presents at least some increase of section. This is clearly shown in Figure 45.

A material advantage of the gripping jaws 81 and 86 is that they grip the bottle tightly and insure its withdrawal from the head despite the resistance offered by the throat rubber when the enlarged upper part of the bottle and the attached crown are encountered. Between the upper and lower members 183 and 184 of the filling and crowning head, is a pressure chamber 192, provided with a port 193, as shown in Figures 38 and 39, which is always in communication with the main supply of carbonated water through the pipe 194 communicating with the port 195. This port 195 is in direct communication with a carbonated water line 196, as shown in Figure 38, which carbonated water line leads to the carbonated water chamber 181 through a flexible connection 197, as shown in plan in Figure 2 and in elevation in Figure 29. Slidably mounted within the chamber 192 is an ejector piston 198, having a packing ring 199 to prevent leakage from the top of a pressure chamber to the bottom thereof around the piston. The ejector piston is also provided with a downwardly extending hollow bottle-engaging stem 200, which is arranged to be engaged by the mouth of the bottle when the same is forced into the filling and crowning head, as clearly shown in Figure 37.

Mounted within the lower member 184 of the filling and crowning head is a crowning die 201 and a ring 202, having a cutaway portion through which the crowns are fed into the head, as shown in Figure 43. Secured to a central projection on the upper portion of the filling head 183 is a filling tube 203, which extends downwardly through an opening in the ejector piston 198 to a point slightly below the lower end of the hollow stem 200 thereon. A second packing ring 199ª is provided in engagement with the interior or hollow portion of the ejector piston 198 to prevent leakage of pressure from the chamber 192 through the interior of the piston. The upper member 183 of the head is provided with a second chamber 204 through which the syrup and carbonated water are fed to the filling tube 203. This filling tube 203 is slidably mounted in a nut 205 which retains the second packing ring 199ª in position. The filling tube is provided with a flange on its upper end which is arranged to seat on an annular flange on the nut 205, as shown in Figures 37 and 43. Mounted within the filling tube and extending upwardly through the chamber 204, and a stuffing box 206, which forms the upper end of the chamber 204, is an air escape tube 207. This tube is provided with a plurality of helical ribs 208 within the filling tube 203 arranged to give the fluid a swirling motion while entering the bottle to form a vortex through which the air passes when leaving the bottle and during its travel upwardly through the escape tube 207. The lower portions of the helical ribs 208 are somewhat smaller than the upper portions thereof, there being shoulders formed at the junctions which engage the upper end of the filling tube to hold it in contact with the nut 205 through the medium of a spring 209 surrounding the air escape tube. This spring engages the stuffing box 206 and the upper ends of the helical ribs in order to maintain the parts in the position shown in Figures 37 and 43 during the filling operation, and to exert pressure on the crown during the crowning operation to clamp the crown in position.

As each of the filling and crowning heads must be rotated in unison with the bottle chucks C, the main supports for the filling and crowning heads may conveniently be carried by the rotary deflector D. For this purpose, the upwardly extending arms 210 of the deflector, forming the guide slots 95 for the chuck operating plungers before described, are extended upwardly, as clearly shown in Figures 29 and 32, and carry a plate 211 provided with a central opening through which the central support 160 of the machine passes. This plate supports a casing 212 having its upper portion provided with an anti-friction bearing 213 surrounding the support 160. At its lower portion, the casing 212 is provided with six pairs of radially projecting brackets 214, indicated in elevation in Figure 32 and in plan in Figure 36. At their outer ends, each of the brackets 214 is provided with an opening 215 through which slidably passes a frame bar 216 having a stop sleeve 216ᵃ, the frame bars being arranged in pairs with each pair of frame bars carrying one of the filling and crowning heads. The general location of the frame bars will be apparent from the plan view of the machine shown in Figure 2. Each pair of the frame bars 216 carries a cross-head 217 suitably mounted thereon. The cross-head provides a means for supporting the filling and crowning heads in such manner that they will be rotated in unison with the deflector D and at the same time be permitted to move vertically when engaged by a bottle elevated into engagement therewith by the operation of the bottle chuck supporting plunger. As shown in Figure 37, each of the heads is partially secured to the cross-head 217 by means of a cylinder 218 which passes through an opening in the cross-head and has a screw threaded engagement with the upper member 183 of the filling head. This cylinder 218 is held in position on the cross-head by means of a nut 219 which has a screw threaded engagement with the outer wall of the cylinder. Adjustably mounted within the cylinder 218 is a piston 220 having a piston rod 221 which extends through the cylinder head 222. The piston rod is held in its adjusted position by means of a pin 223 which extends through openings in the head 222 and one of a series of openings 224 in the piston rod. The piston 220 is provided with a packing ring 225 in order to form a tight chamber below the piston, this chamber being in communication with the air escape opening 207 and arranged to receive the air passing from the bottle during the filling operation. This cylinder is so designed that as soon as the air pressure therein is equal to the pressure of the carbonated water supply as hereinafter described, the feeding of the carbonated water will be automatically stopped. By providing an adjustable air chamber, as above described, adjustment can be made for varying pressures on the carbonated water supply and also for varying capacities of bottles. The adjustment of the piston 220 will take care of variations in capacities of bottles up to a certain point, but in order to provide means for filling quart, as well as pint bottles, there is provided an auxiliary air chamber 226, as clearly shown in Figures 37 and 39, which is connected by means of a tube 227 with a port 228 in the bottom of the cylinder 218. The tube 227 may be provided with a suitable valve 229 whereby the auxiliary chamber may be brought into or out of operation as desired.

Also connected to the upper member 183 of the filling and crowning head is a valve casing 230 provided with connected chambers 231 and 232, the chamber 231 being connected with the chamber 204 by means of a port 233. This valve casing 230 is held in position on the cross-head 217 by means of the cylinder 234 of the syrup pump which extends through an opening in the cross-head and has a screw-threaded connection with the valve casing. The upper end of this syrup pump cylinder is secured to the cross-head by means of a nut 235 and a sleeve interposed between the nut and the cross-head. Mounted within the syrup pump cylinder is a piston 236, having a suitable packing at its lower end, and provided with an upwardly extending hollow stem 237 to receive a graduated rod 238 screw-threaded thereinto. The rod 238 is provided with a head 239 which is adapted to be engaged by a slotted pin 240 projecting forwardly from the upper yoke 241 slidable on the frame bars 216, as shown in Figure 36. The pin 240 is normally held in operative engagement with relation to the rod 238 by a leaf-spring 242 engaging a projection 243 on the slotted pin 240. The pin 240 may have a pin and slot connection 244 with the yoke 241 to permit movement thereof horizontally through the yoke. The pin 240 is effective for moving the syrup pump piston 236 in one direction to supply syrup to the cylinder and in the opposite direction when the pin engages the top of the stem 237 to force the syrup into the bottle being filled through the port 233 and a port 245 controlled by a check valve 246 in the chamber 231. The syrup is fed to the cylinder of the syrup pump through a pipe 247 having a flexible connection 248 with the bottom of one of the syrup spies, as shown in Figure 29. The pipe 247 communicates at its lower end with syrup valve chamber 249, Figure 38, in the valve casing 230. The syrup valve chamber contains a syrup valve check 250 controlling the port 251 leading into the bottom of the syrup pump, as shown in Figures 38, 39 and 42. The bottom of the syrup valve chamber 249 may be provided with a drain opening 252 having connection through a valve controlled pipe 253 with an exhaust chamber 254 connected to an exhaust line 255 extending downwardly through the deflector D, as shown in Figures 1, 17 and 29, and communicating with the exhaust chamber 256, shown in Figure 13, in the boss 106 of the base of the machine. The exhaust lines 255 terminate above the downwardly and inwardly directed portion D' of the deflector D, as best shown in Figure 17.

Due to the provision of a syrup check valve 250 in the syrup feed line, the upstroke of the syrup pump piston 236 draws syrup into the cylinder, while the down stroke of the piston discharges the same into the bottle, as before described.

The valve casing 230 is also provided with a carbonated water chamber 257 which is in communication with the carbonated water line 196 through the port 195 before described. This chamber is also in communication with the chamber 232 by means of a port 258 which port is controlled by a valve 259. The valve 259 is normally held in its upper position so as to close the port 258 by means of a spring 260 and is also provided with an upwardly extending stem 261 which passes through a suitable stuffing box in the valve casing 230. The port 258 is not in direct communicaton with the chamber 232 but is shut off therefrom by means of a spring controlled check valve 262 which will prevent the syrup from backing up into the port 258.

Contained within the valve casing 230 is an auxiliary chamber 263 mounted above a lower chamber 264 and in communication therewith through a spring controlled check valve 265. Within the lower chamber 264 is a second spring controlled check valve 266 having an upwardly projecting portion adapted to engage the guides on the valve 265 and unseat this valve when the valve 266 is unseated. The valve 266 is provided with a downwardly projecting stem 267 arranged to be engaged and operated, as hereinafter described, to open the chambers 263 and 264 to the exhaust chamber 254 before described, and permit the air and surplus water to discharge from the chamber 257 and pass outwardly into the exhaust. A port 268 connecting the chamber 257 above the valve 259 with the auxiliary chamber 263 is provided for this purpose.

During rotation of the machine, the bottles carried by the chucks C are successively raised by engagement with different portions of the plunger cam into filling position in the filling and crowning heads. As they are raised, they are centered by a centering bell 269, Fig. 37, secured in any desired manner to the lower member 184 of each of the filling and crowning heads. The movement of each of the filling and crowning heads in a vertical direction is controlled entirely by the bottle after it is brought into engagement therewith, and this movement is relied upon for controlling the feeding of the syrup and carbonated water to the bottle. After the bottle has been first brought into engagement with the filling and the crowning head by the travel of the plunger supporting roller 102 over the portion $b'$ (Figure 3) of the plunger elevating cam, it lifts the filling and crowning head and its associated parts, thereby sliding the frame bars 216 through the openings 215 in the brackets 214. This movement is accomplished by the engagement of the bottle neck with the stem 200, which raises the ejector piston 198 to the limit of its travel. Thereafter the entire cross-head 217 with the frame bars 216 is raised as described. During this time the bars 216 slide through the yoke 241. The frame bars each have a sleeve 270 surrounding the same and secured by nuts 271 on opposite sides of the yoke 241, as shown in Figure 32. This sleeve extends upwardly through bearing guides 272 (Figure 55) in an annular L-shaped frame 273 (Figures 1, 2 and 29) held against vertical movement by T-shaped legs 274 projecting downwardly and secured to the upper portion 212, as shown in Figure 32. At their upper ends the sleeves 270 are provided with nuts 275 cooperating with the tops of the bearing guides 272 for holding the sleeves in position. Surrounding the sleeves and abutting at their lower ends against the upper surface of the yoke 241 are compression springs 276 extending upwardly within the bearing guides 272 and abutting thereagainst. These springs prevent initial upward movement of the yoke 241 with the filling and crowning head. The frame bars 216, on the other hand, extend above the bearing guides and carry a locking cylinder 277, as will be more fully apparent hereinafter. The compression springs 276 permit the yokes 241 to assume relatively different positions with relation to the frame bars 216 as may be necessary to accommodate bottles of varying heights, as will be apparent.

During the operation just described, the plunger supporting rollers 102 are passing over the portion b (Fig. 3) of the plunger cam surface 124. After the supporting rollers 102 have left the portion b of this cam, the bottle chucks are in their highest positions. As described, this portion of the cam is effective during the syrup feed to the bottles. This feed of syrup in measured quantities is insured by the action of the piston 236 of the syrup pump. During the relative movement between the filling and crowning head and the yoke 241, the pin 240 engages the top of the stem 237 and holds the plunger stationary, thereby ejecting the syrup charge through the check valve 246 into the chamber 204 and then into the bottle. After the syrup has been fed into the bottles as described, it is desirable to feed the supply of carbonated water. However, as the bottles have raised the filling and crowning heads to their highest positions, it is desirable to maintain these heads in this position during the feed of the carbonated water and the crowning operation. For this purpose, a locking mechanism is provided which will now be described in detail.

*Locking mechanism.*

This locking mechanism, for each of the heads, comprises a cylinder 277, before referred to, and illustrated in detail in Figure 55. Slidably mounted within the cylinder 277 is a piston 278 having a piston rod 278a, which extends downwardly through a stuffing box in the lower cylinder head and is connected to the L-shaped frame 273, so that the piston will remain stationary at all times, with regard to vertical movement and the cylinder will be moved vertically relative thereto by means of the frame bars 216. The cylinder casting is provided with a valve chamber 279, having a slide valve 280 therein which is held in its upper position by means of a spring 281. The top and bottom of the cylinder 277 are connected to the valve chamber 279 by means of ports 282 and 283, respectively. The valve 280 is of the hollow type and is provided with ports 284, which permit the fluid, such as oil, to pass from the top of the piston to the bottom of the piston, or vice versa when the valve is in the open position illustrated in Figure 55. This valve is provided with a stem 285 which extends upwardly through a cap 286 and a suitable stuffing box therein. The stem is arranged to be engaged by a lever 287 pivoted to a support 288 on the cylinder casting 277. As the piston rod 278a merely extends through the lower cylinder head, it will be readily appreciated that the displacement will be greater in the upper portion of the cylinder than in the lower portion, and in order to compensate for this there is provided an oil cup 277a which is in communication with the valve chamber 279 by means of ports in the cap 286, so that when the piston is moved downwardly relatively to the cylinder oil will flow from the cup into the cylinder and when the piston is moved upwardly relatively to the cylinder oil will flow from the cylinder back into the cup. This insures the required amount of oil within the cylinder 277 to effect a positive lock of the piston 278 therein.

The lower face of the piston 278 is inclined to cause the air globules and vapor which may be formed during the operation of the machine, to collect at the peripheral portion of the piston. The cylinder 277 is cut away to form a space 289 for the reception of such globules as may collect below the piston. The lower face of the top cylinder head is also inclined toward the port 282. By reason of this construction the collected globules will be passed from below the piston by way of the space 289 to the upper portion thereof during the upward movement of the cylinder and from there they will pass upwardly through the port 282 and escape through the oil cup.

During the upward movement of the filling and crowning head the valve 280 is held in open position to permit relative movement between the oil cylinder and piston by lever 287 which is engaged at its outer end by a vertically movable valve rod 290 passing through the L-shaped frame 273 and a suitable guide 291 on the cylinder casting 277 at its upper end, through a guide 292 on the yoke 241 at its intermediate portion, and through a guide 293 on the valve casing 230 at its lower end. Secured to the valve rod 290 between the guides 292 and 293 is one end of a bell crank lever 294, (Figs. 32 and 36) having a pivotal mounting 295 carried by an inwardly projecting bracket 296 mounted on the frame bars 216, whereby the pivot 295 will be raised and lowered with the frame bars. The bell crank lever 294 on its opposite arm is provided with a roller 294a engaging a valve operating cam 297 within the casing 212. This cam is preferably formed in a casting 297a non-rotatably carried by the support 160 of the machine, as shown in Figure 32. A development of the cam 297 showing its relative position from a point of operation to the plunger elevating cam 114, is illustrated in Figures 3 and 4. During the travel of the plunger supporting roller 102 for one of the chucks over the portions a and b of the cam 124, the corresponding roller 294a for the valve rod of the cooperating filling and crowning head is traveling through the portion h of the cam 297. From an inspection of Figure 31 it will be apparent that at this time the roller 294a is urged outwardly whereby the valve rod 290 is elevated to lift one end of the lever 287 and open the valve 280. After this period syrup has been fed into the machine and the filling and crowning head is at its highest position. At this time the roller 294ᵃ engages the portion j of the cam 297, thereby moving the roller 294ᵃ inwardly and lowering the rod 290 to lock the filling and crowning head in this position. At this time also the carbonated water is admitted into the bottle. This is accomplished by a tappet 298 pivotally secured to the valve rod 290 below the connection of the bell crank lever therewith, as shown in Figure 40, and engaged at its lower portion by a spring 299 urging the lower end of the tappet away from the valve rod. At its upper end, the tappet 298 is bent inwardly to engage the yoke 241 slidably carried by the frame bars 216 and before described. During the syruping operation, which is accompanied by the upward movement of the filling and crowning head, the upper end of the tappet 298 passes out of engagement with the yoke 241, as shown in Figure 41, and the spring 299 immediately moves the tappet to its inclined position. In this position, the lower end of the tappet is in alignment with the stem 261 of the valve 259 in the carbonated water chamber 257. Continued upward travel of the head will result in opening the valve 259, through engagement of its stem with a tappet 298, thereby permitting carbonated water to flow from the chamber 257 into the bottle. The flow of carbonated water will continue until the plunger supporting roller of such filling and crowning head reaches the end of the high portion c of the cam surface 124, at which time the pressure in the cylinder 218, or in the cylinder 218 and auxiliary chamber 226 is equal to the pressure of the carbonated water and the valve 262 is seated.

After the bottle has been filled with carbonated water the filling and crowning head is ready to receive a crown for closing the filled bottle. At this time the supporting roller 102 engages the dip d in the cam surface 124, thereby lowering the chuck. The pressure of the carbonated water on the bottle ejector piston 198 tends to force the bottle from the filling and crowning head to a position below the crown feeding slot in the ring 202 before described. It will be understood that at this time the filling and crowning head is still locked in its elevated position by the oil cylinder.

*Crown feeding mechanism.*

Carried by the L-shaped frame 273, adjacent each of the oil cylinders 277, is a crown hopper CH for each of the heads. Each of these crown hoppers, of which but one will be described in detail, is of any standard type and is adapted to feed caps to a flexible chute 300 by means of which they are fed to the mechanism for feeding them into position with relation to the bottles in the filling and crowning head. The crown hopper feeding mechanism is operated each time the filling and crowning head is elevated by a crown selector drive comprising a spring pressed vertically extending rod 301 (Figure 29) secured to the cross-head 217 and provided with a ratchet mechanism 302 at its upper end.

Connected to each of the filling and crowning heads is a table 303 to which the crowns are fed by the flexible chutes 300. As these tables are all of similar construction, the explanation will be simplified by the description of a single crown feeding mechanism. The table 303 is provided with a bearing for a stud shaft 304, having a gear wheel 305 on one end thereof below the table and a curved crown feeding lever 306 on the opposite end thereof above the table, and arranged to oscillate to feed one crown during each movement of the filling and crowning head. A hollow stem 307 is provided with a head 308 by means of which the stem is secured to the filling and crowning head. Slidably mounted on this stem is a sleeve 309 which is provided with a rack 310 in mesh with the gear 305 to oscillate the same when the sleeve is reciprocated. The end of the sleeve 309 is provided with a flared mouth 311 arranged to engage an annular seat 312 on the head 308 when the sleeve is in the position shown in Figure 43, to form an air-tight joint and prevent air from escaping from the filling and crowning head. The inner end of the stem is provided with a packing ring 313, while the outer end of the stem is provided with cup leathers 313' to prevent air and water, which would otherwise be free to pass through the crown-receiving slot hereinafter described, from escaping outwardly between the sleeve and the stem. This stem is provided with a crown receiving slot 314 for the reception of the caps which are fed thereto by the curved arm 306. The crown caps are frictionally held in this position to prevent them from being displaced before they are actually placed in position by the proper mechanism. Slidably mounted within the opening in the hollow stem 307, is a sleeve 315 having at its outer end a head 316 to which the operating mechanism is connected. Slidably mounted within the sleeve 315 is a cap feeding rod 317 provided with a slot 318 (Figure 43) for the reception of a pin 319, which is secured in the walls of the sleeve 315 to permit a certain amount of lost motion between the rod and sleeve. Located within the sleeve and engaging one end of the rod 317 and the head 316, is a spring 320 which is arranged to move the rod 317 forward and feed a cap into the filling and crowning head at a predetermined time. Pivotally connected to a bracket 321 on the end of the sleeve 309, is a lever 322. One end of this lever is pivotally connected to a link 323 which is also pivotally connected to the head 316 on the end of the sleeve 315, while the other end of said lever is pivotally connected to one end of a rod 324 which is fixed against reciprocal movement by a connection 325 with a projection 326 on the table 303.

Projecting upwardly from the sleeve 309 are lugs 327' forming a pivotal connection for one end of a link 327 pivotally connected at its opposite end to the lower end of a walking beam 328, carried by a bracket 329 on the cross-head 217 of the filling and crowning head. Suitably connected to the walking beam 328 is a coil spring 330 for maintaining the walking beam in the position illustrated in Figure 48. One end of the spring 330 is connected to a pin 331 having a squared end 332 carrying a ratchet 334 cooperating with a catch 335. By reason of this construction the tension on the spring may be readily adjusted. The upper end of the walking beam 328 carries a roller 336 arranged to be engaged by a cam 337 on the yoke 241.

The arrangement of the crown feeding mechanism is such that when the filling and crowning head is moved upwardly by means of a bottle, as before described, all of the capping mechanism carried by the cross-head 217 and the filling and crowning head will be moved upwardly relative to the cam 337 on the yoke 241, whereby the walking beam will be rocked to move the sleeve to its closed position as shown in Figure 43. This inward movement of the sleeve 309 will close the opening 314 through which the cap was delivered to the stem 307, and during its forward movement will bring the plunger 317 into engagement with a cap and move the cap into engagement with the head of a bottle as clearly shown in Figure 43. As the rod 317 cannot move its full stroke in view of the cap, the spring 320 will be compressed, but as soon as the bottle is moved downwardly after the filling operation and just prior to the capping, due to the action of the dip $d$ in the plunger cam surface 124, the rod 317 will move the cap into position over the bottle, as shown in Figure 44. During the downward movement of the filling and crowning head, as more particularly hereinafter described, the sleeve 309 will be moved outwardly to uncover the slot 314 and during this movement the rack 310 will rotate the gear wheel 305 to operate the lever 306 to feed a crown into the slot 314. As the sleeve 309 moves outwardly the movement of the sleeve 315 will be compounded by the action of the lever 322, to move the rod 317 a distance far greater than the movement of the sleeve 309. This is done in order to give the cap feeding rod 317 a movement in excess of the movement of the sleeve.

It will be apparent that if it is desired to feed a cap manually into the filling and crowning head, the operator may accomplish this by placing his hand against the head 316 and pushing the same inwardly.

The table 303 is preferably provided with a slide 338 adapted to underlie the cap as it is pushed into the slot 314 by the action of the lever 306. This slide is normally held in its inner position by a spring 339, having one end connected thereto and its opposite end connected to a suitable point on the table. The slide is provided with a pin 340 projecting downwardly therefrom through a slot 340' in the table 303 to enable an operator to move the slide outwardly and permit a jammed or defective cap to drop downwardly through the table.

It has been found that during the operation of machines of this character there is a tendency for the crowns to stick in the chutes 300. To overcome this objectionable tendency the present machine is provided with a vibrator comprising a lever 341 (Figures 48 to 50), pivotally connected to the lower end of the chute 300 and provided with an arcuate slot 342 concentric with the pivotal connection of the lever with the chute and adapted to receive a pin 343 carried by a bracket 344, secured to the table 303. The lever 341 is provided with a pin 345 to which is secured one end of a tension spring 346 having its opposite end secured to the bracket 344. Due to this construction the lever 341 is normally held in the position illustrated in Figure 48. The walking beam 328 is provided with a projecting pin 347 so disposed as to engage the free end of the lever 341 when the walking beam is moved under the influence of the cam 337 from the position shown in Figure 48 to the position shown in Figure 43. At the conclusion of this movement the pin 347 will just clear the end of the lever 341, as shown in Figure 49, permitting the spring 346 to forcibly return the lever to the position illustrated in Figure 48. The provision of the pin and slot connection 342 and 343 insures considerable vibration in the chute as the parts are restored to their normal positions. During the return movement of the walking beam 328 to the position illustrated in Figure 48, the projecting pin 347 will pass the upper end of the lever 341, as illustrated in Figure 50. This construction insures the feeding of a crown through the chute 300 for each operation of the filling and crowning head. Each cap so positioned will be fed into the filling and crowning head, each time the plunger supporting roller 102 engages the dip $d$ in the plunger operating cam surface 124. The bottle with a cap in position thereon is illustrated in Figure 44. Thereafter, the plunger supporting roller 102 engages the high portion e of the cam surface 124, which results in raising the bottle into position shown in Figure 45. During this time the plunger on the bottle ejector piston 198 holds the cap firmly in position on the bottle neck until it is closed in about the neck by the operation of the crowning die 201.

As soon as the bottle has been crowned, it may be withdrawn from the filling and crowning head. To effect this operation the cam surface 124 is formed with inclined portion f permitting lowering of the bottle supporting plunger and the chuck carried thereby. Just before the inclined portion d becomes effective the roller 294ª on the bell crank 394 engages the inclined portion k of the cam 297, which swings the bell crank lever about its pivot 295, thereby raising the valve rod 290 and causing the lever 298 to move out of engagement with the stem 261 of the carbonated water check valve 259. This positively cuts off the supply of carbonated water prior to the crowning of the bottle. Thereafter, the roller 294ª engages the inclined portion 1 of the cam 397 further swinging the bell crank lever 294 about its pivot and raising the rod 290 into such a position that the foot 348 thereon engages the stem 267 of the valve 266 raising the same to unseat the valve and simultaneously unseat the valve 265 opening the port 268 to the exhaust chamber 254. This permits the pipe 191, leading from the chamber 264 to the throat rubber 187 to exhaust thereby relieving pressure from the throat rubber. At the same time, the pipe 349, connecting the chamber 263 with the auxiliary reservoir 226 and the air chamber 218, is permitted to exhaust into the chamber 254 to relieve the pressure therefrom, and preparing the parts for a new filling and crowning operation.

At this same time, the upward movement of the valve rod 290 rocks the lever 287 to move the valve 280 downwardly and permit the flow of oil from one side of the piston 278 to the other. This unlocks the filling and crowning head and permits the same to return to its normal position supported by the stop sleeves 216ª on the frame bars 216, these stop sleeves engaging the brackets 214 of the casing 212. With the head in its low position, the plunger roller 102 travels over the discharge portion g of the cam surface 124 bringing the chuck C into the position where the bottle may be discharged from the chuck. Referring to Figure 8, one of the chucks is shown in its lowered position ready to discharge the bottle carried thereby while the adjacent chuck which has just discharged its bottle is receiving a new bottle. Continued rotation of the machine in a counterclockwise direction will cause the bottom portion of the bottle to engage the take off finger 350 pivoted at 351 on the plate 25 above the feeder disk 17. At the same time, the upper portion of the bottle engages the discharge finger 352, shown in Figure 37, carried by the lower portion 184 of the filling and crowning head and preventing the bottle from toppling over. The bottom of the bottle is guided from the chuck by a discharge guide 353, as shown in Figure 20, having a pivotal mounting 354 on the supporting base 72 of the chuck. The discharge guide 353 is connected at its end to a tension spring 355 tending to hold the discharge guide in the position shown in Figure 20. Extending upwardly from the cover plate 356' is a spring pressed pin 356 (Figure 22) having an enlarged base portion 357 adapted to engage an opening 358 in the discharge guide and hold the same in retracted position against the tension spring 355 when the machine is operating on large or quart size bottles. The discharge guide 353, the discharge finger 352, and the take-off finger 350 all cooperate during the transfer of the filled and crowned bottle from the chuck to the feeder disk 17. The outside of the bottle is supported during this time by a leaf spring 359, carried by the spring guide arm 360 having a pivotal mounting 361 on the filler plate 74 and normally held in position over the feeder disk 17 by a spring pressed plunger 362. At its extreme outer end the spring guide arm 360 is provided with a supporting roller 363 traveling on the frame 5 of the feeder table. Due to this construction it will be apparent that the spring guide arm 360 may have a limited movement about its pivotal point 361 to accommodate bottles of different diameters.

In like manner, the feeding side of the disk 17 may be provided with a second spring guide arm 364 pivotally mounted at 365 on the feeder table frame and provided with an independently movable spring toe 366, normally held by a suitable spring construction in the position shown in Figure 8, the arm 364 being capable of moving outwardly in the direction of the arrow 367 in case of a jam in the machine. The spring guide arm 364 may be held in the position shown in Figure 8 by a suitable spring construction 368. The feeding side of the disk may also be provided with a guide arm 369 having a pivotal mounting 370 on the guide 29 and held in adjusted position by a pin 371 adapted to engage any of the openings 371'. This construction provides a guiding means for the bottles under the frictional feeding action of the feeding disk, during both the feeding action and the discharge onto the conveyor 2.

*Control brake.*

For stopping the machine at desired points, the outer member 139 of the friction driving clutch has passing therearound a brake band 372 of any standard construction connected to a brake band lever 373 by an adjusting bolt 372', as shown in Figure 23. This is shown in detail in Fig. 23ª. The lever 373 is pivoted at 373'. At its forward end the brake band lever 373 extends into a casing 374 (Figures 23 and 56) through a suitable slot 375. Within the casing 374 is pivoted a foot lever 376 adapted to be moved into the dotted line position shown in Figure 56 to the full line position shown therein, to raise the brake band lever 373 from its dotted to its full line position, and thereby release the brake. The brake band lever 373 is provided with a friction roller 377 cooperating with the foot lever 376 during this operation, and the roller is adapted to engage a switch arm 378 and thereby close the circuit to the driving motor 144, as will be more fully described hereinafter. At the same time, an armature 379 on the brake band lever engages the core of a magnet 380, which if energized as it is during normal running conditions, will hold the brake band lever in its elevated position. If for any reason the circuit is broken the brake band lever will drop to its dotted line position, shown in this figure, opening the switch 378 of the driving motor and applying the brake 372. The amount of braking action exerted by this brake may be regulated by a suitable stop screw 381 in the casing 374.

*Centralized control and safety system.*

Located on one side of the machine, adjacent the casing 374 for the brake foot lever, is a centralized control box 382, as shown in plan in Figure 2, in detail in Figures 57 to 62, and wiring diagram Figure 63. Within the casing 374 and the control box 382 are the various mechanisms required for the control of the machine. Due to the location of these parts in a central position, as shown, a single operator may effectively control the entire machine from a central point. Mounted within the control box 382 is a plunger switch 383 adapted when moved downwardly to close the circuit in which it is connected, and when moved upwardly to break said circuit. One side of the switch 383, which for convenience will be termed the machine switch is connected by a line 384 through an indicating light 385 to the wire 386, and then to a power line L by a suitable connection 387. The opposite side of the switch is connected by a wire 388 with one side of a plunger switch 389, hereinafter more fully described and normally in closed position during the operation of the machine. The plunger switch 389 is connected on its opposite side through a wire 390 with a second safety plunger switch 391. This switch in turn has its opposite side connected through a wire 392 to wire 393 connected to the other power line L' through a connection 394.

With the machine switch 383 in closed position, and with the plunger switches 389 and 391 also in closed position, the circuit through these switches and the lamp 385 will be completed. With this condition, current will also flow from the wire 384 and wire 395 to the switch magnet 396, the opposite side of which is connected to one of the contacts controlled by the switch arm 378 in the foot lever casing 374. The other contact controlled by this switch arm is connected by wire 398 from line wire L. This circuit places the lamp 385 and the switch magnet 396 in parallel with each other so that with the brake band lever 373 in its raised position the switch arm 378 will be in closed position thereby energizing the switch magnet 396. When the switch magnet 396 is energized, it will attract its armature 400 against the spring 401, thereby moving the switch blades 402 and 403, which are connected to the line wires L and L' respectively, from their full line positions of Figure 63 into their dotted line positions thereby closing the circuit to the driving motor 144 and the brake control magnet 380 through the wires 404 and 405, the driving motor and said control magnet being connected in parallel. The control magnet 380 will hold the brake lever 373 in its full line position of Figure 56, and permit the machine to operate. It will be apparent that opening the machine switch 383 or either of the plunger switches 389 or 391 will break the circuit through the switch magnet 396 thereby opening the motor circuit and de-energizing magnet 380 permitting application of the brake to stop the machine. The manner of controlling and operating the switch 383 will now be described in detail.

Extending transversely of the control box 382 is an upper shaft 406 having secured thereto a collar 407 carrying two arms 408 and 409, respectively, projecting from substantially diametrically opposite sides thereof. Projecting forwardly from the shaft 406 is a manual control lever 410 having a pin and slot connection 411' with the shaft as shown in detail in Figure 61. When the lever 410 is moved downwardly as viewed in Figure 57, the shaft 406 will be rotated in a clockwise direction thereby causing the arm 408 to engage the machine switch 383 and move the same downwardly into circuit-closing position. This operation will also cause the arm 409 to be raised into engagement with the catch 411 projecting downwardly from a collar 412 splined to a shaft 413 in the control box. This shaft is normally held in such position as to cause the catch 411 to engage the arm 409 by a spring 414 having an end in engagement with the collar 412 and the opposite end in engagement with the box 382. This catch holds the machine switch 383 in closed position. The switch will remain in this position unless released by an abnormal condition in the machine.

Extending outwardly from each crown table 303 is the projection 326 before described, and clearly shown in Figures 36 and 60. This projection carries a pivotally mounted pin 415 adapted to extend either in a vertical position, as shown in full lines in Figure 57, or in a horizontal position as indicated in dotted lines in Figure 60. This construction provides a safety pin 415 for each of the filling and crowning heads, the pins being raised and lowered with the crown tables 303 and the filling and crowning heads during the operation of the machine. If for any reason the head sticks in its upper position it may be termed a "high head", and if it remains in its lowest position it is termed a "low head". With either a "high head" or a "low head" the safety pin 415 is effective for releasing the machine switch 383. If, for example, one of the filling and crowning heads becomes stuck in its raised position due to failure of the oil cylinder to unlock the same, or for any other reason, the upper end of the pin 415 of that head, if the pin is in vertical position, will engage the cam lever 416 carried by the vertical shaft 417 and rotate the same against the action of the spring 418. The shaft 417 has projecting therefrom a lug 419 in engagement with the cam lever 420 splined to the shaft 413. Through the lug, the shaft 413 will be rotated against the action of its spring 414 and move the catch 411 out of engagement with the arm 409, thereby permitting the compression spring of the machine switch 383 to return the switch to its upper or open position. This will immediately break the motor circuit and apply the brake, as will be apparent, causing the defective head to stop in front of the operator.

On the other hand, if one of the chucks failed to receive a bottle, its head will remain in "low" position, or if a bottle becomes broken there will be a "low head". In such cases, the lower end of the pin 415 of that head, if the pin is in vertical position, will engage the cam lever 420, before described, and move the same downwardly to rotate the shaft 413 and release the machine switch 383 to stop the machine. Such head will also stop in front of the operator.

When the manual control lever 410 is manually raised, the lugs 410' will be engaged and moved from the full line position of Figure 61, to the dotted line position, thereby moving the catch 411.

If it is desired to permanently keep one of the chucks from receiving a bottle, in order to decrease the capacity of the machine, or for some other reason, the corresponding pin 415 may be swung to its horizontal position. When in this position, just before such chuck reaches its bottle-receiving position, it will engage the upper surface of the cam lever 421 carried by a sleeve 422 loosely journaled on the shaft 406. This sleeve has projecting forwardly therefrom an arm 423 cooperating with a second plunger switch 424 which will be called the feeder switch. This switch is of such construction that when moved to its lower position it opens its circuit, while when returned to its normal position by its compression spring it closes the circuit controlled thereby. In this respect it differs from the machine switch 383. When the cam lever 421 is forced downwardly, the arm 423 will move the switch 424 to its lower or open position. One side of this switch is connected with the wire 399 receiving current from the line wire L. The opposite side of the feeder switch has a connection 425 with one side of a plunger switch 426, the opposite side of which leads to the jumping pin magnet 67, Figs. 12 and 14.

The circuit for the jumping pin magnet 67 is completed through wire 427 connected to wire 393 having a connection 394 with the line wire L'. The switch 426 is normally in closed position as will be more fully shown hereinafter. The opening of the feeder switch 424, however, breaks the circuit through the jumping pin magnet thereby permitting the jumping pin 62 to be raised by its spring 63 into such position as to disengage the driving dog 41 from the slot 42 and prevent operation of the reciprocating feeder arm. In this way any one or more heads may be kept out of operation as long as desired. Of course, each operation of the reciprocating driver 26 will effect a resetting of the jumping pin 62 through the resetting cam 70. If the next head is in normal condition, the feeder switch will have returned to its upper closed position, the jumping pin magnet 67 be energized and the feeding for the remaining heads will not be interrupted.

Mention has herein been made to certain switches 389 and 391 in connection with the machine switch 383, and switch 426 in connection with the feeder switch 424. In order to fully understand the automatic nature of this machine, these switches will now be taken up.

The switch 389 is normally in closed position, but is adapted to be moved to open position by the take-off finger 350. Referring more particularly to Figure 8, it will be seen that the take-off finger 350 will be swung about its pivot 351 in case of a filled bottle becoming jammed during the discharge operation. This will cause the end thereof to rock the arm 428 about its pivot 429 against the action of the leaf spring 430 and the tension spring 431. The tension spring 431 has one end connected to an indicator 432 adapted to be moved about its pivot 432ª according to the size of bottle being operated upon, whereby the same movement of the take-off finger 350 will effect an opening of the switch 389 irrespective of the bottle size. The tip of the indicator 432 projects through the table housing, as shown in Figure 2 and is positioned according to the size of the bottle by a setting bolt 432ᵇ. Between the indicator 432 and the arm 428 is mounted the switch 389 so that movement of the arm 428 away from the indicator 432 will open the switch. When the switch is opened the result will be exactly the same as opening the machine switch.

In like manner, the switch 391 is adapted to be opened when the spring guide arm 364 is caused to move outwardly by a bottle jam on the feeding disk 17.

The switch 426 is similar in construction to the switches 389 and 391, but is adapted to be operated when an unusually tall bottle is fed by the conveyor 1 onto the disk 17. Adjacent the pivot 365 at the discharge end of the conveyor 1 is a bottle gage 433 on a rod 434 whereby the gage remains stationary during raising and lowering of the feeding table, the lower end of the rod being supported on the bracket 128 as shown in Figure 1. A bottle of too great height will engage the bottle gage 433 and open the switch 426. This will deenergize the jumping pin magnet 67 and prevent any further feeding operation. It will thus be apparent that a jam on the feeding-in side of the disk, a jam on the discharge side of the disk, a bottle which is too low or too high for the setting of the machine, a "low head" or a "high head" will each be effective for stopping either the entire machine or the feeding operation.

The feeder switch 424 may also be operated manually or by the machine in case of a jammed or defective cap. The manual control comprises a handle 435 secured to a shaft 436 in the control box. The switch 424 has a snap action produced by spring 439 and lever 440, of usual construction, tending to hold the handle either in upper or lower position. The lever 440 is secured at one end to a shaft 441 from which an arm 442 projects upwardly and then horizontally. The horizontal portion of the arm is so positioned as to be normally inoperative, but when, for any reason a cap becomes jammed, the bracket 321 on the crown feeder sleeve 309 will not move through its full stroke. This will cause a pin 443 thereon to engage the arm 442 and swing the same. This will move the feeder switch to inoperative position the same as the handle 435. The cam 421 and an arm 444 on the shaft 441 have a pin and slot connection 445 whereby the movement of the handle 435 upwardly will move the cam lever 421 downwardly.

By accurate adjustment of the brake, the machine may be quickly stopped, and always with the defective head directly in front of the operator.

By reference to Fig. 2, it will be seen that when the machine has been stopped with a defective head in front of the operator's position (that is adjacent the control box 382) the head immediately preceding such defective head will have reached the discharge station. This is desirable for several reasons. Assume first that it has been attempted to feed a high bottle to the machine and the bottle gauge 433 has thus been actuated, feeding of the bottles will stop, but the machine will continue to rotate until the first empty head reaches the control station. This low head will be effective for stopping the machine. By reason of such operation all of the filled bottles will have been discharged and the machine will be "cleared", instead of leaving some filled and capped bottles in the machine.

Next assume that for some other reason such as a head becoming stuck in a high position the machine is stopped without any prior stopping of the feeding mechanism. The particular arrangement of control box 382 and discharge station is desirable because it insures that the head immediately preceding the defective head will have been discharged from the machine. If the machine stops with the bottle jaws open but with the filled bottle still on the chuck, there is a tendency for the bottle to overturn when the machine starts up. Such tendency is not present once the machine is in operation, but it will be seen that if the control box were so located that the bottle preceding the defective head were not discharged, there would be danger of bottles being overturned, thus causing breakage of the product and possible damage to the machine.

Having described the general nature of the present machine and its control system, reference will be made to certain important details of construction illustrated in detail herein, but heretofore described generally.

Referring to Figure 32, it will be seen that the casting 297ª has portions 446 secured thereto to form the cam surface 297. This decreases the construction cost and enables the cam surface to be adjusted until the desired condition is obtained. Also, the casting 297ª has a guide plate 447 cooperating therewith and provided with guides 448 (Figures 34 and 35) cooperating with each of the bell cranks 294 to eliminate side thrust under the action of the rollers 294ª.

The syrup pump for each of the heads is of double plunger construction whereby not only can the amount of syrup fed during each operation be varied by adjusting the rod 238 to change the amount of lost motion before the pin 240 becomes effective, but it can also be varied by using one plunger or two plungers. Normally the inner plunger 236 is used, but in case a large amount of syrup is desired, an outer plunger 449 may be used conjointly therewith by unscrewing the ring 450 from the cylinder 234 (Figures 37 and 46), and moving it upwardly until the internal threads 451 may be engaged with the external threads 452 on the plunger 236 (Figure 47). With these threads in engagement, the outer and the inner plungers will move simultaneously and the capacity of the pump increased. The width of the ring 450 is such that the threads 451 and 452 can never be engaged until the ring is entirely unscrewed from the cylinder 234. In this manner accidents to the syrup pump are avoided.

At any time, either before or during the operation of the machine, the operator may test each of his syrup spies and the carbonated water chamber to be sure they are all full. The means for accomplishing this comprises a tube 454 leading from each of the spies as shown in Figure 2, and a tube 455 leading from the carbonated water chamber 181. These tubes may each be provided with a petcock 454' and 455' respectively at the outer end which may be opened at will. If water issues from the tube 455, the operator is assured that the water connections are in good order. If syrup issues from the tube 454, he is assured of a proper syrup supply. If one of the tubes 454 should be dry, he must either refill the syrup supply or cut out the corresponding heads by the corresponding pins 415.

The base B of the machine may be provided with a trough 456 into which water and foreign matter from the deflector D may pass, and the exhaust chamber 256 may have an exhaust connection 457 therefor. Due to the shape of the deflector, all pieces of broken glass and the like are immediately discharged from the machine and damage thereto avoided.

In Figures 64 to 67, both inclusive, there is disclosed a modified form of syrup and water feeding means for a feeding and crowning head. In these figures the parts corresponding in function to parts already described in connection more particularly with Figures 37 to 41, both inclusive, are indicated by the same reference characters with a prime affixed thereto. In this modified construction the exhaust 255' is in the form of a removable manifold, and access to each of the valves is easily obtained by removing the plugs 500 provided therefor.

In Figures 68 to 70, there is illustrated a modified form of bottle chuck, in which parts corresponding to parts already described in detail more particularly in connection with Figures 18, 19, 20 and 22, are indicated by the same reference characters with a prime affixed thereto in order to avoid prolixity of description. In this modified form of the invention a system of links 501 is provided for operating the bottle gripping jaws 81' and 86' in place of the gearing illustrated and described heretofore. The stud 79' in this construction may be circular to provide a bearing for the hollow externally squared stud 80' operating the jaw 86'. When the plunger 88' is moved in the direction of the arrow 502, each of the links 501 is moved as indicated by the arrows 503, and the jaws move as shown by the arrows 504.

Figures 71 and 72 illustrate a form of crown selector drive which may be used in place of the drive disclosed in Figure 29. With the exception of the changes required in the crown selector drive itself, the machine may be the same as that heretofore described and similar parts are designated by corresponding reference characters having a prime affixed thereto. In the modified construction the spring pressed rod 301 is eliminated and there is utilized in its place a rack 505 meshing with a pinion 506 on a shaft 507 extending horizontally and journalled in the L-shaped frame 273'. The section shown in Figure 55 is so made as to indicate the shaft 507 for this modified drive. Intermediate the pinion 506 and the shaft 507 may be located a ratchet mechanism 302', as before described, by means of which the necessary movement of the crown hopper is effected for feeding crowns into the crown chute each time a filling and crowning head is raised.

In Figures 73 to 78 there is illustrated a modified form of jumping pin and control therefor adapted to operate mechanically instead of electrically, as heretofore pointed out. In these figures the reference characters having a prime affixed thereto indicate parts corresponding to parts already described and functioning in a similar manner or for a similar purpose. In this form the projection 326' on each of the tables 303 carries a safety pin 415' adapted to be slid vertically either into the full line position illustrated in Figure 74 or to the dotted line position shown therein. The safety pin may be held in either of these positions by a suitable spring catch 508. This safety pin instead of operating an electric switch, is adapted when moved to its dotted line position to engage a lever 509 having a suitable pivotal mounting 510 and connected by a pitman 511 to one end of an arm 512 secured to a sleeve 513 on a shaft 514 vertically journalled in suitable bearings provided on the frame 5' of the feeding table. The sleeve 513 also has secured thereto, a projection having a cam face 515 adapted when the shaft 514 is rocked through the mechanism described to engage a roller 516 on one end of the pivoted lever 517 and rock the same in a counter-clockwise direction about its pivot 518. The opposite end of the lever 517 is connected to a rod 519 carrying a pawl 520 adapted to move into and out of an opening 521 formed in the body of the jumping pin 62'. If desired, a portion of the pawl 520 may be beveled to facilitate its engagement with an anti-friction roll 522 journalled in the opening 521 of the jumping pin. With this form of jumping pin, as with the form heretofore more particularly described in Figure 12, the jumping pin is normally urged upwardly by a spring 63 (not shown in these figures). Due to this construction, when the pawl 520 is drawn outwardly in the manner described against its spring 523, it will release the jumping pin and permit the same to move upwardly into such a position that no bottle is fed into that particular chuck controlled by the pin 445' set in the position just described. A similar form of resetting cam 70' is provided for resetting the jumping pin each time the reciprocating driver arm for the bottle feed mechanism is operated.

In some cases, it may be desirable to operate the feeder disk 17 intermittently instead of continuously, as before described. A modified form of apparatus for effecting this operation is disclosed in Figure 79, in which figure parts corresponding to parts already described are designated by the same reference characters with a prime affixed thereto. Instead of providing the feeder disk with a grooved pulley 20, it is provided with a ratchet wheel 545, adapted to be operated intermittently by a ratchet mechanism 546 carried by a bell crank lever 547, having a pivotal mounting 37'. The bell crank lever 547 carries the follower roller 38', which contacts with the surface of the feeder cam 39'. Secured to the bell crank 547, so as to move therewith, is a crank arm 548, having a link 549, pivotally connected to its free end. The link 549 has a pivotal connection 550 at its opposite end with a pitman 551. This pitman is normally held in its retracted position by a spring 552, but is adapted to be forced outwardly against the action of said spring by the follower roller 38', each time a high point on the feeder cam 39' engages the same. The pitman 551 is connected to the reciprocating device 26 of the bottle-feeding mechanism. With this construction, it will be apparent that each time a high point on the feeder cam 39' engages the follower roller 38', the disk 17 and the reciprocating device 26 will both be operated.

In Figure 80 of the drawings, there is illustrated a modified form of feeding mechanism for transferring bottles from the feeder disk to the bottle machine. In this figure, which corresponds generally to Figure 8, parts corresponding to parts heretofore described are designated by the same reference characters with a prime affixed thereto. In this construction, the reciprocating device and the reciprocating feeder are replaced by intermittently rotated star wheel feeding disks 555, mounted in spaced relationship on a vertically extending shaft 556, carried by the spring guide arm 364'. Each of the disks 555 is provided with three equally spaced bottle-receiving openings 557, adapted to pass across the feeder disk 17' and receive a bottle. Operatively connected with the lower feeding disk 555 are three operating fingers 558. Pivotally carried by each of the supporting bases 72' of the bottle chucks is a bell crank 559. One arm of each bell crank carries a roller 560, while the opposite arm of each bell crank is engaged by a tension spring 561. These tension springs normally urge the bell cranks about their pivotal mountings in such manner as to project the rollers 560 into the path of the operating fingers 558. Continued rotation of the bottling machine after one of the rollers 560 engages one of the fingers 588 will result in rotation of the feeding disks 555, thereby causing one of its openings 557 to deliver a bottle to the bottle chuck the roller of which effected such movement.

When it is desired to throw any one head out of operation, its safety pin is moved, as before described, to horizontal position for engaging the cam lever 421, operating the feeder switch 424. With the feeder switch 424 in inoperative position, the circuit to the magnet 67', Figure 81, corresponding to the jumping pin magnet 67, will be broken. As soon as the magnet 67' is de-energized, it will release the armature 562, which is formed as a projection on the arcuate cam 563 pivotally mounted on the pin 564, Figure 82. The tension spring 565 will draw the cam 563 upwardly until the stops 566 are brought into engagement. With the cam 563 in upper position, an arm 567 carried by the pivot 568 forming the mounting for the bell crank 559 will engage its operating face and hold the roller 560 in the dotted line position of Figures 80 and 82. In this position the roller will not engage one of the operating fingers 558 on the feeding disk, and the feeding disks will remain stationary. In chain lines in Figure 80 there is illustrated the relative positions of the roller 560 for either engaging or passing the star wheel, thereby either feeding a bottle or skipping a head, corresponding to the solid and dotted positions of the roller 560 respectively.

The take off finger 350' may also be modified, if desired, as illustrated in Figures 80, 83, and 84. At its rear end, the take off finger may carry an adjustable projection 570 provided at one end with a series of holes 571 adapted to be held in adjusted position for different sized bottles by a pin 572 passing through one of said openings and engaging a corresponding opening 573 in the take off finger. Both the take off finger and the projection 570 are pivotally mounted on a pin 574 projecting upwardly from the feeder table plate 25'. Surrounding the pin 574, and positioned within a boss 575 on the projection 570, is a spring 576 abutting at its upper end against a nut 577 and at its lower end against the bottom of the boss 575. The bottom of the boss is formed with a groove 578 co-operating with a key 579 extending through the pin 574. The free end of the projection 570 engages a forked member 580 carried by a pivot 581 in the feeder table plate 25'. The member 580 has a snap action from one extreme position to the other by means of a tension spring 582 co-operating therewith. When a bottle jam occurs, the member 580 will be engaged by the projection 570 and swing with its pivot in a counter-clockwise direction against the stop 583. Upon continued movement of the take-off finger, the action of the spring 576 will be overcome and the groove 578 will ride out of engagement with the key 579, thereby permitting the take-off finger to move independently of the projection 570. The lower end of the pivot 581 carries one of the contacts of a switch 389' in circuit with the machine switch 383, whereby such movement of the forked member will open the motor circuit and stop the machine.

In Figure 83 there is disclosed a form of bottle feeding mechanism for transferring bottles directly from a conveyor 584, movable in the direction of the arrow 585, to the bottle machine. As the feeding mechanism is constructed as disclosed for example in Figure 8, its operation and construction will not be described in detail. It will be sufficiently understood from the drawing in which parts corresponding to parts already described are referred to by the same reference characters with a prime affixed thereto. The take-off finger operates exactly as described in connection with Figures 80 and 84 and the parts thereof are designated in the same manner.

It will be readily understood that any of the various modifications, together with many others which will suggest themselves to those skilled in the art, may be embodied in the present machine without departing from the spirit of the invention or the scope of the appended claims.

It will also occur to those skilled in the art that "still liquids," such as grape juice or the like, may be bottled by the present machine by withdrawing the pins 240 to throw the syrup pumps out of operation, and feeding the still liquids to the machine in place of carbonated water.

When it is desired to designate the syrups in the different bottles, the crown hoppers may be filled with crowns bearing characteristics, designating the respective flavors fed by the heads to which they deliver crowns. In this manner the present machine may deliver a continuous string of bottles in successive series with different flavors, and with designating crowns. This is an important feature of the invention.

Also, since the amount of syrup fed to any one of the heads may be varied by suitably adjusting the respective syrup pumps, it will be understood that the degree of gas saturation, or the gas content may be varied at will. This necessarily follows, as with less syrup there will be a greater amount of carbonated water and consequently a higher degree of gas saturation, while with more syrup the opposite is true.

By the term "syrup" as used throughout the specification and claims, it is not contemplated to exclude unsweetened flavors or extracts. The term is, however, used in its broadest sense and is inclusive of sweetened or unsweetened syrups, flavors or extracts and the like.

The advantages of the present machine arise from the construction disclosed, permitting ease of control and enabling a fully automatic operation thereof.

Further advantages arise from the means provided for varying the capacity of the machine, in that any number of heads may be cut out of operation, and for adapting the same to bottles of different sizes.

Still further advantages are obtained by the provision of a plurality of independent syrup supplies and from the mechanism provided for controlling the various syruping, water filling and crowning operations.

I claim:

1. A rotary bottling machine, comprising a plurality of bottle filling heads, means for rotating said machine to bring said heads to successive stations, and means manually movable to different positions and normally held in predetermined position by a bottle for rendering said rotating means inoperative when a bottle in any one of said heads is broken, substantially as described.

2. A rotary bottling machine, comprising a plurality of bottle filling heads, means for rotating said machine to bring said heads to successive stations, and means rendering said rotating means inoperative when a bottle in any one of said heads is broken, said last named means being normally maintained in elevated inoperative position by a bottle itself and being effective for stopping such head in a predetermined position, substantially as described.

3. A rotary bottling machine, comprising a plurality of bottle filling heads, means for rotating said machine to bring said heads successively to a plurality of different stations, spaced control means for automatically rendering said rotating means inoperative when a head at one of said stations is either too high or too low, and an adjustable trip carried by each head for operating one or the other of said spaced control means, substantially as described.

4. A rotary bottling machine comprising a plurality of bottle filling heads, means for rotating the machine to bring said heads successively to a plurality of different stations, a control station past which the heads rotate, means at the station adapted to be actuated by any of the heads if such head does not occupy a predetermined position when passing the station, said means being effective for rendering the rotating means ineffective, and brake means also actuated by said means at the station, substantially as described.

5. A rotary bottling and crowning machine, comprising a plurality of bottle filling and crowning heads, means for rotating said machine to bring said heads successively to a plurality of stations, means for delivering crowns to said heads, and means operated by said last named means for automatically rendering said rotating means inoperative if said crown feeding means is inoperative, substantially as described.

6. A rotary bottling and crowning machine comprising a plurality of bottle filling and crowning heads, means for rotating the machine, a control station past which the heads rotate, means at the station adapted to be actuated by any of the heads if such head does not occupy a predetermined position when passing the station, said means being effective for rendering the actuating means ineffective, and brake means also actuated from the station, substantially as described.

7. A rotary bottling machine, comprising a plurality of bottle filling heads, means for rotating said machine to bring said heads successively to a plurality of stations, a bottle support cooperating with each of said heads, means at one of said stations for feeding a bottle to each of the supports, and means for rendering said bottle feeding means ineffective for feeding a bottle to any of said supports as desired, while continuing the feed to the remainder of said supports, substantially as described.

8. A rotary bottling machine, comprising means for rotating the same, means for delivering empty bottles to said machine, means for filling said bottles, means for discharging filled bottles from said machine, and means rendering said rotating means inoperative upon breakage of any of said bottles during the filling operation, said last named means being normally maintained in predetermined position by the bottle being operated upon, substantially as described.

9. A rotary bottle filling and crowning machine, comprising a bottle support, a filling and crowning head cooperating with said support, a crown hopper, a chute for delivering crowns from said hopper to said head, and means for positively transferring the crowns from the chute to the head and vibrating the chute to insure the feed of crowns therethrough, substantially as described.

10. A rotary bottling machine, comprising means for rotating the same, a plurality of bottle supports, a plurality of filling heads cooperating therewith, and adapted to be raised by the bottles on said supports, means for filling the bottles, and means operated by the head for automatically rendering said rotating means inoperative if any of said heads remain in their raised positions, each of said heads having a pivotally mounted trip for operating said last named means, substantially as described.

11. A rotary bottling machine comprising driving means, a plurality of bottle supports, a plurality of filling heads cooperating therewith, the heads being adapted to be raised by bottles on the supports, means operated by a head for automatically rendering the driving means inoperative if a head remains in its raised position, braking means, and adjustable control means for the braking means insuring stopping of such raised head at a predetermined point, substantially as described.

12. A rotary bottling machine, comprising a plurality of bottle gripping chucks, plungers for supporting said chucks, means for rotating said machine to bring said chucks successively to a plurality of different stations, means effective for opening and closing said chucks as they are rotated, a bottle filling head cooperating with each of said chucks, means effective during rotation of said machine for bringing said chucks and heads into cooperative engagement for filling the bottles carried by said chucks, and means for simultaneously raising or lowering all of said chucks to accommodate the machine to bottles of different sizes, said chuck opening and closing means being effective in any adjusted position of the chucks, substantially as described.

13. A rotary bottling machine, comprising a plurality of bottle gripping chucks, plungers for supporting said chucks, means for rotating said machines to bring said chucks successively to a plurality of different stations, means effective for opening and closing said chucks as they are rotated, a bottle filling head cooperating with each of said chucks, means effective during rotation of said machine for bringing said chucks and heads into cooperative engagement for filling the bottles carried by said chucks, means for simultaneously raising or lowering all of said chucks to accommodate the machine to bottles of different sizes, said chuck opening and closing means being effective in any adjusted position of the chucks, and means predetermined for automatically rendering said rotating means inoperative when a bottle on any of said chucks becomes broken, substantially as described.

14. A rotary bottling machine comprising a plurality of independently vertically movable bottle chucks, a plurality of filling heads co-operating with the chucks, means for delivering empty bottles to the chucks, means for discharging filled bottles from the chucks, elevating means for the bottle chucks effective for bringing them into suitable relation with the delivering and discharge means and for moving bottles on the chucks in a vertical direction between delivery of bottles to the machine and discharge therefrom, and means for simultaneously adjusting the vertical position of the chucks and of said feeding and discharge means to accommodate the machine to bottles of different sizes, substantially as described.

15. A rotary bottling machine, comprising a supporting base, an elevating cam carried thereby, a plunger cam supported by said elevating cam and having a plunger engaging surface substantially in vertical alinement with the elevating cam, means for operating the elevating cam to raise or lower said plunger cam, and a plurality of bottle chucks cooperating with said plunger cam and adapted to be raised or lowered simultaneously therewith, substantially as described.

16. A rotary bottling machine, comprising a supporting base, an elevating cam mounted thereon, a plunger cam carried by said elevating cam and having a plunger engaging surface substantially in vertical alinement with the elevating cam, a plurality of bottle chucks controlled by said plunger cam, means for rotating said bottle chucks to bring the same into cooperative engagement with different portions of said cam, and means for rotating said elevating cam to simultaneously raise or lower all of said chucks, substantially as described.

17. A rotary bottling machine, comprising a rotating chuck supporting member, means for rotating said member, a plurality of bottle receiving chucks supported by said member, movable bottle gripping jaws in each of said chucks, means for opening and closing said jaws during rotation of said member, means for adjusting said chucks vertically relatively to said member and means controlled by the said member for delivering empty bottles to said jaws when in open position, substantially as described.

18. A rotary bottling machine comprising a rotary deflector adapted to discharge pieces of broken glass outwardly from the machine, means for rotating said deflector, a plurality of bottle chucks operatively supported by said deflector, bottle gripping jaws for said chucks, means for opening and closing said jaws during the rotation of said deflector, means for delivering empty bottles to and discharging filled bottles from said chucks, means for filling the bottles, and means effective for rendering the rotating means ineffective, said means being actuated upon breakage of the bottle, the means being ordinarily prevented from acting by a bottle itself, substantially as described.

19. A rotary bottling machine, comprising a rotary deflector adapted to discharge pieces of broken glass outwardly from the machine, means for rotating said deflector, a plurality of bottle chucks operatively supported by said deflector, bottle gripping jaws for said chucks, means for opening and closing said jaws during the rotation of said deflector, means for delivering empty bottles to and discharging filled bottles from said chucks, heads for filling the bottles, and means engaged by said heads for rendering said rotating means inoperative upon the breakage of any of the bottles on said chucks, substantially as described.

20. A rotary bottling machine, comprising means for rotating the same, a motor for driving said means, a brake for said means, means for normally holding said brake in inoperative position during the proper operation of said machine, means for applying said brake to stop the driving means during the improper operation of said machine, and a controlling switch operated by the movement of said brake for rendering said motor ineffective for driving said first mentioned means, substantially as described.

21. A rotary bottling machine, comprising means for rotating the same, a plurality of filling heads, a safety device carried by each of said heads, and means projecting into the path of said safety device and adapted to be engaged thereby when in improper position for automatically stopping the machine, substantially as described.

22. A rotary bottling machine, comprising means for rotating the same, a plurality of bottle supports, a plurality of filling heads cooperating therewith and adapted to be raised and lowered by the bottles on said supports, a safety device carried by each of said heads, and means projecting into the path of said safety device and adapted to be engaged thereby when the heads are in improper positions for rendering said rotating means inoperative, substantially as described.

23. A rotary bottling machine, comprising means for rotating the same, a plurality of bottle supports, a plurality of filling heads cooperating therewith and adapted to be raised and lowered by the bottles on said supports, a safety device carried by each of said heads, means projecting into the path of said safety devices and adapted to be engaged thereby when the heads are in improper positions for rendering said rotating means inoperative, and braking means effective for stopping the machine at a predetermined point, substantially as described.

24. In a rotary bottle filling machine, means for rotating the same, means for delivering bottles to the machine, supports for receiving said bottles, filling heads cooperating with said supports and adapted to be moved by the bottles thereon, means for positively locking said heads in the positions to which they are moved by said bottles, and means for controlling the locking and unlocking of said locking means, substantially as described.

25. A rotary bottle filling and crowning machine, comprising a plurality of bottle supports, a plurality of filling and crowning heads cooperating with said supports, crown-hoppers, chutes for delivering crowns from said hopper to said heads, and means for vibrating said chutes for insuring the feeding of crowns to said heads, substantially as described.

26. A rotary bottle filling machine, comprising bottle supports, filling and crowning heads cooperating therewith, flexible chutes connected to each of said heads for delivering crowns thereto and means for automatically vibrating said chutes to insure the passage of crowns therethrough, substantially as described.

27. A bottling machine, comprising a bottle support, a filling and crowning head cooperating therewith, crown-feeding means for said head and means for automatically vibrating said crown feeding means to insure the delivery of crowns to said head, substantially as described.

28. The combination with a bottling machine, of bottle feeding means therefor comprising a rotating disk, means for rotating said disk, means for supplying bottles to said disk, and reciprocating means controlled by the bottling machine for bodily gripping a bottle on said disk and transferring the same to the bottling machine, substantially as described.

29. The combination with a bottling machine of means for feeding bottles thereto, comprising a rotating disk, means for rotating said disk, means for delivering bottles to said disk, and means controlled by said machine and movable transversely of said disk for gripping and transferring a bottle from said disk to said machine, substantially as described.

30. The combination with a bottling machine, of bottle feeding means therefor, comprising a rotating disk, means for continuously rotating said disk, means for delivering bottles to said disk, and means controlled by said machine and movable transversely of said disk for gripping and transferring bottles from said disk to said machine, substantially as described.

31. A bottle feeding mechanism for bottling machines, comprising a driven member, a bottle gripping jaw carried thereby, means for delivering a bottle laterally to said jaw, means for driving said member at substantially right angles to the path of delivery of a bottle to transfer the bottle to the desired point, means for gripping said bottle at the commencement of the transfer operation, and means for releasing the bottle at the conclusion of the transfer operation, substantially as described.

32. The combination with a rotary bottling machine and means for rotating the same, of a feeding disk, a plurality of guides cooperating with said disk, and means controlled by said guides for rendering said rotating means inoperative upon predetermined movement thereof in one direction, substantially as described.

33. The combination with a bottling machine and means rotating the same, of a bottle feeding disk cooperating therewith, a plurality of bottle supports adapted during rotation of said machine to be brought into cooperative relation with said feeding disk, means for transferring bottles from said disk to said supports when in cooperative relation, means for simultaneously adjusting the vertical position of said supports, and said feeding disk to accommodate bottles of different sizes, and means cooperating with said feeding disk for partially counterbalancing the weight thereof, substantially as described.

34. A bottle filling and crowning machine, comprising a filling and crowning head, a crown feeding table cooperating with said head, means for delivering crowns to said table, vibrating means for said deliverying means, and means for transferring the crowns from said table to said head, substantially as described.

35. A bottle filling and crowning machine, comprising a filling and crowning head, a crown feeding table cooperating with said head, means for delivering crowns to said table, vibrating means for said delivery means, means for transferring the crowns from said table to said head, and means permitting removal of jammed crowns through said table, substantially as described.

36. The combination with a bottling machine and means for driving the same, of a bottle feeding mechanism and means spaced above the bottle feeding mechanism and adapted to be engaged by a bottle, the last mentioned means cooperating with the bottle feeding mechanism for rendering said driving means inoperative if a bottle of undue height is feed to the machine, substantially as described.

37. In a bottling machine, means for operating the same, and means located above the plane of a bottle of normal height adapted to engage a bottle of too great height to control the feed of bottles to said machine, substantially as described.

38. In a bottle filling and crowning machine, a bottle filling and crowning head, means for feeding crowns to said head, and means controlled by said crowns for controlling the operation of said machine, substantially as described.

39. In a rotary bottle filling and crowning machine, a bottle filling and crowning head, means for feeding crowns to said head, and means controlled by said crowns for controlling the rotation of said machine, substantially as described.

40. In a bottling machine, a plurality of supports movable in a horizontal path, each of said supports having a bottle receiving surface, means for raising and lowering the bottle receiving supports during the horizontal movement, a conveyor for delivering bottles to the supports, a conveyor for removing bottles therefrom, and means for simultaneously adjusting the position of the conveyors and also of said bottle supports so that the conveyors will be at the proper height to deliver or receive bottles from the supporting surfaces regardless of the vertical adjustment of said surfaces, substantially as described.

41. In a bottling machine, a plurality of independently vertically movable bottle supports each adapted for sidewise movement in a horizontal path, a conveyor for delivering bottles to the supports, a conveyor for removing bottles therefrom, and means for simultaneously raising or lowering the conveyors and adjusting the vertical height of the bottle supports so that the supports will always be in proper relation to the conveyor for an interchange of bottles, substantially as described.

42. A rotary bottling machine comprising driving means, a plurality of bottle supports, a plurality of filling heads cooperating therewith, the heads being adapted to be raised by bottles on said supports, means operated by a head for automatically rendering the drive means inoperative if said head remains in a raised position, a gravity operated brake effective for stopping the rotation of the machine when the drive means is rendered inoperative, and means limiting the movement of the gravity operated brake, substantially as described.

43. A rotary bottling machine, comprising a plurality of bottle filling heads, means for rotating said machine to bring said heads to successive stations, and means for automatically stopping a head in predetermined position in case a bottle thereon becomes broken, said last mentioned means being normally maintained inoperative by a bottle itself substantially as described.

44. A rotary bottling machine, comprising means for rotating the same, a plurality of bottle supports, a plurality of filling heads cooperating therewith and adapted to be raised by the bottles on said supports, means for filling the bottles, and means for automatically stopping a head at a predetermined point in case the same remains in raised position, said last named means being operated by such head, substantially as described.

45. A rotary bottling machine, comprising means for rotating the same, means for delivering empty bottles to said machine, means for filling said bottles, means for discharging filled bottles from said machine, and means for automatically rendering said rotating means inoperative upon breakage of any of said bottles, said means being normally maintained inoperative by a bottle itself, substantially as described.

46. A rotary bottling, filling and crowning machine, comprising means for rotating the same, means for delivering empty bottles to said machine, means for filling said bottles, means for crowning the filled bottles, means for discharging the crowned bottles from said machine, and means normally maintained inoperative by a bottle itself, for automatically rendering said rotating means inoperative upon breakage of any of said bottles during the crowning operation, substantially as described.

47. The combination with a bottling machine, and means for rotating the same, of a bottle feeding means cooperating therewith, a plurality of bottle supports adapted during rotation of said machine to be brought into cooperative relation with said feeding means, means for transferring bottles from said feeding means to said supports when in cooperative relation, means for simultaneously adjusting the vertical position of said supports and said feeding means to accommodate bottles of different sizes, and means cooperating with said feeding means for partially counterbalancing the weight thereof, substantially as described.

48. The combination with a bottling machine, and means for rotating the same, of a bottling feeding means cooperating therewith, a plurality of bottle supports adapted during rotation of said machine to be brought into cooperative relation with said feeding means, a transfer means effective for urging bottles from said feeding means to said supports when in cooperative relation, and means for simultaneously adjusting the vertical position of said supports and said feeding means to accommodate bottles of different sizes, substantially as described.

49. Apparatus for filling and crowning bottles, comprising a plurality of filling heads, means for feeding bottles successively thereto, a source of water for the several heads, a plurality of flavor sources connected to different heads, and a plurality of cap supply means associated with different heads, whereby said heads are effective for producing successive series of filled bottles of different flavors, each properly identified by its cap, substantially as described.

50. A rotary bottling machine, comprising a plurality of bottle filling heads, an electric motor for rotating said machine to bring said heads successively to a plurality of different stations, switches for opening said motor circuit in case a filling head does not occupy a predetermined position, and means on each of said heads for operating said switches, each of said switches having spaced operating means whereby the switches are operated when the head is either too high or too low, substantially as described.

51. A rotary bottling machine, comprising a plurality of bottle filling heads, an electric motor for rotating said machine to bring said heads successively to a plurality of different stations, switches for opening said motor circuit in case a filling head does not occupy a predetermined position, means on each of said heads for operating said switches, and a brake adjustable for stopping the machine with a given head in predetermined position, substantially as described.

52. In a bottling machine, a plurality of rotating bottle supports, an electric motor for rotating said supports, a brake for stopping the rotation of said supports, magnetic means for normally maintaining said brake in inoperative position, circuit breaking means adapted to break the circuit to said magnetic means, and means rotatable with said supports for operating said circuit breaking means to release the brake, substantially as described.

53. In a bottling machine, a plurality of rotating bottle supports, an electric motor for rotating said supports, a brake for stopping the rotation of said supports, magnetic means for normally maintaining said brake in inoperative position, circuit breaking means adapted to break the circuit to said magnetc means, and means for operating said circuit breaking means to release the brake, substantially as described.

54. In a bottle filling machine, a plurality of rotating filling and crowning heads, a separate crown hopper for each of said heads, a plurality of syrup feeding means, and means connecting each of said syrup feeding means to a plurality of heads, substantially as described.

55. In a bottle filling machine, a plurality of rotating filling and crowning heads, a separate crown hopper for each of said heads, a plurality of syrup feeding means, means connecting each of said syrup feeding means to a plurality of heads, and means for continuously supplying syrup to said machine during the operation thereof, substantially as described.

56. In a bottle filling machine, a plurality of filling and crowning heads, means for supplying crowns to each of said heads, a plurality of syrup supplies, means connecting each of said supplies to a plurality of heads, a common water chamber, means connecting said water chamber to all of said heads, and means for continuously supplying water and syrup to said machine during the operation thereof, substantially as described.

57. In a bottle filling machine, a plurality of filling and crowning heads, a plurality of syrup spies, means for supplying syrup to said spies continuously during the operation of the machine, and means for connecting each of said spies to a plurality of heads, substantially as described.

58. A rotary bottling machine, comprising a plurality of bottle filling heads, means for rotating the machine to bring said heads successively to a plurality of different stations, a plurality of separately operable control means past which the heads rotate and adapted to be operated by different parts of the bottling machine, if such parts do not occupy a predetermined position when passing said control means, the control means being effective for rendering the rotating means ineffective and braking means effective for stopping the machine in a predetermined position upon operation of said control means, substantially as described.

59. A rotary bottling machine, comprising rotating means, a brake therefor, control means effective for holding the brake in an inoperative position during the normal operation of the machine and actuating means adapted to be set into operation by abnormal operation of the machine, said actuating means being effective for releasing the hold on the brake, substantially as described.

60. In a rotary bottling machine, a supporting base, bottle filling means carried thereby, a liquid supply extending through said base, a liquid chamber receiving liquid from said supply, means for delivering liquid from said chamber to said bottle filling means, and a plurality of separate syrup sources operatively connected to different heads and adapted to deliver different syrups to different heads of said machine during the operation thereof, substantially as described.

61. A rotary bottling machine, comprising a supporting base, means rotatably carried by said base for filling the bottles supplied thereto, a stationary carbonated water supply, a plurality of stationary syrup supplies, a connection between the water supply and the filling means, and connections between said stationary syrup supplies and said rotating filling means, substantially as described.

62. A rotary bottling machine, comprising a plurality of rotatable bottle chucks, means for rotating the same, a feeder adapted to grip a bottle and move the same from a feed position to a chuck, the motion of the feeder being in timed relation with the rotation of the bottle chucks, a disk for supplying bottles to the feed position, and means for discharging bottles from the chucks back on to said disk, substantially as described.

63. The combination with a bottling machine, of bottle feeding means comprising a rotatable disk, a conveyor for supplying bottles thereto, means for transferring bottles from the disk to the machine, means for transferring said bottles from the machine to the disk, a conveyor for removing the bottles from the disk, and means for vertically adjusting the position of the disk, the conveyors being movable vertically with the disk at the portions thereof adjacent the disk, substantially as described.

64. The combination with a bottling machine, of bottle feeding means therefor, comprising a feeder adapted to move from a feed position to a discharge position and having means adapted to grip the bottle during such movement, a disk for supporting bottles to be fed, the disk permitting slippage of the bottles thereon, and guides cooperating with the disk to guide the bottles into the feed position to be gripped by the feeder, substantially as described.

65. The combination with a bottling machine, of a bottle feeding mechanism therefor, comprising a reciprocable jaw adapted to move from a feed position to a discharge position, a rotating feed disk permitting slippage of the bottles thereover, means for supplying bottles to the disk, and guide means cooperating with the disk to urge bottles into the feeding position, the reciprocable jaw being adapted to grip a bottle in the feed position and transfer the same to the discharge position, said jaw being effective for maintaining bottles out of the feed position during its movement, substantially as described.

66. In a bottling machine, a plurality of bottle supports, means for rotating said supports and bottle feeding mechanism comprising a rotatable disk, means for supplying empty bottles to said disk, means for individually transferring empty bottles from the disk to such supports, the last-mentioned means operating in timed relation with the supports, and means for rendering the transfer means inoperative if it is desired to skip the feeding of a bottle to one of said supports, substantially as described.

67. A rotary bottling machine comprising a plurality of bottle receiving supports, a cam for moving the supports vertically, and filling heads for filling the bottles carried by said supports when the bottles are raised into engagement therewith by the cam, the cam having a portion adapted for initially rapidly raising the supports, and having a succeeding portion for more slowly raising the same prior to the completion of the filling operation, substantially as described.

68. A bottle filling machine including a frame, a bottle filling head movable with respect thereto, means for driving the machine, means controlled by a bottle in the head for rendering the driving means ineffective and means resisting continued travel of the head after the driving means has been rendered ineffective for bringing the head to rest in a predetermined position relative to the frame, substantially as described.

69. A rotary bottling machine including a frame, a rotatable member mounted on the frame and carrying a bottle filling head, means for rotating the member, means controlled by the bottles for rendering the rotating means ineffective and means resistant to continued rotation of the member after the rotating means has been rendered ineffective for bringing the member to rest in a predetermined position relative to the frame, substantially as described.

70. In a rotary bottling machine, means for feeding bottles thereto, and means spaced above the bottle feeding means and adapted to be engaged by a high bottle, the last mentioned means being effective for controlling the rotation of the machine, substantially as described.

71. In a bottling machine, means for feeding bottles thereto, and means spaced above the bottle feeding means and adapted to be engaged by a high bottle, the last mentioned means being effective for controlling the operation of the machine, substantially as described.

72. In a bottle filling and crowning machine, a plurality of filling and crowning heads, separate crown supply means for the several heads, bottle feeding means and a common control means for the feeding means, the control means being adapted for actuation by a crown delivered to any of said heads, substantially as described.

73. A bottling machine comprising a plurality of heads, each adapted to fill and crown bottles, a plurality of flavor supplies, certain of the heads being supplied from a different flavor supply than other of the heads, means for supplying crowns to the several heads corresponding to the flavors used therein, the heads discharging filled bottles sequentially, whereby the machine delivers bottles in successive series containing different flavors and properly crowned, and means for rendering a head inoperative, substantially as described.

74. A rotary bottling machine comprising a plurality of bottle filling heads, means for moving bottles into engagement with the heads, means for rotating the bottles and the heads, the heads being adapted for movement in a predetermined path by the bottles themselves, control means normally out of the path of such heads as they are moved by the bottles, and means on a head for operating said control means if the head departs from the predetermined path, substantially as described.

75. A rotary bottling machine, comprising a frame, a plurality of bottle filling heads rotatable on the frame, means for moving the bottles into engagement with the heads, means for rotating the bottles and the heads, the heads being adapted for movement in a predetermined path by the bottles themselves, control means normally out of the path of such heads as they are moved by the bottles, means on a head for operating said control means if the head departs from the predetermined path and including means resistant to continued rotation of the heads for bringing the heads to a stop in a predetermined position relative to the frame when the control means is actuated, substantially as described.

76. A rotary bottling machine comprising rotating means, control means therefor, bottle feeding means, control means therefor, and separately operable means, each adapted to be operated by different parts of the machine for actuating the feed control means independently of the first mentioned control means, substantially as described.

77. A rotary bottling machine comprising rotating means, a control therefor, bottle feeding means, a control therefor, and separately operable means each adapted to be operated by different parts of the machine for actuating the two control means independently, substantially as described.

78. A rotary bottling machine comprising a supporting base, means rotatably carried by said base for filling the bottles supplied to said machine, a stationary carbonated water supply, a plurality of stationary syrup supplies, means for delivering carbonated water from its supply to the filling means, and separate means associated with each of said filling means for supplying syrup from said sources to said filling means, substantially as described.

79. The combination with a bottling machine and means for rotating the same, of a feeding mechanism cooperating therewith, means for delivering bottles to said feeding mechanism, and means spaced above the bottle delivering means adapted to be engaged by a bottle, said means being effective for rendering the rotating means inoperative if a bottle of undue height is fed to the mechanism, substantially as described.

80. A rotary bottling machine comprising a plurality of bottle filling heads, means for rotating said machine, including an electric motor, a brake for the machine, a magnet for normally holding the brake out of operation, switch means controlling the supply of current to the motor and to the magnet, and control means actuated by one of said filling heads upon abnormal operation thereof for actuating the switching means, substantially as described.

81. A rotary bottling machine comprising a plurality of bottle filling heads, means for rotating the machine, brake means for stopping the rotation of the machine, holding means for normally holding the brake out of operation, and a common control means for rendering both the rotating means and the holding means ineffective upon an abnormal operation of any of such heads, substatially as described.

82. A rotary bottling and crowning machine comprising a plurality of bottle filling and crowning heads, means for rotating the machine, means for delivering crowns to the heads, brake means for stopping the rotation of the machine, holding means normally maintaining the brake out of operation, and a common control means for rendering both the rotating means and the brake means ineffective when the crown feeding means on one of said heads becomes inoperative, substantially as described.

83. In a bottling machine, a plurality of filling heads, means for feeding syrup to each of said heads, and test lines connected to the syrup supply for each head and leading to a common point, whereby the operator can determine at such point when the proper amount of syrup is present for each head, substantially as described.

84. In a bottling machine, a plurality of filling heads, syrup supply means for each of the heads, a water supply means, and a plurality of test lines leading to a common point and connected to the syrup supply means and the water supply means, whereby the presence or absence of syrup or water in suitable amounts may be determined from such point, substantially as described.

85. In a rotary bottling machine, a plurality of rotatable filling heads, a plurality of stationary syrup supplies and connections between said stationary syrup supplies and said rotatable filling means, one of the said stationary syrup supplies being connected to one head and another to another head, substantially as described.

86. A bottling machine comprising a plurality of filling heads movable in an endless path, bottle supports therefor, means for feeding bottles onto said supports, the filling heads being liftable by the bottles, drive means for the machine, discharge means for removing the bottles from the supports at a discharge point, and a control means for the drive means actuated in accordance with the height of a filling head as it moves past the control means, said control means being so located with respect to the discharge point that at the time a filling head moves past the same the preceding head will have reached the discharge point, substantially as described.

87. A rotary bottling machine comprising a plurality of bottle filling units, a feeder adapted to normally supply bottles successively to said filling units, a control means for the feeder effective for causing it to miss a filling unit, and means associated with a unit and effective at the will of the operator for actuating said control means, substantially as described.

88. A rotary bottling machine comprising a plurality of bottle filling units, a feeder adapted to normally supply bottles successively to said filling units, a control means for the feeder effective for causing it to miss a filling unit, and control actuating means associated with each of said units, substantially as described.

89. In a rotary bottling machine, a plurality of filling heads rotatable about a substantially vertical axis, bottle supporting means rotatable about the same axis, a cam adapted to cause relative vertical movement between the filling heads and their respective bottle supports to bring bottles on such supports into filling relation with the heads, a supporting means for the cam having an inclined plane portion cooperating with a corresponding inclined plane portion in substantially fixed relation with the cam, and means for rotating the supporting means about said axis, substantially as described.

90. In a rotary bottling machine, a plurality of filling heads rotatable about a substantially vertical axis, bottle supporting means rotatable about the same axis, a cam adapted to cause relative vertical movement between the filling heads and their respective bottle supports to bring bottles on such supports into filling relation with the heads, a supporting means for the cam having an inclined plane portion cooperating with a corresponding inclined plane portion in substantially fixed relation with the cam, and means for rotating the supporting means about said axis, said rotating means comprising a bevel gear portion secured to the supporting means, and a bevel pinion having a shaft provided with means whereby it may be rotated, substantially as described.

91. In a rotary bottling machine, a plurality of filling heads rotatable about a substantially vertical axis, bottle supporting means rotatable about the same axis, a cam adapted to cause relative vertical movement between the filling heads and their respective bottle supports to bring bottles on such supports into filling relation with the heads, and means for raising or lowering the cam to adapt the machine for different sized bottles, said raising and lowering means comprising a gear portion which is substantially coaxial with the filling heads and having a cooperating pinion on a shaft provided with means whereby it may be rotated, substantially as described.

92. In a rotary bottling machine, a plurality of filling heads, rotatable about a substantially vertical axis, bottle supporting means rotatable therewith, a cam adapted to cause relative movement between the filling heads and respective bottle supports to bring bottles on such supports into filling relation with the heads and means for raising or lowering the cam to adapt the machine for different sized bottles, each of the heads and their respective supports being vertically relatively movable independently of the other heads and supports and having means associated therewith for locking a head and support in any one of a plurality of vertical positions relative to one another as determined by the height of the bottle engaged by said head and support, substantially as described.

93. In a rotary bottling machine, a plurality of filling heads rotatable about a substantially vertical axis, bottle supporting means rotatable therewith, a cam adapted to cause relative movement between the filling heads and their respective bottle supports to bring bottles on such supports into filling relation with the heads, and means for raising or lowering the cam to adapt the machine for different sized bottles, each of the heads being vertically movable independently of the other heads and having means associated therewith for locking such head in any one of a plurality of vertical positions determined by the height of the bottle in such head, substantially as described.

94. In a rotary bottling machine, a plurality of filling units, a feed station, a transfer means at the feed station, the transfer means having means to embrace the sides of the bottle, whereby the bottle is prevented from toppling over, the transfer means being effective for transferring the bottle to a filling unit while it is so embraced, and means associated with each filling unit for positioning the bottle in substantially central relation with the filling unit, substantially as described.

95. A rotary bottling machine, comprising a plurality of filling units rotatable past a feed station, a conveyer adapted to frictionally engage bottles to move the bottles towards the feed station in a train of substantially unseparated bottles, the conveyor permitting slippage of the bottles relative to the conveyor and said means adapted to separate the leading bottle from the train, said feed means having a bottle engaging portion adapted to embrace the side of a bottle around substantially half of its periphery and movable with the bottle so embraced to a filling unit, the said means being in timed relation with the filling units, substantially as described.

96. A rotary bottling machine comprising a plurality of filling heads rotatable about an axis, a plurality of stationary conduits adapted to supply different fluids to the filling heads, the conduits terminating in portions which are substantially coaxial with the filling units, and connections rotatable with the filling units adapted to carry fluid from such stationary conduits to the filling heads, substantially as described.

97. A rotary bottling machine comprising a plurality of filling heads rotatable about an axis, a plurality of stationary conduits adapted to supply different fluids to the filling heads, the conduits terminating in portions which are substantially coaxial with the filling units, connections rotatable with the filling units adapted to carry fluid from such stationary conduits to the filling heads, and a plurality of fluid reservoirs rotatable with the filling heads and interposed in one of such connecting means between the stationary conduits, substantially as described.

98. A rotary bottling machine comprising a plurality of filling units which are adapted to fill a bottle with syrup and water, the units being all rotatable about a common axis, a substantially coaxial conduit portion adapted to transmit water from a stationary source to the filling units, a substantially coaxial conduit member adapted to transmit syrup from a stationary source to the filling units, and a fluid reservoir rotatable with the filling units and interposed between a filling unit and the last mentioned conduit means, substantially as described.

99. A rotary bottling machine comprising a stationary cylindrical cam, a plurality of filling units surrounding the same and rotatable about the cam, each filling unit being vertically movable and adapted to take varying vertical positions as determined by the height of bottles supplied thereto, fluid supply means fixed against vertical movement, a conduit between the supply means and a filling unit adapted to maintain the fluid connection at the varying vertical positions of the unit, a valve carried by the unit, movable vertically therewith, and effective for controlling the supply of fluid to a bottle, and a valve operating member movable with the head, the cam being effective for causing movement of the valve operating member at its several positions, substantially as described.

100. A rotary bottling machine comprising a cylindrical cam, a plurality of heads surrounding the same and rotatable about an axis which is substantially the cam axis, the cam being stationary, fluid supply connections for each of the filling units, a fluid valve for each of the filling units, and a sliding connection between the cam and each of the valve means for operating such valve means sequentially, the sliding connection between the valve means and the cam permitting vertical movement of the heads relative to the cam without disturbing the cam connection of the valves, substantially as described.

101. A bottling machine, comprising a filling and crowning head having an opening adapted to receive the neck of a bottle, said opening having a throat rubber for engaging the neck of the bottle, the head being effective for filling and crowning a bottle so as to produce a sealed package while the neck of the bottle is still within the opening, and means for engaging the sealed package and causing relative movement between the package and the head and forcing the package through the throat rubber, substantially as described.

102. A bottling machine, comprising a filling and crowning head having an opening adapted to receive the neck of a bottle, the opening being provided with a throat rubber having a restricted portion adapted to engage the neck of the bottle during operation of the head, the head being effective for filling and crowning a bottle while the neck thereof lies within such opening, thereby producing a sealed package, and means for positively engaging the sealed package and causing relative movement between the package and the head so as to force the neck of the bottle with the crown thereon through the restricted portion of the throat rubber, substantially as described.

103. In a bottling machine, a feeding mechanism comprising a rotating disk for supporting bottles to be fed, supply means for delivering bottles to the disk and a reciprocating means for bodily gripping a bottle on the disk and transferring it to the bottling machine while it is so gripped, substantially as described.

104. In a bottling machine, bottle feeding mechanism comprising a rotating disk, means for supplying bottles to the disk, means for engaging a bottle around substantially half of its periphery so as to prevent tipping thereof, said means being effective for transferring a bottle from the disk to the bottling machine and control means actuated by the bottling machine itself for controlling the last mentioned means.

105. In combination with a bottling machine, a rotatable feed disk, means for delivering bottles to the disk and means controlled by the machine and movable transversely of the disk for transferring the bottle from the disk to the machine, the last mentioned means having a bottle receiving portion adapted to engage it around substantially half of its periphery, so as to prevent the bottle from tipping.

106. In combination with a bottling machine, a continuously rotating feed disk, means for delivering bottles to the disk and a transfer mechanism controlled by the bottling machine and movable transversely of the disk for transferring bottles from the disk to the machine, said means having a gripper for holding a bottle during such transfer.

107. A bottling machine comprising a filling head, a relatively movable bottle plunger adapted to raise a bottle thereon into operative relation with the filling head, means for supplying bottles to and removing bottles from said plunger and adjusting means adapted for changing the normal distance between the plunger and the filling head so as to accommodate different size bottles, said means being effective for correspondingly adjusting the position of the feed and take off means.

108. In combination with a bottling machine having a filling head, a continuously rotating feed disk adapted to bring bottles alongside the head, a transfer mechanism movable transversely of the disk for transferring bottles from the disk to the machine, said mechanism having a gripper for holding a bottle during such transfer, means for taking filled bottles away from the machine, and means for adjusting the position of the feed disk relative to the filling head so as to accommodate different sized bottles, said means being effective for simultaneously adjusting the position of the transfer mechanism and the means for taking bottles away from the filling head.

109. In combination with a bottle filling machine, a rotary feed member, a reciprocating jaw for transferring bottles from the feed member to the filling machine and control means effective when the filling machine and feed member are running for starting or stopping the effective operation of the reciprocating jaw.

110. A rotary bottling machine comprising a plurality of filling units, drive means for the machine, means for feeding bottles to the filling units, a control for the drive means and a separate control for the feeding means, the last mentioned control being actuated by a bottle when a portion thereof lies outside the path normally occupied by bottles fed to the machine, said control means being unaffected by a bottle following the normal path.

111. A rotary bottling machine comprising a stationary barrel cam, a plurality of heads surrounding the same and rotatable about an axis which is substantially the cam axis, fluid supply connections for each of the filling units and a connection for the barrel cam and each of the valve means for operating such valve means sequentially, the connection between the valve means and the cam being adapted for vertical movement of the heads and the connection relative to the cam without disturbing the cam operation, substantially as described.

In testimony whereof I have hereunto set my hand.

PATRICK W. SHIELDS.